United States Patent [19]

Deyesso et al.

[11] Patent Number: 4,733,366
[45] Date of Patent: Mar. 22, 1988

[54] APPARATUS FOR PROVIDING AN INTERRUPT SIGNAL IN RESPONSE TO A PERMANENT OR TRANSIENT POWER FAILURE

[75] Inventors: Joseph P. Deyesso, Walpole; Edward Gershenson, Worcester; Louis A. Lemone, Stow; Mark C. Lippitt, Ashland; John R. McDaniel, Acton; Paul F. Joseph, Oakdale, all of Mass.

[73] Assignee: Data General Corporation, Westboro, Mass.

[21] Appl. No.: 495,182

[22] Filed: May 16, 1983

[51] Int. Cl.⁴ .............................................. G06F 11/00
[52] U.S. Cl. .................................................... 364/900
[58] Field of Search ... 364/200 MS File, 900 MS File, 364/184, 185; 365/226, 228, 229; 371/66, 68; 361/89, 92, 97, 111

[56] References Cited

U.S. PATENT DOCUMENTS

| | | | |
|---|---|---|---|
| 4,084,232 | 4/1978 | Woods | 364/200 |
| 4,086,627 | 4/1978 | Bennett et al. | 364/200 |
| 4,096,560 | 6/1978 | Footh | 364/200 |
| 4,196,476 | 4/1980 | Steiner | 364/900 |
| 4,228,496 | 10/1980 | Katzman | 364/200 |
| 4,327,410 | 4/1982 | Patel | 364/200 |
| 4,331,996 | 5/1982 | Matsko et al. | 361/92 |
| 4,453,215 | 6/1984 | Reid | 364/200 |
| 4,486,826 | 12/1984 | Wolff | 364/200 |

Primary Examiner—Raulfe B. Zache
Assistant Examiner—Florin Munteanu

[57] ABSTRACT

Logic circuitry for use in electrical apparatus for providing an interrupt signal to a controller when there is a power failure in the electrical apparatus. The logic circuitry is connected to a bus from the controller. When the logic circuitry receives a power failure signal, it sets an interrupt state register and provides an interrupt signal on the bus as long as the interrupt state register is set. If the power failure signal no longer indicates a power failure, the logic circuitry responds to a signal from the controller indicating that the interrupt has been received by resetting the interrupt state register, thereby ending the interrupt. However, if the power failure signal is still active, the logic circuitry will not reset the interrupt state register in response to the signal from the controller.

4 Claims, 25 Drawing Figures

Power Fail Interrupt Logic

Digital Data Processing System 100 with Disk Drives

FIG. 6 Overview of DDCA 121

Structure of Track Sector 504

DPU Timing Generator 1003

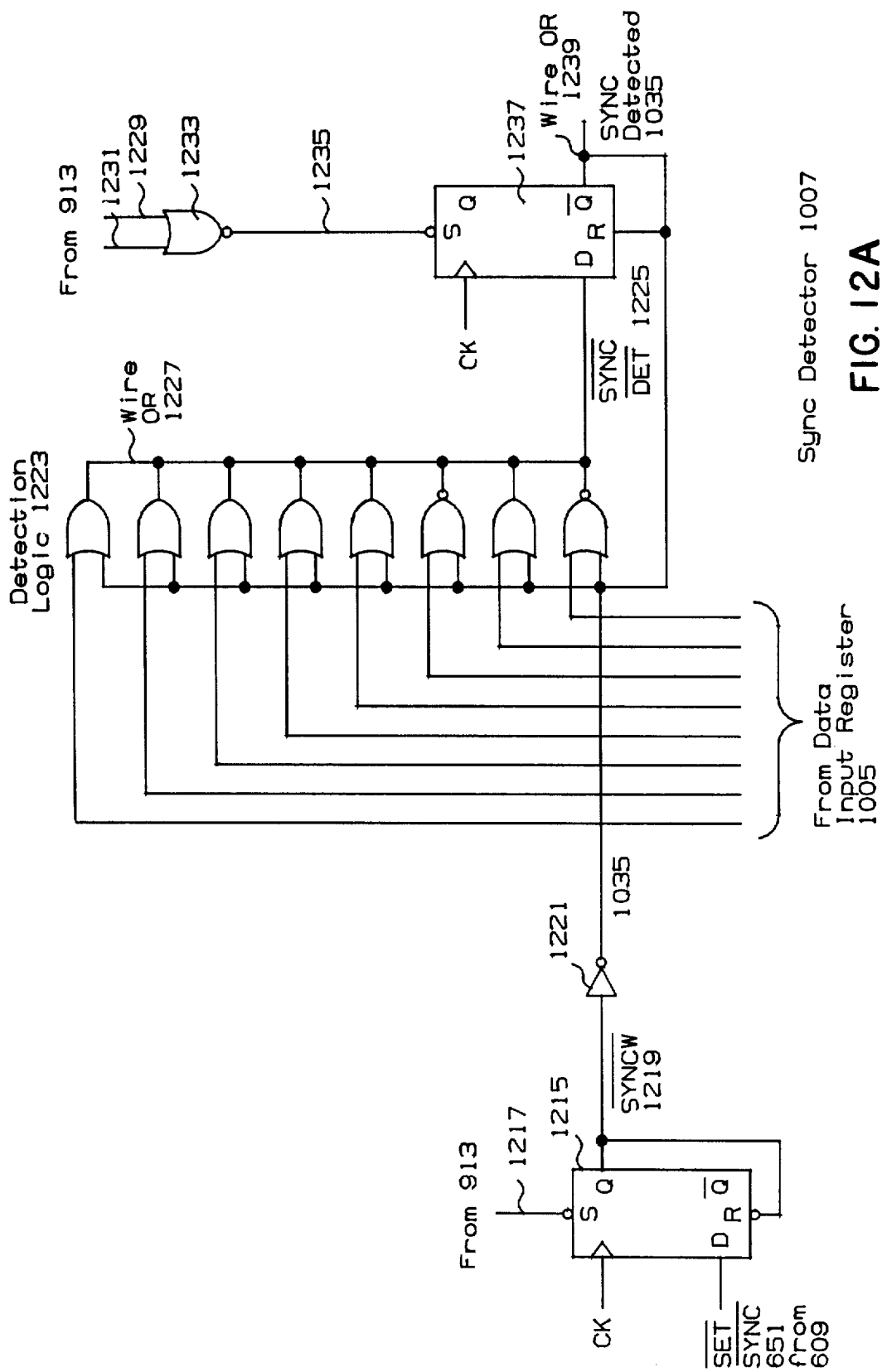

Encoding Table 1303

| N | States A | B | C | N+1 | Code | ST | CSW |
|---|---|---|---|---|---|---|---|
| 11 | | 11 | | 10,01 | 100 | B | 1001 |
| 11 | | | | 00,11 | 010 | B | 0101 |
| 10 | | | | --- | 100 | A | 1000 |
| 01 | | | 01 | --- | 010 | A | 0100 |
| 00 | 10,0010 | | | --- | 101 | C | 101X |
| | 01,1100 | | | --- | 000 | A | 000 |
| | | 11 | | 10,01 | 0001 | B | 0001 |

Decoding Table 1305

| Pr. ST | N | N+1 | New ST | BIN Data |
|---|---|---|---|---|
| A | X000 | 0000 | B | 11 |
| A | X000 | 0001 | C | 11 |
| A | XX10 | 000X | D | 11 |
| A | XX00 | 0070X | A | 10 |
| A | X100 | 0070X | A | 01 |
| A | X01 | --- | A | 00 |
| B | XXX | --- | A | 10 |
| C | XXX0 | --- | A | 01 |
| D | XXX0 | --- | A | 00 |
| D | XXX1 | --- | A | 11 |

CS Word Table 1307

| ST | Code | CS Word |
|---|---|---|
| A | 1 | 1000 |
| A | 01 | 0100 |
| A | 00 | 0000 |
| B | 1 | 1001 |
| B | 01 | 0101 |
| B | 00 | 0001 |
| C | 1 | 101X |
| C | 01 | 001X |

FIG. 13

RLLE Encoding and Decoding

Implementation of Encoding and Decoding Sht. 1

Implementation of Encoding and Decoding Sht.2

Suspended Reserve Logic

Power Fail Interrupt Logic

Interrupt Signal Generation Logic

Transfer Apparatus 605 Detail

C/D Bus Output Logic

Controller 107 Block Diagram

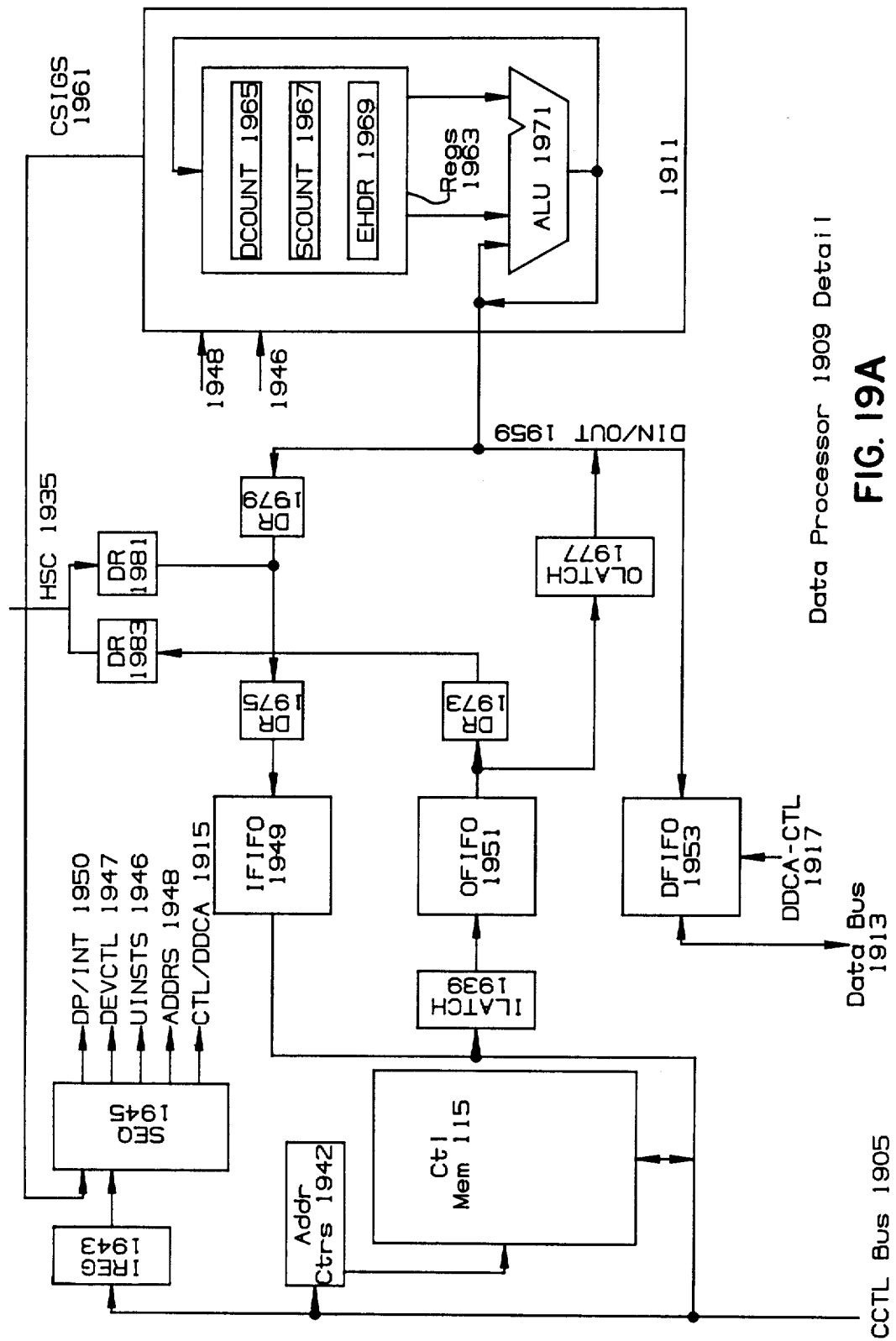

Disk Interface 1929 Detail

APPARATUS FOR PROVIDING AN INTERRUPT SIGNAL IN RESPONSE TO A PERMANENT OR TRANSIENT POWER FAILURE

BACKGROUND OF THE INVENTION
1. Field of the Invention
2. Description of Prior Art

SUMMARY OF THE INVENTION

BRIEF DESCRIPTION OF THE DRAWINGS

Figure 1:
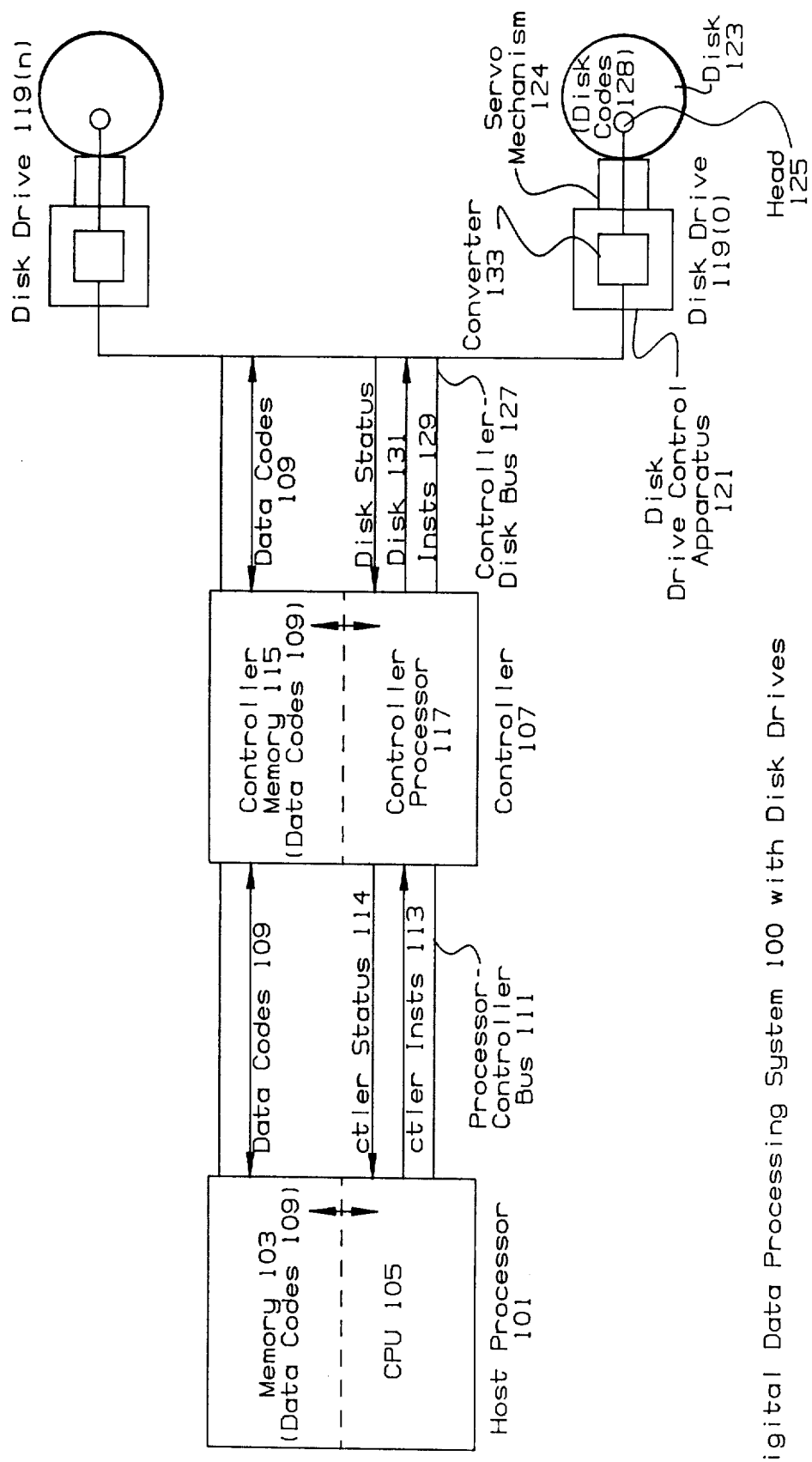
Figure 2:
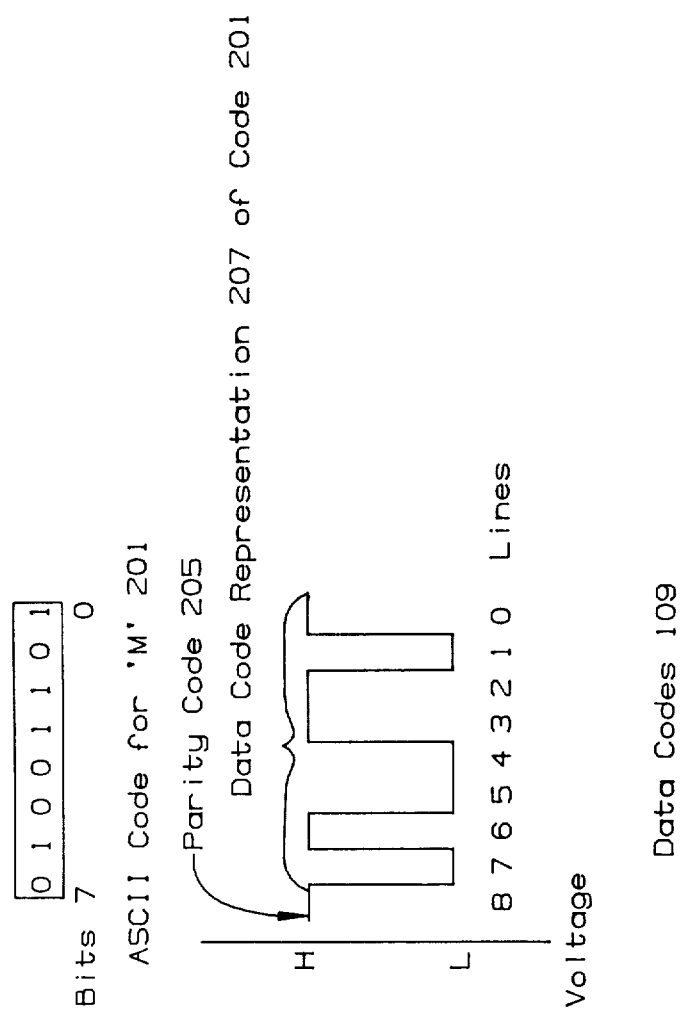
Figure 3:
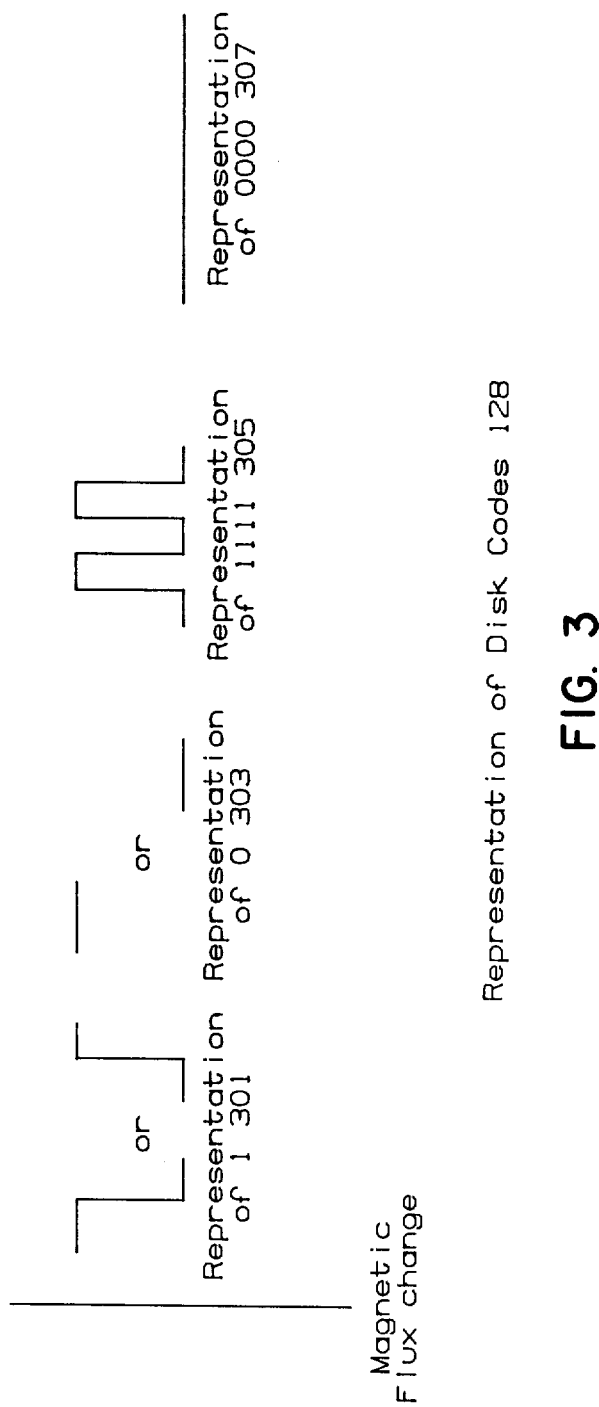
Figure 4:
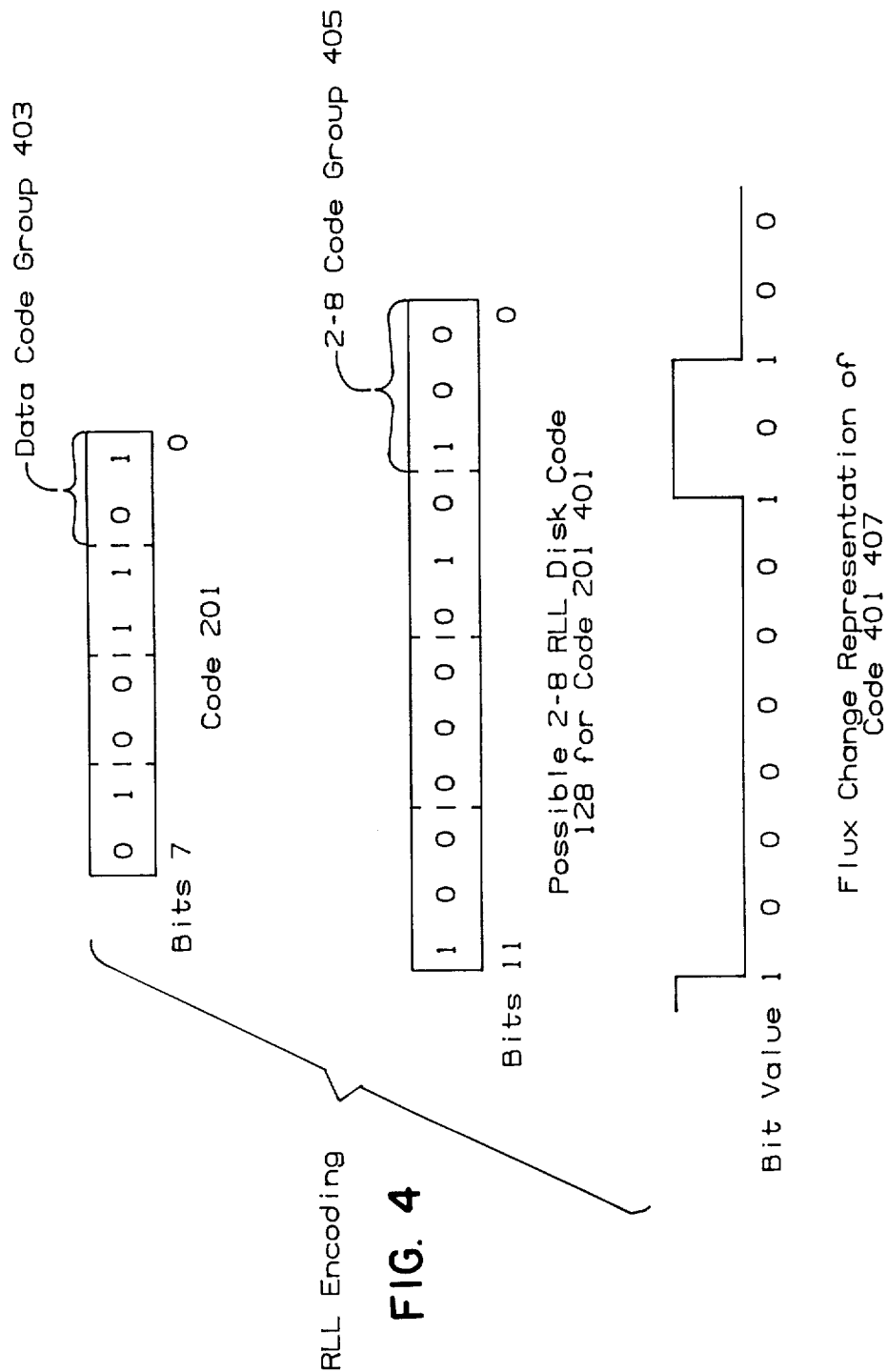
Figure 5:
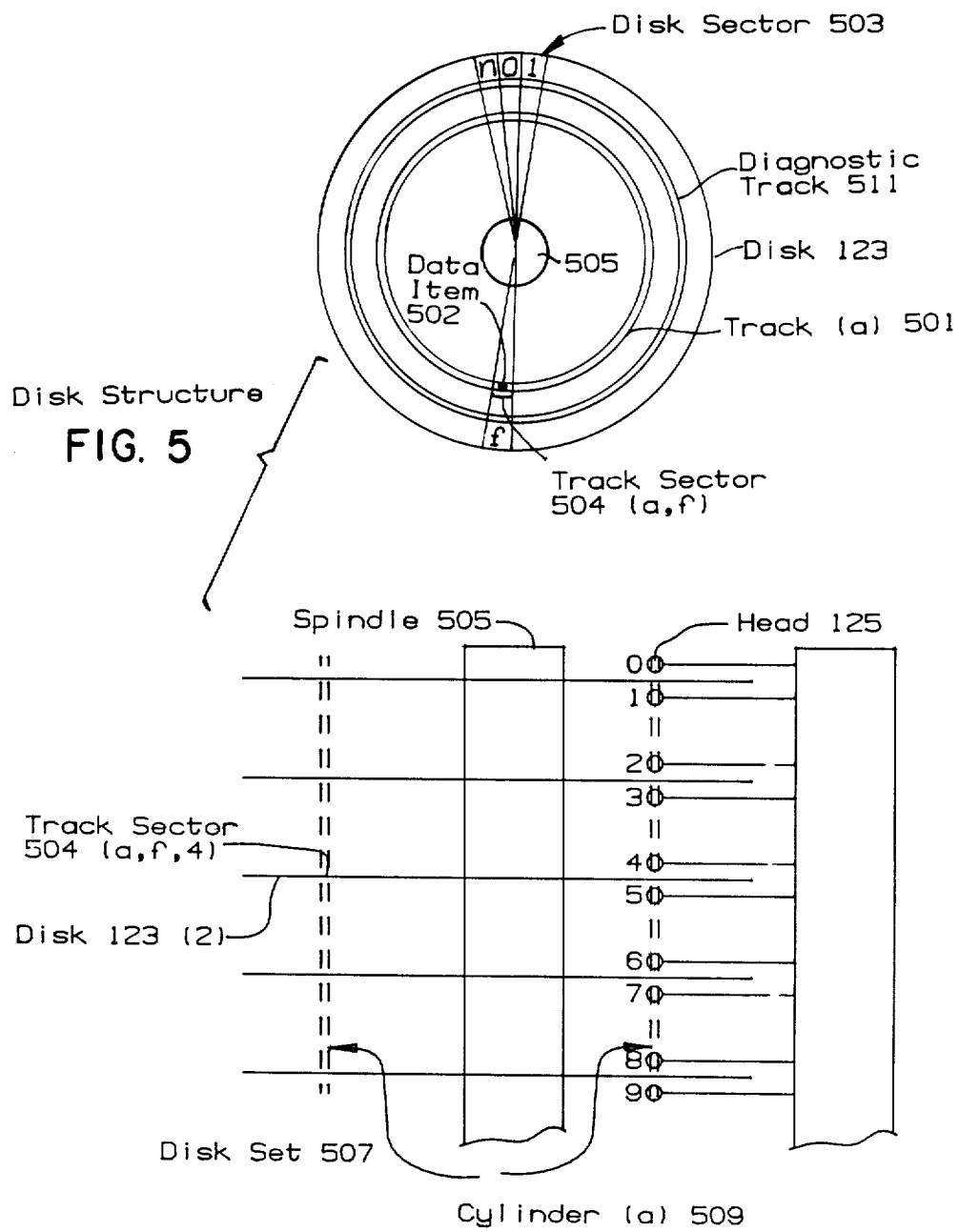
Figure 6:
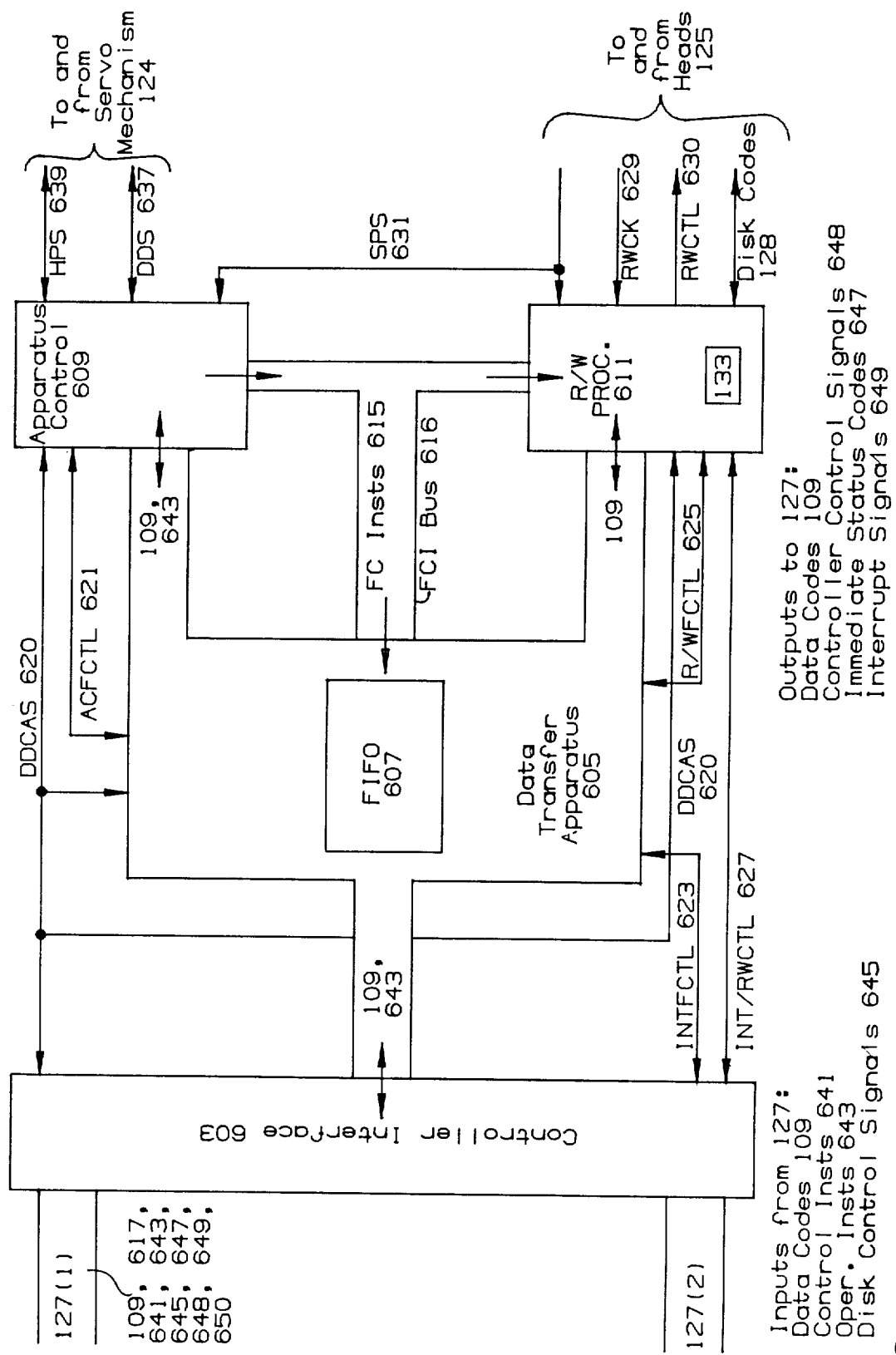
Figure 7:
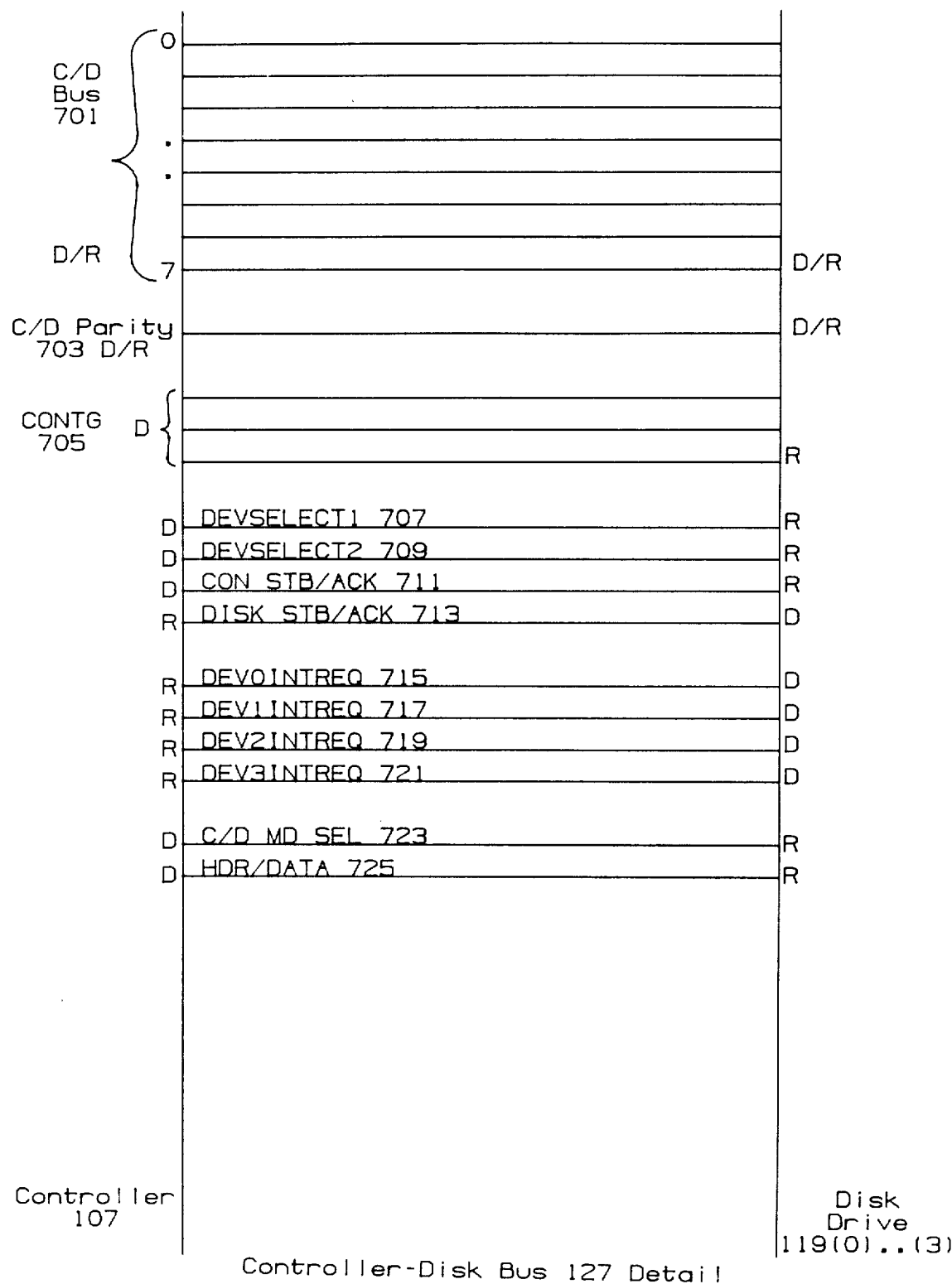
Figure 8:
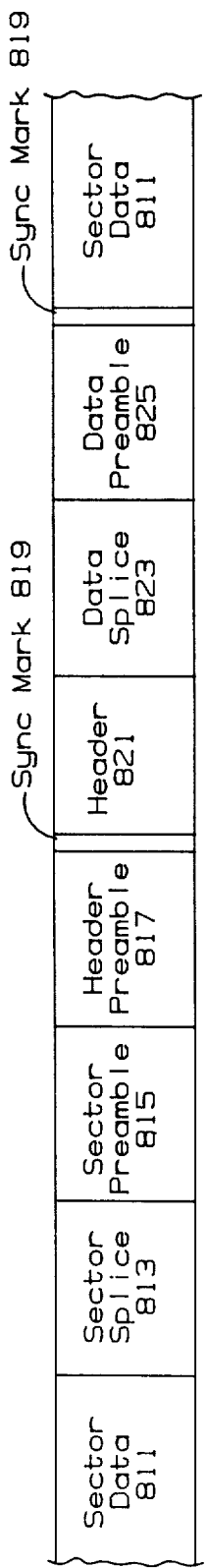
Figure 10:
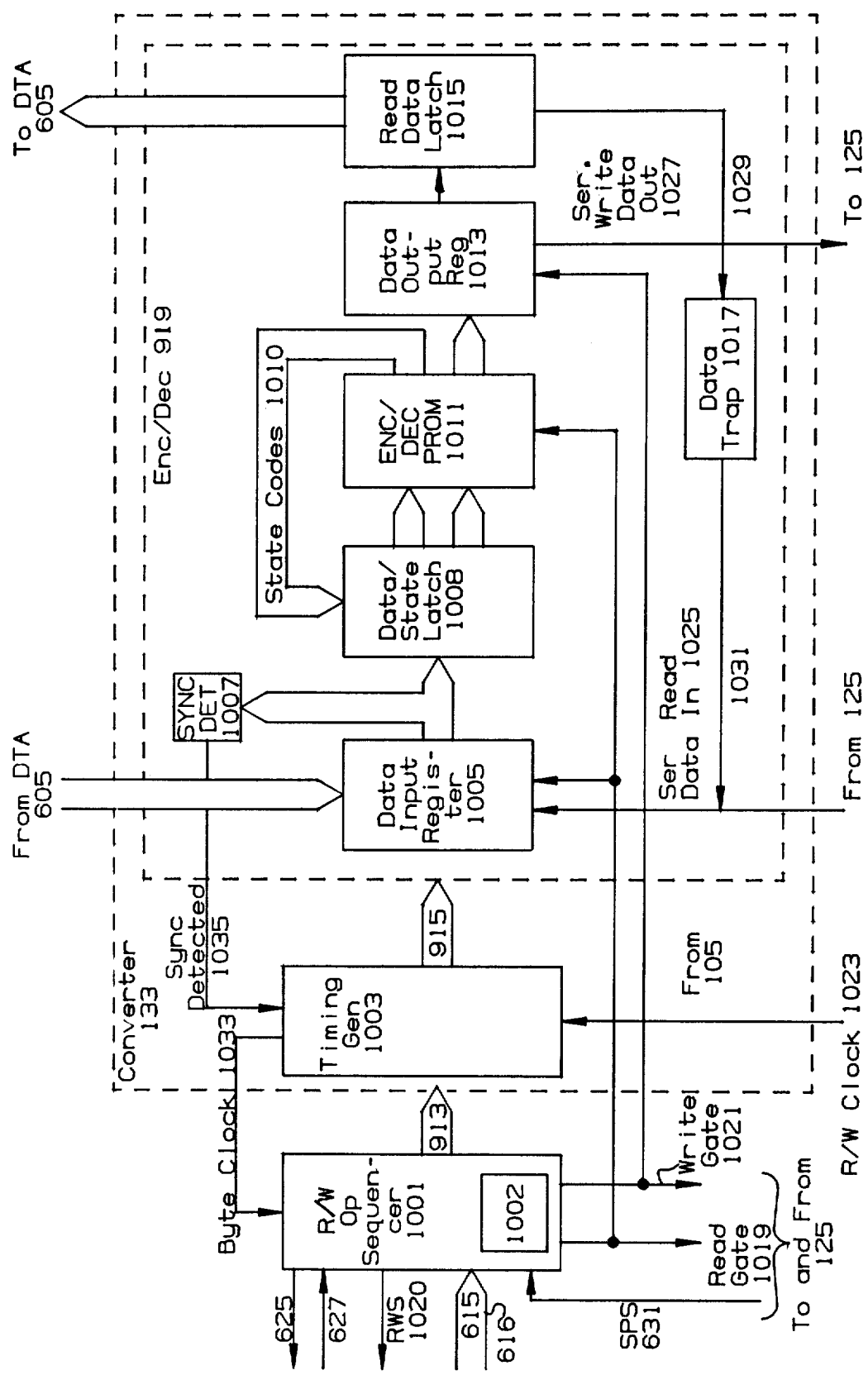
Figure 11:
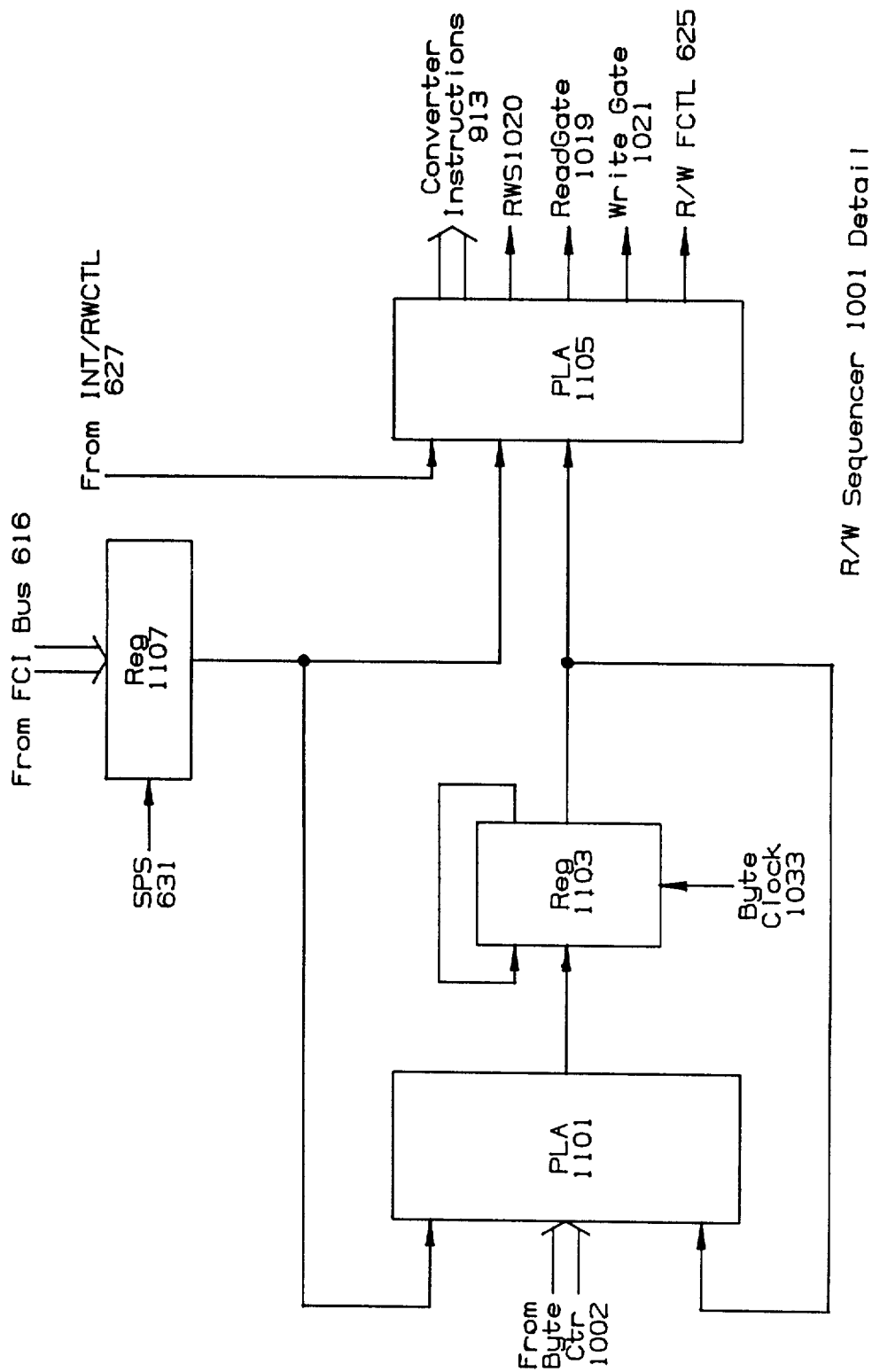
Figure 12:
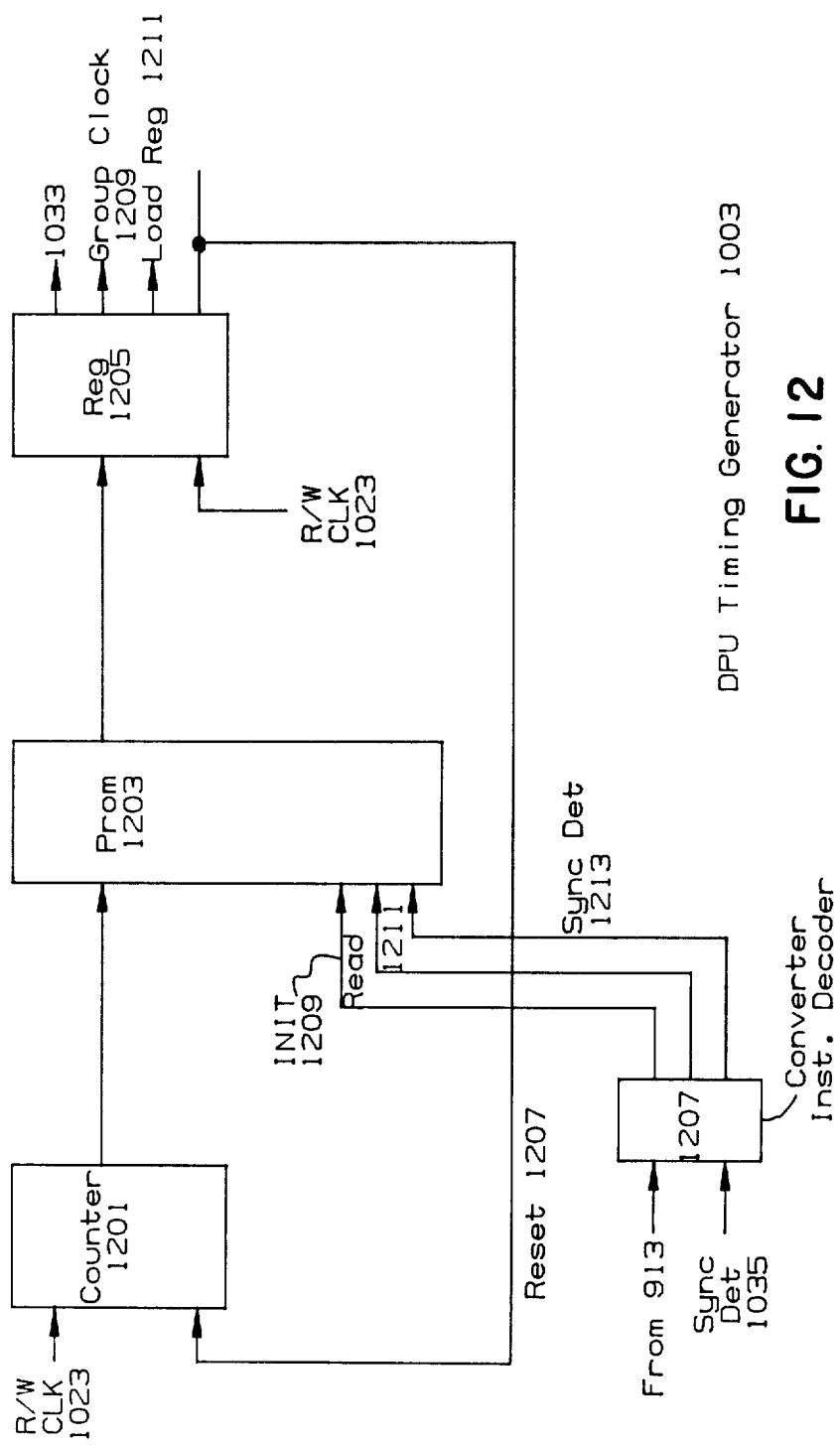
Figure 14:
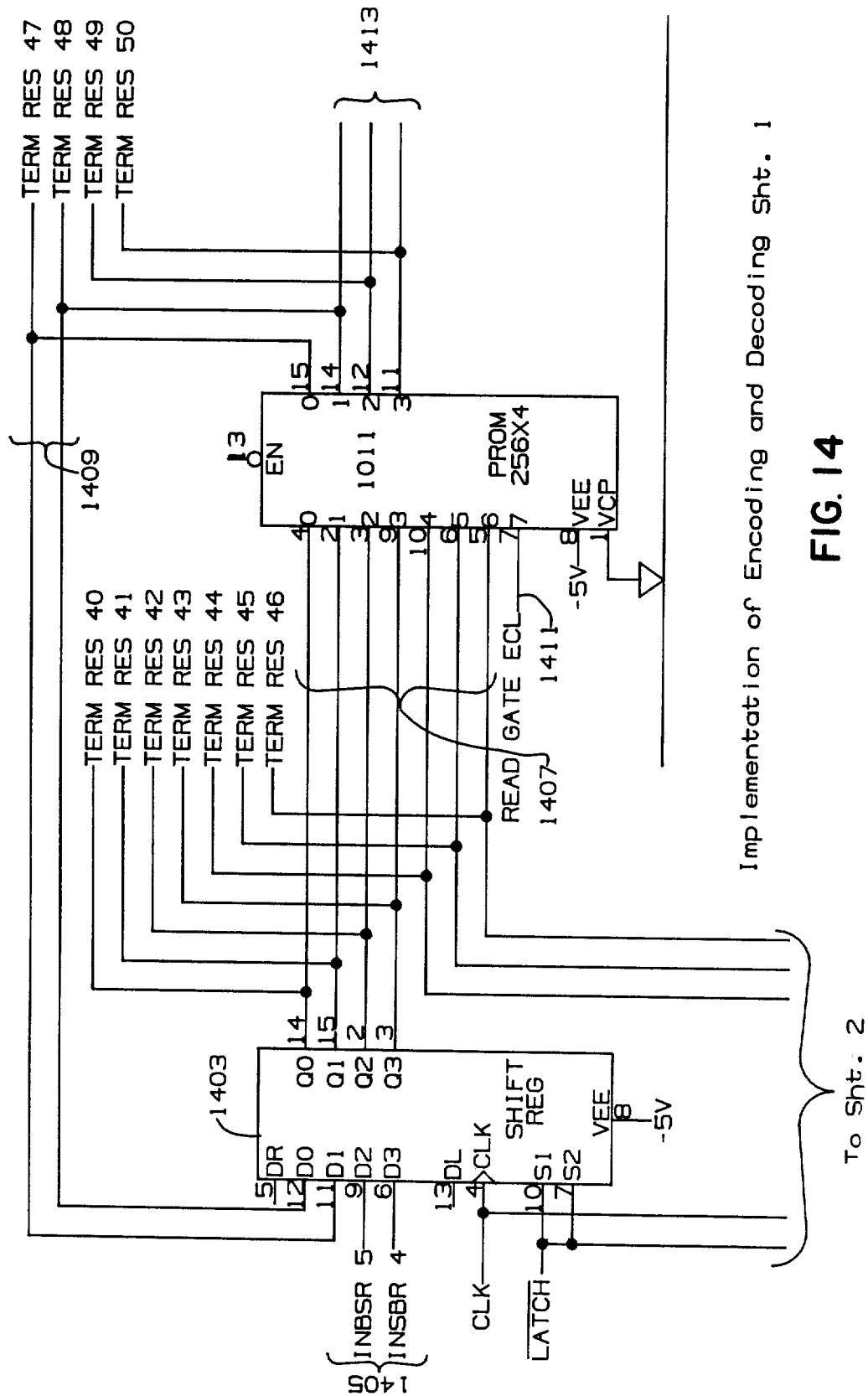
Figure 14:
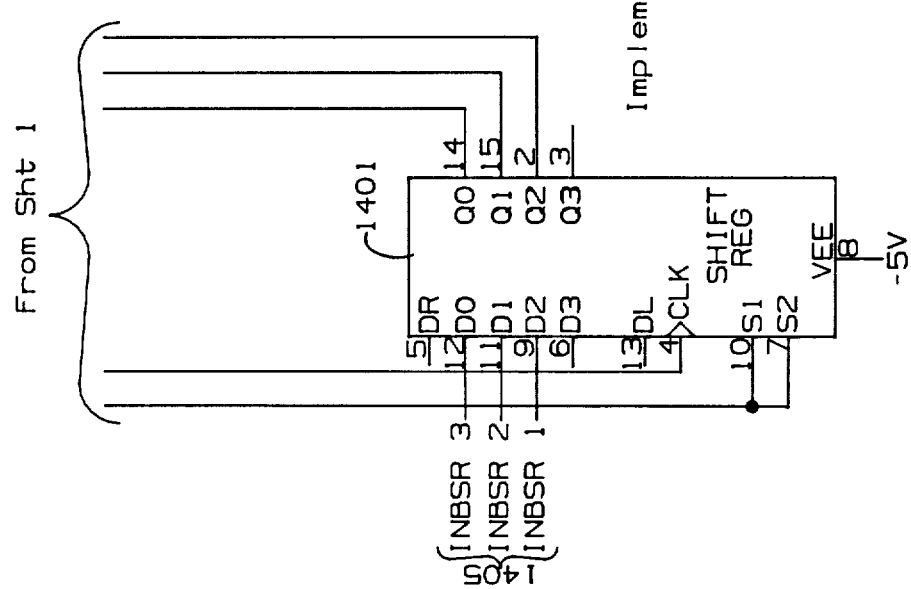
Figure 15:
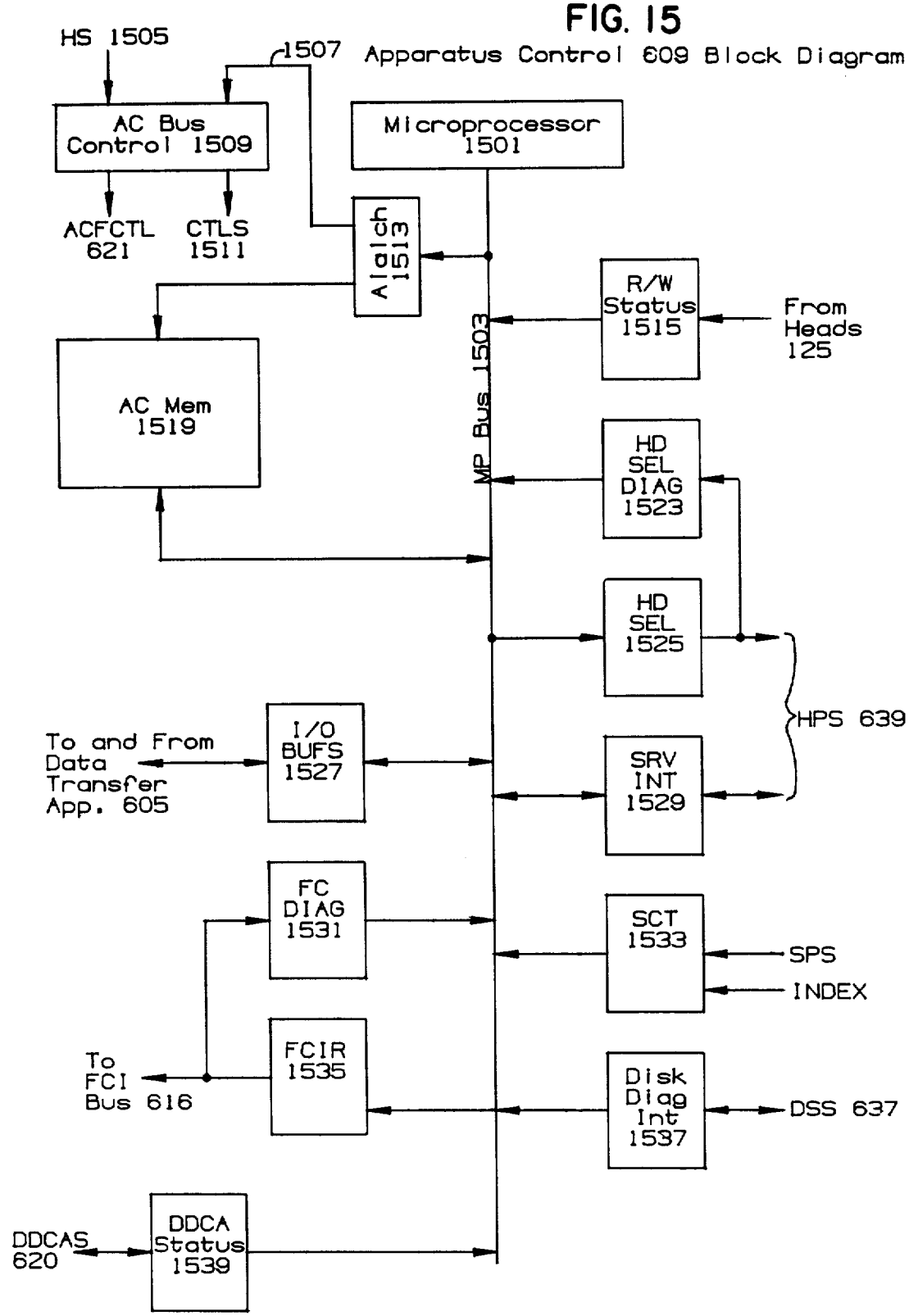
Figure 16:
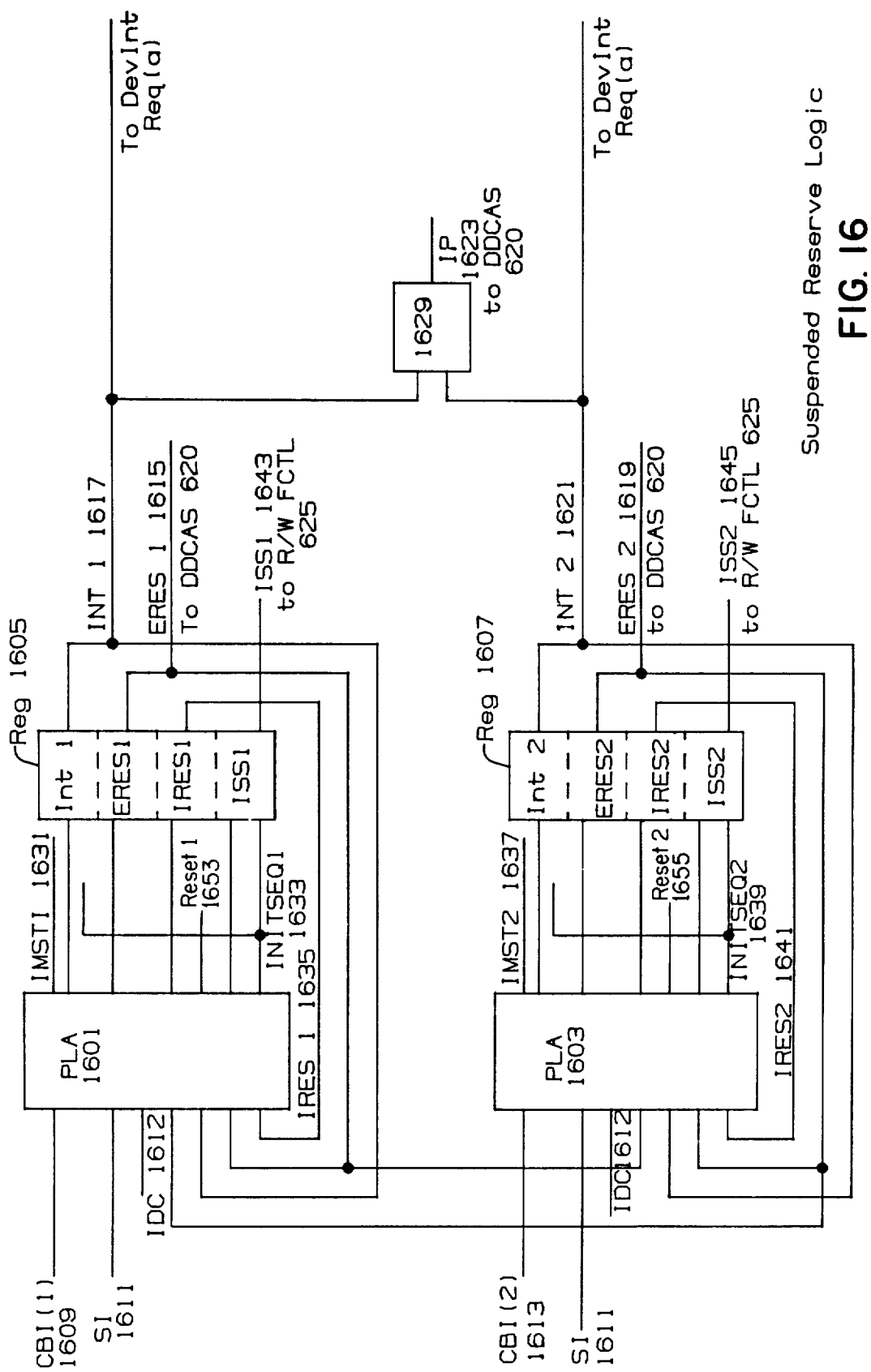
Figure 16A:
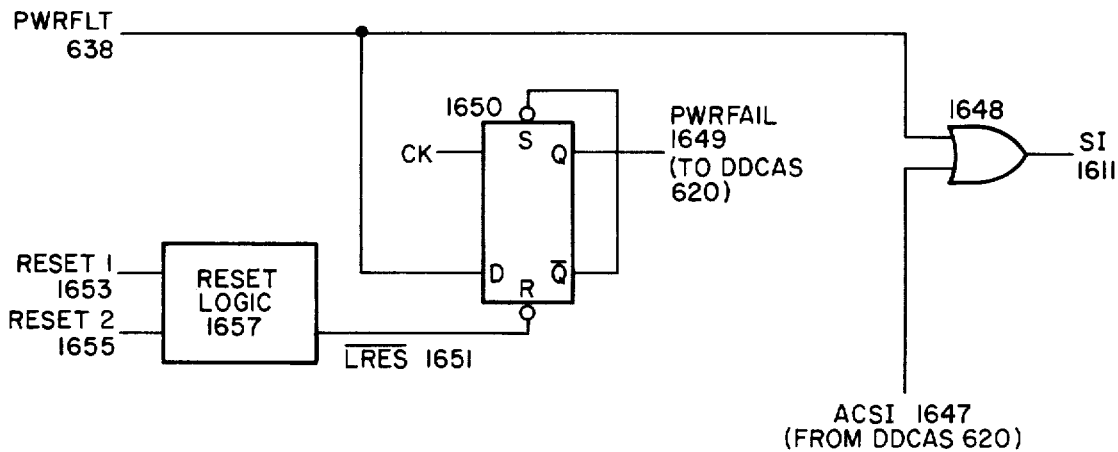
Figure 16B:
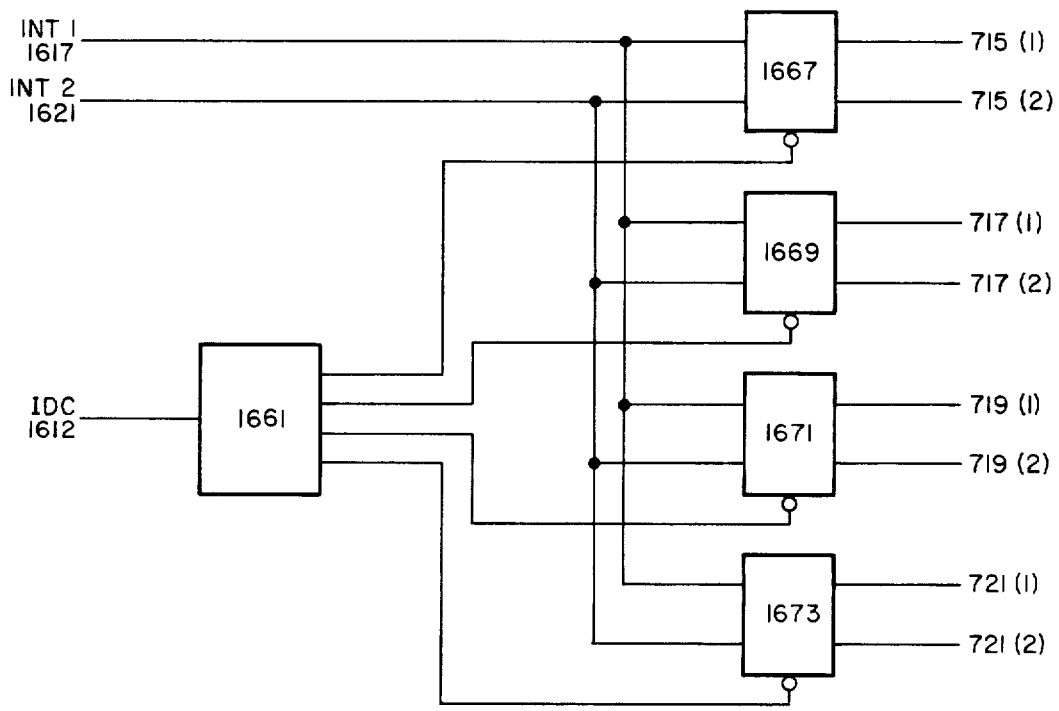
Figure 17:
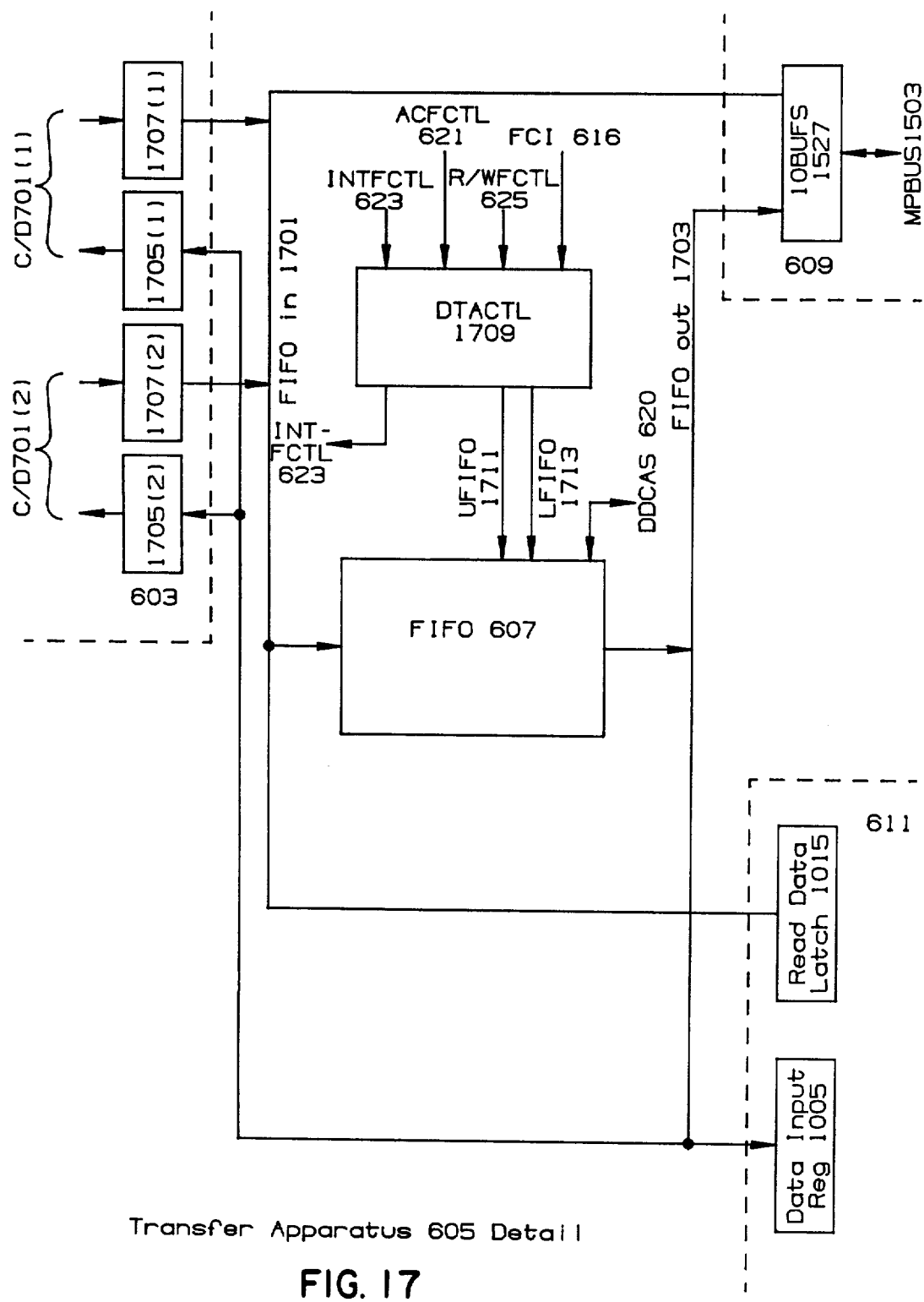
Figure 19:
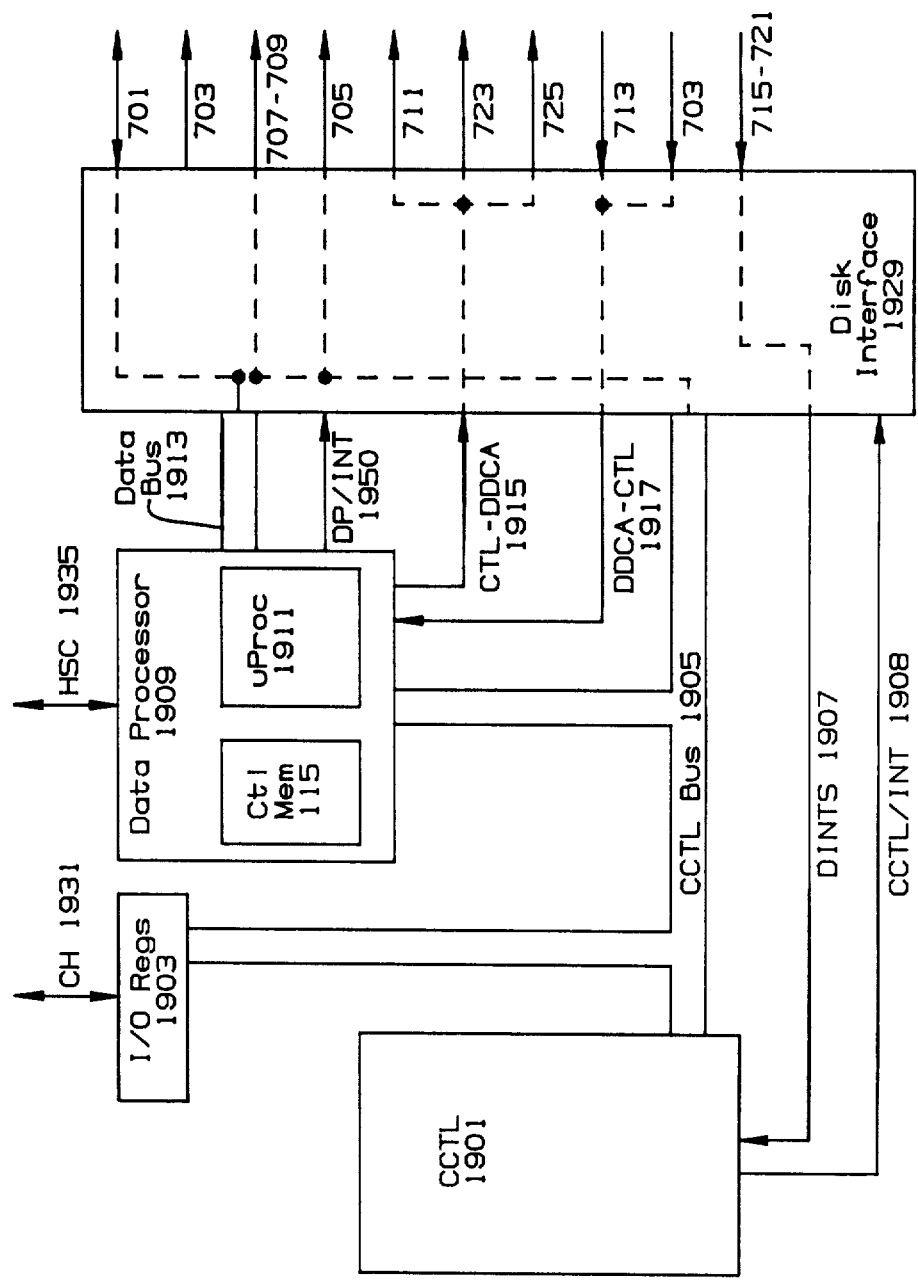
Figure 19B:
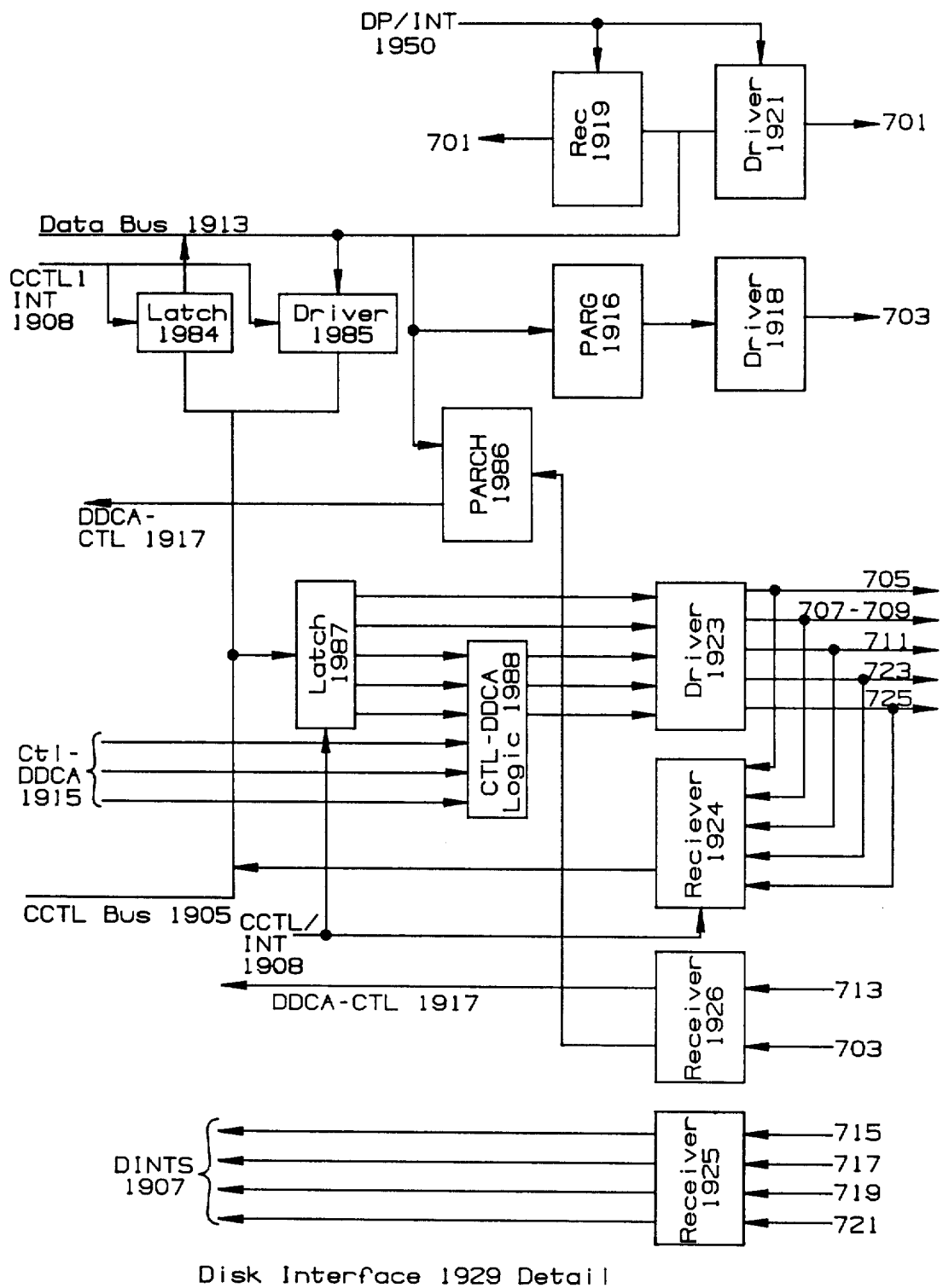

DESCRIPTION OF THE PREFERRED EMBODIMENTS
1 Introduction
  1.1 Digital Data Processing Systems with Disk Drives
    1.1.1 Components of a Digital Data Processing System utilizing Disk Drives—FIG. 1
    1.1.2 Operation of System 100
  1.2 Representing Data on a Disk Drive—FIGS. 2, 3, and 4
  1.3 Locating Data on Disk 123—FIG. 5
2 Overview of Structure and Operation of Disk Drive Control Apparatus 121 of the Present Invention
  2.1 Structure of Disk Drive Control Apparatus 121—FIG. 6
    2.1.1 Controller Interface 603
    2.1.2 Data Transfer Apparatus 605
    2.1.3 R/W Frocessor 611
    2.1.4 Apparatus Control 609
    2.1.5 Coordination of Operation of Components of DDCA 121
  2.2 Overview of Operation of DDCA 121
    2.2.1 Structure of Controller-Disk Bus 127—FIG. 7
    2.2.2 Detailed Structure of Track Sector 504—FIG. 8
    2.2.3 Immediate Status Codes 647 for DDCA 121
    2.2.4 Operation of DDCA 121
      2.2.4.1 Using Disk Drive 119
      2.2.4.2 Execution of Operational Instructions 643 by DDCA 12
        2.2.4.2.1 Operation of DDCA 121 under Control of New Block Operational Instruction 643
          2.2.4.2.1.1 NEW BLOCK Specifying a Read Operation
          2.2.4.2.1.2 NEW BLOCK Specifying a Write Operation
          2.2.4.2.1.3 Other NEW BLOCK Operations
      2.2.4.3 Diagnostic Operations Performed by DDCA 121
    2.2.5 Hierarchical Organization DDCA 121—FIG. 8
3 Detailed Implementation of Components of a Preferred Embodiment of DDCA 121
  3.1 Implementation of R/W Processor 611—FIGS. 10–12
    3.1.1 R/W Operational Sequencer—FIG. 11
    3.1.2 Converter 723
      3.1.2.1 Implementation of Timing Generator 1003—FIG. 12
      3.1.2.2 Enc/Dec 919
  3.2 Encoding and Decoding in R/W Processor 611
    3.2.1 Encoding Data Codes 109—FIG. 13
    3.2.2 Decoding RLL (2,8) Disk Codes 128
    3.2.3 Implementation of Encoding and Decoding in a Preferred Embodiment of DDCA 121—FIG. 14
    3.2.4 Reducing the Number of Erroneous Data Codes 109 during Decoding
  3.3 Detailed Description of Apparatus Control 609
    3.3.1 Structure of Apparatus Control—FIG. 15
    3.3.2 General Operation of Apparatus Control 609
      3.3.2.1 Operation of Apparatus Control 609 during Execution of a New Block Operational Instruction 643
      3.3.2.2 Operation of Apparatus Control 609 in Response to Diagnostic Operational Instructions 643
  3.4 Suspended Reserve Logic—FIG. 16
    3.4.1 The Suspended Reserve Operation
    3.4.2 Interrupts from SI 1611—FIG. 16A
    3.4.3 Generation of Device Interrupt Request Signals—FIG. 16B
  3.5 Implementation of Data Transfer Apparatus 605—FIG. 17
  3.6 Logic Controlling Outputs of C/D Bus 701
4 Detailed Description of Controller-Disk Bus 127—FIGS. 7, 19, 19A, 19B, and 20
  4.1 Overall Structure of Controller 107—FIG. 19
    4.1.1 Detailed Structure of Data Processor 1909—FIG. 19A
    4.1.2 Detailed Description of Disk Interface 1929—FIG. 19B
    4.1.3 Operation of Controller 107
  4.2 Operation of Controller-Disk Bus 107—FIG. 7
5 Conclusion

BACKGROUND OF THE INVENTION

1. Field of the Invention

The invention relates generally to data-processing systems and more specifically to disk drives utilized by such systems to store data on magnetic media, controllers utilized to control such disk drives, and buses connecting controllers and disk drives.

2. Description of Prior Art

A set of controllers, a set of disk drives, and the buses connecting them make up a complex system which must function rapidly and reliably and which must be easily diagnosed in case of failure. Problems in such systems in the prior art have involved allocation of functions between the disk drive and the controller, the design of the system so that one part can be modified without changing the rest, the provision of immediate access for one controller to a disk drive after another controller has finished using the disk drive, the provision of information about the status of a disk drive which a controller is currently not using to the controller, the diagnosis of failures in the system, the design of efficient and inexpensive apparatus for encoding data codes to produce disk codes and decoding disk codes to produce data codes, and the reduction of the effect of minor errors which occur while data is being read to or written from the disk.

Allocation of functions between the disk drive and the controller is difficult because each has information that the other requires to operate correctly. For example, the controller may maintain a map of the disk indicating what disk track sectors are available for use. Each disk track sector is specified in the map by means of a set of coordinates. The track sector itself contains a header which includes the coordinates. A transfer of data to or from a track sector should not take place unless the coordinates in the header are the same as those of the track sector to or from which the controller intended to transfer data. While the controller has the information required to check the header, it is the disk which needs to know whether the header is valid before it begins reading or writing data.

The design of disk drives so that one part can be changed without affecting the others is difficult because the disk drive is required to operate very rapidly. Hence, the parts of the disk drive must cooperate closely and each part is dependent on the others. Unless great care is taken in the design, a change to any part requires changes in all of the others. For example, a change in the disk codes used on the disk may require a complete redesign of the portion of the disk drive which encodes or decodes the disk codes and transfers data between the controller and the disk.

Where more than one controller may use a disk drive, it is important that a controller which is waiting for another controller to finish using the disk drive begin using the disk drive immediately when the other controller ceases using it. If there is any interval between the time the first controller stops using the disk and the second controller starts using it, there will be a reduction of system efficiency, and more important, a possibility that the first controller will again gain use of the disk drive before the second controller determines that it is free and reserves it.

It is further important where a controller is sharing a set of disk drives with a group of controllers that the controller can determine the status of each disk drive in the set without currently having access to the disk drive. In the absence of such a capability, the controller cannot efficiently use the disk drives available to it.

In complicated apparatus such as disk drive and controller systems, diagnostics are difficult. There are many possible sources of error, and diagnosis must be able to distinguish among the possible sources. For example, when data is encoded and written to the disk, the presence of bad data on the disk may be the result of an error in the encoding operation or of an error in the system which writes the data to the disk. Further, the addition of diagnostic components adds to the overall complexity of the system, and if improperly done, may provide an additional source of error.

Encoding data to obtain disk codes and decoding disk codes to obtain data is one of the most important operations performed in a disk drive. Design of apparatus for performing these operations which is fast and low in cost is a matter of perennial difficulty. The difficulty of design is increased by the requirement that faults in the operation of the encoding and decoding apparatus be easily diagnosable.

A final problem of disk drives is the fact that the presence of electrical noise in the system can result in disk codes which are obviously illegal. The encoding and decoding apparatus must deal with these illegal codes which neither decreases the quality of data made available to the rest of the computer system nor reduces overall system efficiency.

Some of these problems in the design of controllers and disk drives of the prior art and others as well are remedied by the present invention.

SUMMARY OF THE INVENTION

The present invention is logic circuitry in a disk drive which provides an interrupt signal and a power fail status indication to a controller when a disk drive being used by the controller has a power failure. The logic circuitry may be used in electronic apparatus other than disk drives to provide interrupt signals to a controller.

In the disk drive and controller system in which the present invention is used, the disk drive produces an interrupt by setting an internal interrupt state register in response to internal interrupt signals including a power fail signal which is active whenever a power failure occurs. The controller responds to the interrupt with an immediate status control instruction. In response to the control instruction, the disk drive provides a status code indicating, the current state of the disk drive. The controller then issues a reset control instruction. If a power failure is momentary, the internal interrupt state register is reset by the reset control instruction; however, if the power failure signal is still active or again active, the reset control instruction will not act to reset the interrupt state register and the interrupt will continue.

The status code returned in response to the immediate status command includes a bit indicating that a power failure has occurred. The value of this bit depends on the state of a flip-flop which is set by the power fail signal and reset when the disk drive receives a reset control instruction from the controller. If the power fail signal is no longer active, the reset control instruction resets the flip-flop; however, if the power failure signal is still active, it immediately sets the flip-flop again; thus, the status code will indicate a power failure in spite of the execution of the reset control instruction if the power failure signal is still active or again active.

It is thus an object of the invention to provide an improved digital data processing system incorporating disk drives.

It is a further object of the invention to provide improved control apparatus for use in disk drives.

It is another object of the invention to provide disk drive control apparatus which operates under control of a microprocessor.

It is a still further object of the invention to provide improved means for interrupting the controller when a power failure occurs in the disk drive control apparatus.

Other objects, advantages, and features of the present invention will be understood by those of ordinary skill in the art after referring to the following detailed description of the preferred embodiment and drawings, wherein:

BRIEF DESCRIPTION OF THE DRAWINGS

FIG. 1 depicts a digital data processing system including a disk drive containing the present invention.

FIG. 2 depicts data codes used in the digital data processing system including the present invention.

FIG. 3 represents disk codes used in the disk drive containing the present invention.

FIG. 4 represents the encoding of data codes into RLL disk codes.

FIG. 5 depicts the structure of disks and a disk set used in the disk drive containing the present invention.

FIG. 6 is a block diagram of the disk drive control apparatus of the present invention.

FIG. 7 is a detailed representation of the controller-disk bus connecting the disk drive control apparatus to the controller.

FIG. 8 represents a track sector on a disk of the disk drive containing the present invention.

Figure 9:
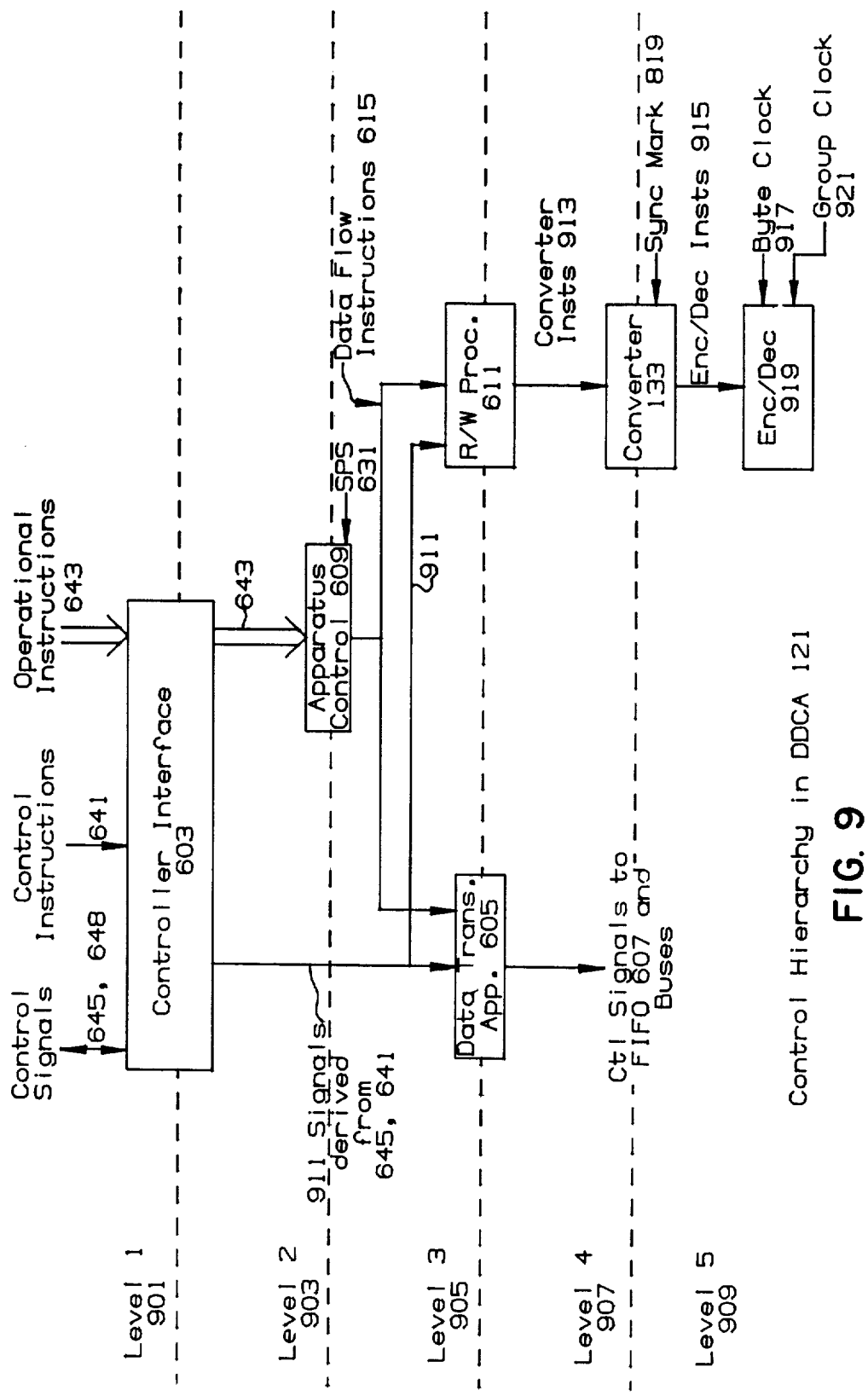

FIG. 9 is a diagram of the control hierarchy in the disk drive control apparatus of FIG. 6.

FIG. 10 is a block diagram of the components of the read/write processor in the disk drive control apparatus of FIG. 6.

FIG. 11 is a schematic representation of the read/write sequencer in the read-write processor of FIG. 10.

FIG. 12 is a schematic representation of the DPU timing generator in the read-write processor of FIG. 10.

FIG. 13 is a group of tables showing encoding and decoding operations performed by the read-write processor of FIG. 10.

FIG. 14 is a schematic representation of encoding and decoding logic in the read-write processor of FIG. 10.

FIG. 15 is a block diagram of apparatus control in the disk drive control apparatus of FIG. 6.

FIG. 16 is a schematic representation of logic in the controller interface of the disk drive control apparatus of FIG. 6 for performing the suspended reserve operation and for providing interrupts to the controller.

FIG. 16A is a schematic representation of logic circuitry in the controller interface of the disk drive control apparatus of FIG. 6 for providing an interrupt in the case of a power failure.

FIG. 16B is a schematic representation of logic circuitry in the controller interface of the disk drive control apparatus of FIG. 6 for providing interrupt signals to the controller.

FIG. 17 is a schematic representation of data transfer apparatus 605 of the disk drive control apparatus of FIG. 6.

Figure 18:
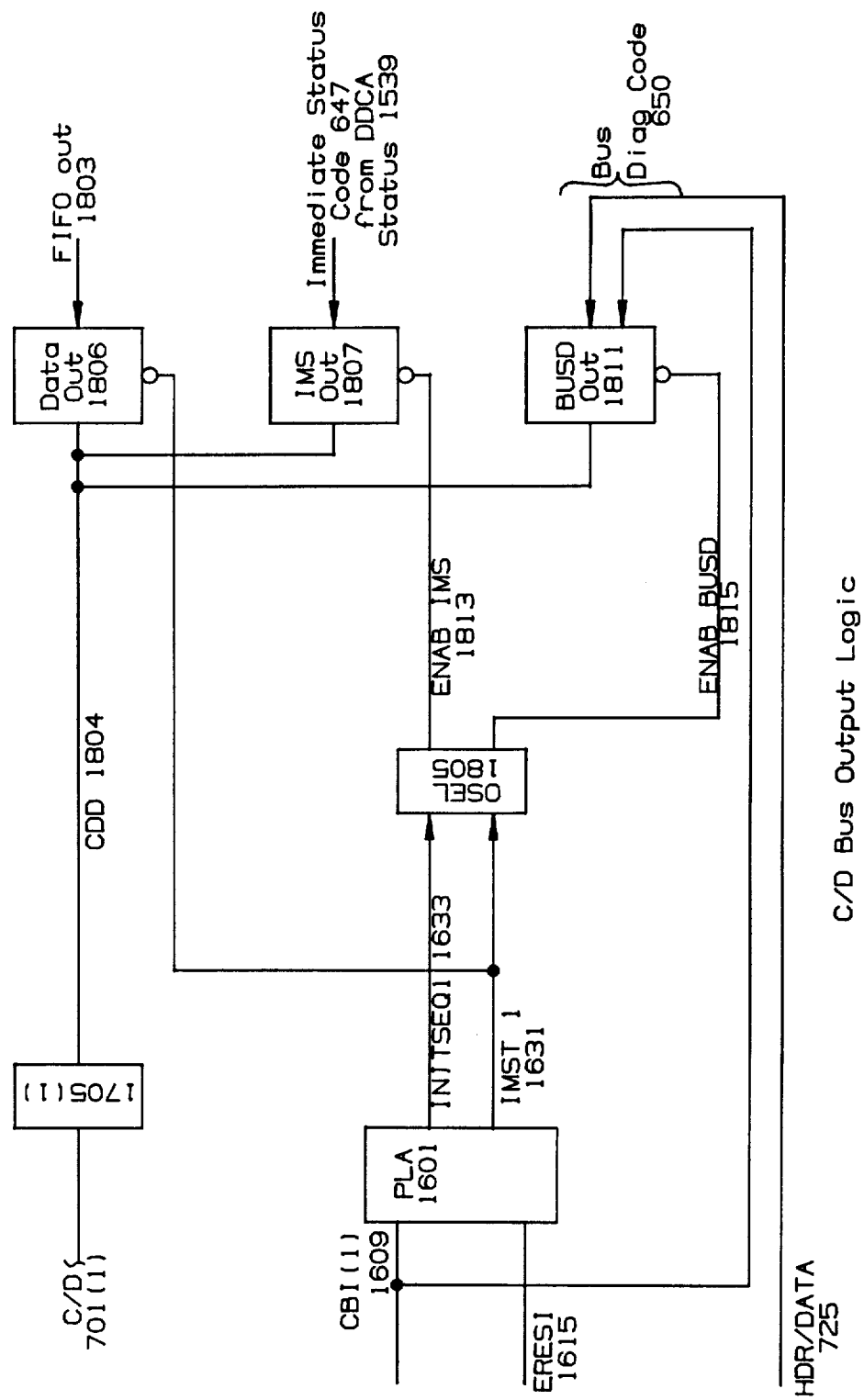

FIG. 18 is a schematic representation of the logic circuitry controlling outputs from the disk drive control apparatus of FIG. 6.

FIG. 19 is a block diagram of a present embodiment of a controller connected to the disk drive control apparatus of FIG. 6.

FIG. 19A is a detailed block diagram of the data processor in the controller of FIG. 19.

FIG. 19B is a detailed block diagram of the disk interface in the controller of FIG. 19.

Reference numbers in the following Description of the Preferred Embodiments have 3 or 4 digits; the leftmost one or two digits specify the figure number; the remaining digits specify the item in the figure specified by the first two digits.

DESCRIPTION OF THE PREFERRED EMBODIMENTS

The Description of the Preferred Embodiments begins with introductory discussions of digital data processing systems with disk drives and of the structure and operation of disk drives, then presents an overview of the structure and function of the present invention, and finally presents detailed discussions of certain components of a presently-preferred embodiment of the present invention.

1 Introduction

1.1 Digital Data Processing Systems with Disk Drives

All but the smallest modern digital data processing systems include a disk drive. The disk drive provides the digital data processing system with reasonably rapid access to a large amount of data stored in a non-volatile form. Components of the disk drive include one or more rotating disks coated with magnetic media, movable heads for writing data to or reading data from the magnetic media, and means for controlling the position of the heads on the disk. Since the magnetic media may be changed only by action of a magnetic field, the data on the disk is not lost when the digital data processing system loses power or is otherwise shut down. Because the heads are movable, data located anywhere on the disk may be accessed relatively rapidly.

1.1.1 Components of a Digital Data Processing System utilizing Disk Drives—FIG. 1

The principle components of a digital data processing system utilizing disk drives are one or more disk drives, one or more central processing units, and one or more controllers for controlling the disk drives. FIG. 1 provides an overview of a Digital Data Processing System 100 with a single central processor, a single controller, and one or more disk drives. System 100 includes as its central processor Host Processor 101, Controller 107, and Disk Drives 119(0) . . . 119(n). Processor-Controller Bus 111 connects Host Processor 101 with Controller 107, and Controller-Disk Bus 127 connects Controller 107 with Disk Drives 119(0) . . . 119(n). Host Processor 101 includes CPU 105, for processing data encoded in Data Codes 109 in response to programs consisting of instructions, and Memory 103, for storing Data Codes 109 being processed by CPU 105. In response to certain instructions, Host Processor 101 provides Controller Instructions 113 and Data Codes 109 to Controller 107 via Processor-Controller Bus 111 and receives Data Codes 109 and Controller Status 114 via the same bus.

Controller 107 includes Controller Memory 115, for storing Data Codes 109 in transit between Disk Drives 119(0) . . . 119(n), and Controller Processor 117. In response to Controller Instructions 113 from Host Processor 101, Controller Processor 117 provides Disk Drive Instructions 129 and Data Codes 109 from Controller Memory 115 to a selected Disk Drive 119(a) of Disk Drives 119(0) . . . 119(n) via Controller-Disk Bus 127 and receives Disk Drive Status 131 and Data Codes 109 from Disk Drive 119(a) via the same bus.

Each Disk Drive 119 includes Disk Drive Control Apparatus (DDCA) 121, which controls operation of Disk Drive 119 in response to Disk Drive Instructions 129, Disk 123, upon which data is stored in the form of Disk Codes 128, movable Head 125, which writes Disk Codes 128 to and reads them from Disk 123, and Servo Mechanism 124, which moves Head 125 under control of DDCA 121. DDCA 121 further includes Converter 133, which converts Data Codes 109 received from Controller 107 to Disk Codes 128 and Disk Codes 128 received from Disk 123 to Data Codes 109.

More complex configurations of System 100 than that shown in FIG. 1 are possible. For example, Several Host Processors 101 and Controllers 107 may share a set of Disk Drives 119(0 . . . n). In such a system, each Host Processor 101 is connected to a single Controller 107, but Disk Drives 119 may be connected to more than one Controller 107, and may thus be able to receive Data Codes 109 from or provide them to a set of Host Processors 101.

Further, Disk Drive 119 may contain more than one Disk 123 and Head 125. In such a Disk Drive 119, Disk Drive Control Apparatus 121 must select Head 125 required for Disk 123 containing the desired Disk Codes 128 and move that head to the proper location on Disk 123.

1.1.2 Operation of System 100

When Host Processor 101 executes instructions which store data on a Disk Drive 119(a) or requiring data stored on a Disk Drive 119(a) System 100 operates as follows: Host Processor 101 provides Controller 107 with Controller Instructions 113. Controller Instructions 113 specify the following:

(1) the kind of operation to be performed.
(2) a Disk Drive 119(a) of Disk Drives 119(0) . . . 119(n).
(3) locations at which Data Codes 109 which are to be written to Disk Drive 119(a) may be obtained or the locations to which Data Codes 109 obtained from Disk Drive 119(a) are to be returned.
(4) the location on Disk 123 of Disk Drive 119(a) to which Data Codes 109 are to be written or from which they are to be read.

In some read and write instructions, the locations at which Data Codes 109 are obtained or to which they are to be returned are registers in Host Processor 101; in others; they are locations in Memory 103.

Controller 107 then executes Controller Instructions 113. If Controller Instructions 113 specify Data Codes 109 in registers in Host Processor 101, Host Processor 101 outputs these Data Codes 109 to Controller 107 which places them in Controller Memory 115; if they specify locations in Memory 103, Controller 107 may itself fetch Data Codes 109 from Memory 103 to Controller Memory 115. Once Data Codes 109 are in Controller Memory 115, Controller 107 provides Data Codes 109 and Disk Drive Instructions 129 specifying a write operation to Disk Drive 119(a) specified in Controller Instructions 113. The Disk Drive Instructions 129 further specify the location on Disk 123 at which the write operation is to be performed. DDCA 121 of Disk Drive 119(a) responds to Disk Drive Instructions 129 by converting Data Codes 109 to corresponding Disk Codes 128 in Converter 133, causing Servo Mechanism 124 to move Head 125 to the proper location on Disk 123, and writing Disk Codes 128 at the proper time to place them in the physical location on Disk 123 specified by Disk Drive Instructions 129.

If Controller Instruction 113 specifies a read operation, Controller 107 provides Disk Drive Instructions 129 specifying the location of Disk Codes 128 on Disk 123 and a read operation. Disk Drive 119(a) responds to Disk Drive Instructions 129 by causing Servo Mechanism 124 to move Head 125 to the proper location on Disk 123, reading Disk Codes 128 at the proper time, converting Disk Codes 128 to Data Codes 109, and providing Data Codes 109 to Controller 107. Controller 107 stores Data Codes 109 received from Disk Drive 119(a) in Controller Memory 115 and then outputs them to Host Processor 101. Depending on how the location in which Data Codes 109 were to be stored was specified in Controller Instruction 113, Output may be to registers in CPU 105 or directly to locations in Memory 103.

In addition to performing the read and write operations described above, Controller 107 and Disk Drive 119 must coordinate the use of Disk Drives 119 by Host Processor 101 and detect and diagnose malfunctions. Coordination is achieved by means of Controller Status Signals 114 returned to Host Processor 101 and Disk Status Signals 131 returned to Controller 107. For example, if a Disk Drive 119(a) is currently engaged in an operation, it may provide a "Busy" Disk Status Signal 131 to Controller 107. Controller 107 may then return a "Busy" Controller Status Signal 114 to Host Processor 101 and issue a "Reserve" Disk Instruction 129 to Disk Drive 119(a) When Disk Drive 119(a) is finished with the current operation, it will then provide an "Interrupt" Status Signal 131 to Controller 107 which issued the "Reserve" Disk Instruction 129. On receipt of the "Interrupt" Status Signal 131, Controller 107 may issue a Disk Instruction 129 specifying a read or write operation. On completion of the operation, Controller 107 may provide an "Interrupt" Controller Status Signal 114 to Host Processor 101 indicating that the job is complete.

The degree of error detection and diagnosis accomplished by Controller 107 and Disk Drive 119 depends on the amount of independent processing capability available to them. At a minimum, Disk Drive 119(a) returns Disk Status 131 indicating a malfunction to Controller 107. If Controller 107 cannot deal with the malfunction or is itself malfunctioning, Controller 107 returns Controller Status 114 indicating a malfunction to Host Processor 101. Disk Status 131 and Controller Status 114 may indicate malfunctions with varying degrees of precision. If Controller 107 and Disk Drive 119 have sufficient independent processing capability, they may perform diagnostic operations to detect the precise location and nature of the malfunction and may report the results of th diagnostics operations to Host Processor 101.

1.2 Representing Data on a Disk Drive—FIGS. 2, 3, and 4

One of the primary operations performed by Disk Drive 119 is the conversion of Data Codes 109 into Disk Codes 128. The conversion is necessary because of differences between the computer memories used to store Data Codes 109 and the magnetic media used to store Disk Codes 128.

In a computer memory, Data Codes 109 are stored in memory words consisting of a fixed number of bits. All of the bits in a memory word may be set or read in parallel and the buses connecting memory with the processing units carry the data provided to or received from memory in parallel. In System 100, such buses include Processor-Controller Bus 111 and Controller-Disk Bus 126. FIG. 2 shows how a Data Code 109 appears on such a bus. The Data Code 109 in question is ASCII Code for 'M' 201, which consists of the sequence of 0's and 1's shown in FIG. 2. On the bus, each bit of Data Code 109 is carried on a separate line and voltage levels on the line indicate whether the value of the bit carried by the line is 1 or 0. In Data Code Representation 207, it is assumed that a high voltage corresponds to 1 and a low voltage to 0. Since each bit of Data Code 109 is carried on a separate line, individual bits can always be distinguished and sequences containing only 1 bits or only 0 bits pose no problem. In addition to the bits of Data Code 109, the bus may carry codes for detecting or correcting changes to Data Code 109 which may occur while Data Code 109 is on the bus. FIG. 2 includes as an example of such a code a one-bit Parity Code 205. Parity Code 205 is set when Data Code 109 is placed on the bus. Its value depends on whether Data Code 109 has an even or odd number of 1 bits. If a single bit of Data Code 109 changes its value while Data Code 109 is on the bus, Parity Code 205 has the wrong wrong value for the changed Data Code 109, and consequently, the fact that Data Code 109 has changed its value can be detected from the value of Parity Code 205. Other, more elaborate error codes may be employed which allow correction as well as detection of errors.

Disk Codes 128 also consist of sequences of 1's and 0's. As shown in FIG. 3, a 1 is represented by a magnetic flux change and a 0 by a lack of a magnetic flux change. As shown in Representation of 1 301, the direction of the flux change is immaterial for the representation of 1, and as shown by Representation of 0 303, the polarity of the magnetic media is immaterial for the representation of 0. Disk Codes 128 are written and read serially: on a write operation, as Disk 123 rotates beneath Head 125, Head 125 changes flux in response to a 1 in Disk Code 128 being written to Disk 123 and thereby causes a flux change in the magnetic media of Disk 123; on a read operation, Head 125 detects flux changes in the magnetic media as Disk 123 rotates and thus detects 1's in Disk Code 128 on the disk. On the write operation, Converter 133 converts the parallel Data Codes 109 received from Controller 107 to serial Disk Codes 128, and on the read operation, Converter 133 performs the reverse conversion.

Since 1's are represented by flux changes, and lack of flux changes, a sequence consisting solely of 1's consists solely of flux changes and one consisting solely of 0's consists of a region having no flux changes. Such sequences present serious problems for the designers of Disk Drives 119. Most Disk Drives 119 use the periodic appearance of flux changes on Disk 123 to synchronize operations; if a long sequence consisting solely of 0's is encountered, synchronization is no longer possible. Further, sequences consisting solely of 1's determine the maximum density of data on Disk Drive 119. If the individual 1's in such a sequence are to be distinguished from one another on writing or reading, each one must occupy an amount of space in the magnetic media corresponding to the distance which passes under Head 125 while Head 125 is undergoing or detecting a complete flux change.

The above problems have been solved by the use of Disk Codes 128 in which the length of a sequence of 0's is limited and adjacent 1's never appear. Thus, flux changes always appear often enough to permit synchronization and part of the distance required by Head 125 to undergo a complete flux change may be occupied by the 0's adjacent to the 1's. In Systems 100 using such Disk Codes 128, Converter 133 must also convert Data Codes 109 which allow adjacent 1's and unlimited numbers of 0's to Disk Codes 128 such as those just described. One set of such Disk Codes 128 is termed an RLL (2-8) Code. This code will be explained in detail later; here, it is used only to illustrate how Data Codes 109 are converted to Disk Codes 128. FIG. 4 gives an overview of the conversion of ASCII Code for 'M' 201 to its representation in 2-8 RLL Code. In 2-8 RLL Code, each two-bit Data Code Group 403 of Data Code 109 is represented as a three-bit RLL Code Group 405. The value of a given RLL Code Group 405 depends on the values of Data Code Groups 403 preceding the one being converted and Data Code Group 403 following the one being converted. RLL 2-8 Code for 'M' 401 shows one possible RLL 2-8 code encoding for ASCII Code for 'M' 201. As may be seen there, 1's no longer occur in sequence, and the maximum sequence of 0's is 6. The flux change representation of the RLL 2-8 Code for 'M' is presented at 407.

1.3 Locating Data on Disk 123—FIG. 5

Each Disk 123 is structured in such a fashion that it is possible to locate data on Disk 123; if there is more than one Disk 123 in a Disk Drive 119, the set of Disks 123 is structured so that it is possible to locate data on a single Disk 123 of the set. FIG. 5 shows this structure for both a single Disk 123 and a Disk Set 507. Disk 123 contains a large number of concentric Tracks 501; the disk is further divided radially into a large number of Sectors 503; the portion of a Track 501 in a given Sector 503 is Track Sector 504. A Track Sector 504 containing a given sequence of Disk Codes 128 making u Data Item 502 may thus be located by specifying a Track 501 (a) and a Sector 503(f). That Track Sector 504 may be termed Track Sector 504(a,f).

DDCA 121 performs a read or write operation on Track Sector 504(a,f) in two steps. DDCA 121 first performs a seek operation, in which it positions Head 125 over the Track 501 (a). When the seek operation is complete, DDCA 125 locates Sector 503(f) by counting Sectors 503. When Head 125 passes over the beginning of Sector(0) 503, Disk Drive 119 generates an index pulse; as Head 125 passes over the beginning of each succeeding Sector 503, Disk Drive 119 generates a sector pulse. By counting sector pulses after receiving an index pulse, DDCA 121 can locate Sector 503(f). When Sector 503(f) has been located, Head 125 performs a read or write operation in that Sector 503. Since Head 125 is over Track 501(a), it is Track Sectore 504(a,f) which is read or written. In the read operation, the entire contents of Track Sector 504(a,f) are read; in the write operation, the entire contents of Track Sector 504(a,f) are written. In the case of the read operation, the data in Track Sector 504(a,f) is transferred to Controller 107 and from there to Host Processor 101. The program which caused Host Processor 101 to fetch Data Item 502 from Disk Drive 119 knows the relative location of Data Item 502 in the data fetched from Track Sector 504(a,f), and can therefore locate Data Item 502 in that data.

In Disk Set 507, corresponding Tracks 501 on surfaces of Disks 123 in Disk Set 507 make up a Cylinder 509. Thus, Track 501(a) on each of Disks 123 belongs to Cylinder 509 (a). Each surface of each Disk 123 has a separate Head 125, and thus, the location of a given Track Sector 504 in Disk Set 507 may be specified by means of a sector number, a cylinder number, and a head number. For example, Track Sector 504(a,f) might be on the top surface of the third disk in Disk Set 507. In that case, it would be on Cylinder 509(a) and Disk Sector 503(f) and would be read or written by Head 125(4). Its location could therefore be specified as Track Sector 504(a,f,4) In Disk Set 507, the seek operation consists of moving all of Heads 125 in Disk Set 507 to the specified Cylinder 509. In the read and write operations, Sectors 503 are counted as described above until the specified Sector 503 is reached, and then Head 125 for Disk 123 containing the required Track Sector 504 is activated as required for the read or write operation. Certain Tracks 501 on Disk Set 507 are diagnostic tracks. These tracks are not available for the storage of data, but are used solely by DDCA 121 for diagnostic operations.

2 Overview of Structure and Operation of Disk Drive Control Apparatus 121 of the Present Invention Having thus provided an overview of the structure and operation of Digital Data Processing System with Disk Drives 100, the discussion proceeds to an overview of the structure and operation of Disk Drive Control Apparatus 121 of the Present Invention.

2.1 Structure of Disk Drive Control Apparatus 121—FIG. 6

FIG. 6 provides an overview of the structure of Disk Drive Control Apparatus (DDCA) 121 of the present invention. DDCA 121's components may be divided into four major functional groups: Controller Interface 603, Apparatus Control 609, R/W Processor 611, and Data Transfer Apparatus 605. Controller Interface 603 receives Data Codes 109 and Disk Drive Instructions 129 from Controller 107 via via Controller-Disk Bus 127 and provides Data Codes 109 and Status Codes 131 via Controller-Disk Bus 127 to Controller 107. Data Transfer Apparatus 605 transfers Data Codes 109 and parts of Disk Drive Instructions 129 between components of DDCA 121. R/W Processor 611 performs the read and write operations. Converter 133 converts Disk Codes 128 to Data Codes 109 and vice-versa under control of R/W Processor 611.

Apparatus Control 609 controls operation of the other components of DDCA 121 in response to parts of Disk Drive Instructions 129. Control is provided in two different fashions: First, Apparatus Control 609 provides Flow Control Instructions 615 t Data Transfer Apparatus 605 and to R/W Processor 611. Second, Apparatus Control 609 provides status signals via DDCA Status Signals (DDCAS) 620 to all components of DDCA 121.

Data Transfer Apparatus 605 responds to two different kinds of Flow Control Instructions 615: Data Transfer Flow Control Instructions 615, which are responded to only by Data Transfer Apparatus 605, and Read Write Flow Control Instructions 615, which are responded to by both Data Transfer apparatus 605 and Read-Write Processor 611. The effect of both kinds of Flow Control Instructions 615 on Data Transfer Apparatus 605 is to determine the direction in which Data Transfer Apparatus 605 transfers data. Transfer may be between Controller Interface 603 and Apparatus Control 609, between Controller Interface 603 and R/W Processor 611, and between Apparatus Control 609 and R/W Processor 611.

R/W Processor 611 responds to Read-Write Flow Control Instructions 615 by reading Disk Codes 128 from Disk 123 and converting them to Data Codes 109, performing the reverse operation, and by performing certain diagnostic operations. Data Transfer Apparatus 605 responds to Read-Write Flow Control Instructions 615 by transferring Data Codes 109 in the direction required for the operation being performed by Read-Write Processor 611. Controller Interface 603 responds to certain signals of DDCAS 620 by providing Status 131 to Controller 107.

Operation of DDCA 121 may in general be described as follows: when DDCA 121 is idling, Data Transfer Apparatus 605 is set to transfer data between Controller Interface 603 and Apparatus Control 609. On receipt of a Disk Drive Instruction 129 in Controller Interface 603, Data Transfer Apparatus 605 receives a part of that Disk Drive Instruction 129 and provides a signal in DDCAS 620 to Apparatus Control 609. Apparatus Control 609 responds to the signal by receiving the portion of Disk Drive Instruction 129 from Data Transfer Apparatus 605. Apparatus Control 609 then responds to the portion of the instruction by providing Flow Control Instructions 615 to Data Transfer Apparatus 605 and R/W Processor 611 and DDCAS 620 to Controller Interface 603 as required to carry out the operation.

2.1.1 Controller Interface 603

Turning now to the components of DDCA 121, Controller Interface 603 receives inputs from and provides outputs to Controller-Disk Bus 127. In a present embodiment of DDCA 121, Controller Interface 603 may be connected to two different Controller-Disk Buses 127, designated here by 127(1) and 127(2), and may thus provide outputs to two different Controllers 107. In other embodiments of DDCA 121, Controller Interface 603 may provide connections for larger or smaller numbers of Controller-Disk Buses 127. As will be explained in more detail hereinafter, Controller Interface 603 further contains logic for determining the order in which the Controllers 107 connected to Controller Interface 603 shall use Disk Drive 119 and logic for providing an interrupt signal to Controller 107 in response to a power fault signal on PWR FLT 638.

Inputs from Controller-Disk Bus 127 include the following:
(1) Data Codes 109 to be stored on Disk Drive 119 containing DDCA 121.
(2) Disk Instructions 123, which in the present invention include
 (a) Control Instructions 641 to DDCA 121.
 (b) Operational Instructions 643 to DDCA 121.
 (c) Disk Control Signals 645 to DDCA 121.

Each Control Instruction 641 places DDCA 121 in one of a set of states. As will be explained in more detail below, DDCA 121 responds to certain Control Instructions 641 at any time and to others only when Controller 107 has the use of Disk Drive 119. In these latter states, DDCA 121 performs operations in response to Operational Instructions 643; during these operations, Disk Control Signals 645 coordinate the activity of DDCA 121 and Controller 107. In a present embodiment, Control Instructions 641 contain 3 bits and Operational Instructions 643 contain one or more 8-bit syllables.

Outputs include:
(1) Data Codes 109 from Disk Drive 119 containing DDCA 121 or from DDCA 121.
(2) Status 133, which in the present invention includes
 (a) Immediate Status Codes 647 from which Controller 107 may determine the current status of Disk Drive 121;
 (b) Bus Diagnostic Codes 650, from which Controller 107 may determine whether Controller-Disk Bus 127 is functioning properly.
 (c) Interrupt Signals 649 to Controller 107.
 (d) Controller Control signals 648.

Data Codes 109 may represent either data stored on Disk Set 507 or diagnostic data produced by DDCA 121 in response to certain Operational Instructions 643; Immediate Status Codes 647 ar produced from DDCAS 620 received from Apparatus Control 609 and are output in response to an Immediate Status Control Instruction 641. Bus Diagnostic Codes 650 are output only when Controller-Disk Bus 127 is in diagnostic mode. Interrupt Signals 649 are produced by Controller Interface 603 in response to signals in DDCAS 620 or from PWR FLT 638 when DDCA 121 requires intervention by Controller 107 to continue an operation. Controller Control Signals 648 serve to coordinate operation of DDCA 121 and Controller 107 when Controller 107 is receiving data from DDCA 121.

2.1.2 Data Transfer Apparatus 605

Data Transfer Apparatus 605 transfers Data Codes 109 and Operational Instructions 643 between the components of DDCA 121. During execution of an Operational Instruction 643, direction of data transfer by Data Transfer Apparatus 605 is determined by Flow Control Instructions 615 provided by Apparatus Control 615.

Data transferred by Data Transfer Apparatus 605 is input to and output from FIFO 607. FIFO 607 is a first-in, first-out buffer which may be simultaneously written to and read from. Data written to FIFO 607 is written to the tail of the queue contained in the buffer; data read from FIFO 607 is read from the head of the queue. FIFO 607 provides signals to Apparatus Control 609 via DDCAS 620 when the queue is empty, contains data, or is full. Data Transfer Apparatus 605 transfers items of data between components of DDCA 121 by placing items received from the source of the data being transferred in the tail of the queue and providing items to the destination of the data being transferred from the head of the queue. For example, during a read operation, Data Transfer Apparatus 605 adds Data Codes 109 received from R/W Processor 611 to the tail of the queue in FIFO 607 and provides Data Codes 109 to Controller Interface 603 from the head of the queue in FIFO 607.

What data is transferred by Data Transfer Apparatus 605 and the sources and destinations of that data depend on Operational Instruction 643 being executed by Apparatus Control 609. As will be explained in more detail hereinafter, Operational Instructions 643 are divided into two broad categories: instructions for normal operations and instructions for diagnostic operations. Execution of both categories of instructions begins with the transfer of syllables of Operational Instruction 643 from Controller Interface 603 to Apparatus Control 609; during execution of a normal read instruction, Data Transfer Apparatus 605 transfers Data Codes 109 from Read-Write Processor 611 to Controller Interface 603; during execution of a normal write instruction, the reverse transfer occurs. During diagnostic operations, Data Transfer Apparatus 605 may transfer Data Codes 109 between Controller Interface 603 and Apparatus Control 609 or between R/W Processor 611 and Apparatus Control 609. Numbers attached to branches of Data Transfer Apparatus 605 indicate which items go to and from which components.

2.1.3 R/W Processor 611

R/W Processor 611 operates in response to Read-Write Flo Control Instructions 615 from Apparatus Control 609. In normal operation and most diagnostic operations, R/W Processor 611 reads data from Disk 123 and provides it to Data Transfer Apparatus 605 or receives data from Data Transfer Apparatus 605 and writes it to Disk 123. In certain diagnostic operations, R/W Processor 611 receives data from Data Transfer Apparatus 605, processes it, and returns it to Data Transfer Apparatus 605 without writing to or reading from Disk 123. Status of R/W Processor 611 is part of DDCAS 620.

All operations of R/W Processor 611 involve conversion of of Data Codes 109 to Disk Codes 128 or vice-versa. These conversions are performed by Converter 133, which operates under control of R/W Processor 611. Operation of R/W Processor 611 is synchronized with rotation of Disk Set 507 by means of RWCK 629, which provides a clock signal responsive to speed of rotation of Disk 123, Sector Pulse Signal (SPS) 631, which is received from Disk 123 at the beginning of a sector, and RWCTL 630, which causes Head 125 selected by Apparatus Control 609 to perform either a read or a write operation. Apparatus Control 609. In the write operation, R/W Processor 611 detects the beginning of Track Sector 504 which is to receive the data, obtains Data Codes 109 representing the data from the head of the queue in FIFO 607, converts the Data Codes 109 to Disk Codes 128 in Converter 133, and provides Disk Codes 128 to Head 125. In the read operation, the reverse occurs. The data, converted from Disk Codes 128 to Data Codes 109 by Converter 133, is placed at the tail of the queue in FIFO 607.

2.1.4 Apparatus Control 609

In response to Operational Instructions 643 from Controller 107, Apparatus Control 609 directly controls Servo Mechanism 124 and provides Flow Control Instructions 615 to Data Transfer Apparatus 605 and R/W Processor 611 via FCI Bus 616. Direct control of Servo Mechanism 124 is achieved by means of HPS Signals 639. In response to these signals, Servo Mechanism 124 moves Heads 125 to move to Cylinder 509 and select Head 125 as specified in the Operational Instruction 643 being executed. Apparatus Control 609 further detects the index pulse from Sector 503(0) and counts Sector Pulse Signals (SPS) 631 generated each time Head 125 passes over the beginning of a Track Sector 504. Before Track Sector 504 specified in Operational Instruction 643 is reached, Apparatus Control 609 provides Flow Control Instructions 615 to Data Transfer Apparatus 605 and R/W Processor 611 at the proper time to perform the operations specified by Operational Instruction 643.

Apparatus Control 609 further receives DDCAS 620 from components of DDCA 121 and provides DDCAS 620 to components of DDCA 121. By means of DDCAS 620, Apparatus Control 609 may monitor the condition of DDCA 112, provide Status Codes 647 to Controller Interface 603 for output to Controller 107, and reset state in components of DDCA 112. Apparatus Control 609 further executes diagnostic Operational Instructions 643 using components of DDCA 121.

2.1.5 Coordination of Operation of Components of DDCA 121

While Apparatus Control 609 provides overall control of DDCA 121, Apparatus Control 609 cannot respond rapidly enough to provide coordination of components of DDCA 121 during data tansfer operations on Disk Drive 119. Hence, the type of operation performed by the components and the direction of data transfer are determined by Apparatus Control 609, but the actual transfer is regulated by means of signals passing directly between the components. Interface-FIFO Control (INTFCTL) 623 regulates transfer of data between Controller Interface 603 and FIFO 607; R/W-FIFO Control (R/WFCTL) 62 performs the analogous function for FIFO 607 and R/W Processor 611; INT/RWCTL 627, permits direct coordination between R/W Processor 611 and Controller Interface 603; AFCTL 621, finally, allows Apparatus Control 609 to directly control direction of data transfer by Data Transfer Apparatus 605 during operation of Apparatus Control 609.

2.2 Overview of Operation of DDCA 121

Operation of DDCA 121 is determined by Control Instructions 641, Operational Instructions 643, and signals from Controller 107 and by signals produced by Track Sector 504 on Disk 123. Controller 107 further issues Control Instructions 641 and Operational Instructions 643 in response to Immediate Status Codes 647; thus, before discussing operation of DDCA 121, it is necessary to explain the structure of Controller-Disk Bus 127 and Track Sector 504 and the meaning of Immediate Status Codes 647 in a present embodiment of DDCA 121. These explanations are however of a purely exemplary nature; other embodiments of DDCA 121 may employ Controller-Disk Buses 127 having different structures, may respond to differently-structured Track Sectors 504, and may return different Immediate Status Codes 647.

2.2.1 Structure of Controller-Disk Bus 127—FIG. 7

FIG. 7 shows the structure of Controller-Disk Bus 127. Unless otherwise specified, each line in FIG. 8 carries 1 bit. The direction of flow is specified by the words Controller 107 at the left of the drawing and Disk Drive 119 at the right and the letters D and R, indicating driving and receiving. Thus, Dev Select1 707 is always driven by Controller 107 and received by Disk Drive 119, while while C/D Parity 703 may be driven or received by either Controller 107 or Disk Drive 119.

Beginning with C/D Bus 701, C/D Bus 701 is 8 bits wide. It carries four kinds of data:
(1) syllables of Operational Instructions 643 to DDCA 121;
(2) Data Codes 109 to and from DDCA 121;
(3) Immediate Status Codes 647 from DDCA 121;
(4) Bus Diagnostic Codes 650 from DDCA 121.

Whether DDCA 121 is to treat data received on C/D Bus 701 as a syllable of an Operational Instruction 643 is determined by a signal on C/D MD SEL 723 from Control 107. C/D Parity 703 carries Parity Code 205 for Data Codes 109 and Operational Instructions 643 transferred via C/D Bus 701.

CONTG Bus 705 is three bits wide. It carries Control Instructions 641 from Controller 107 to DDCA 121. DDCA 121 responds to these Control Instructions 641 only when C/D MD SEL 723 indicates a command. For the present discussion, only the following Control Instructions 641 are of interest:
(1) Reserve, which reserves Disk Drive 119 for Controller 107 connected to Controller-Disk Bus 127; Controller 107 may provide a Reserve Control Instruction 641 to Disk Drive 119 whenever it is not using Disk Drive 119.
(2) Initiate Sequence In, which initiates an operation in which Disk Drive 119 provides data from Apparatus Control 609 to Controller 107. Controller 107 can only provide an Initiate Sequence In Control Instruction 641 after it has reserved Disk Drive 119.
(3) Initiate Sequence Out, which initiates an operation in Controller 107 provides data including Operational Instructions 643 to Apparatus Control 609. Controller 107 can only provide an Initiate Sequence Out Control Instruction 641 after it has reserved Disk Drive 119.
(4) Immediate Status, to which Disk Drive 119 responds by outputting an Immediate Status Code 647 on C/D Bus 701 mation to Controller 107 connected to Controller-Disk Bus 127; Controller 107 may provide an Immediate Status instruction at any time to Disk Drive 119.
(5) Release, which releases Disk Drive 119 for use by another Controller 107 connected to Controller-Disk Bus 127. Release has an effect only if Controller 107 had previously reserved Disk Drive 119.
(6) Reset, to which Disk Drive 119 responds by attempting to reset its internal state so that it can again execute an Operational Instruction 643.

DEV SELECT1 707 and DEV SELECT2 709 together carry a two-bit code which selects one of the four Disk Drives 119 which may be connected to Controller 107 in a present embodiment of System 100. A given Disk Drive 119 does not respond to Controller-Disk Bus 127 unless the two-bit code specifes that Disk Drive 119.

CON STB/ACK-RET BYT STB 711 carries a signal from Controller 107 to DDCA 121 indicating that data from Controller 107 is present on C/D Bus 701. DISK STB/ACK-BYT STB carries a signal from DDCA 121 to Controller 107 indicating that data from Disk Drive 119 is present on C/D Bus 701. DEV0 INT REQ through DEV3 INT REQ are interrupt lines for each of the four Disk Drives 119 attached to Controller-Disk Bus 127. DDCA 121 in a given Disk Drive 119 provides interrupts to Controller 107 only on DEV INT REQ corresponding to DDCA 121's Disk Drive 119. C/D MD SEL 723 was explained in connection with C/D Bus 701 above; HDER/Data 725 is a signal from Controller 107 to DDCA 121 indicating whether DDCA 121 may read from or write to Sector Data 811.

Relating the above lines to FIG. 6, Disk Control Signals 645 include DEV SELECT1 707, DEV SELECT2 709, CON STB/ACK 711, C/D MD SEL 723, and HDER/DATA 725. Controller Control Signals 648 include DISK STB/ACK 713, DEV0 INT REQ 716, DEV1 INT REQ 719, DEV2 INT REQ 719, and DEV3 INT REQ 721.

2.2.2 Detailed Structure of Track Sector 504—FIG. 8

FIG. 8 shows the structure of a single Track Sector 504. Track Sector 504 is preceded by Sector Data 811 from the preceding Track Sector 504. Then comes Sector Splice 813, which separates Track Sector 504 from the preceding Track Sector 504. SPS 631 is produced as Heads 125 pass over Sector Splice 813. Sector Preamble 818 contains Disk Codes 128 which specify the beginning of a Track Sector 504. Header Preamble 817 contains Disk Codes 128 which specify that the following item is Header 821, containing information used to determine whether Track Sector 504 is defective. In a present embodiment, the information contained in Header 821 includes the numbers of Head 105, Disk Cylinder 509, and Disk Sector 503 which define the location of Track Sector 504 and a checksum code. Header 821 further contains Sync Mark 819, which contains a synchronization code used by DDCA 121 to synchronize its operations. Data Preamble 818 contains Disk Codes 128 which specify that the following items are data, and Sector Data 811 contains Disk Codes 128 representing data stored in Sector Data 811. Sector Data 811, like Header 821, begins with a Sync Mark 819.

2.2.3 Immediate Status Codes 647 for DDCA 121

In a present embodiment of DDCA 121, DDCA 121 returns an Immediate Status Code 647 to Controller 107 via C/D Bus 701 in response to an Immediate Status Control Instruction 641 on CONTG Bus 705 and a code on DEV SELECT1 707 and DEV SELECT2 specifying Disk Drive 119 containing DDCA 121. The Immediate Status Control Instruction 641 may be issued at any time by Controller 107, and Controller 107 may thus determine the status of Disk Drive 119 even when another controller 107 is using it.

Immediate Status Code 647 contains 8 bits, which specify the following:
* Bits 0 and 1: Device code, a 2-bit code specifying which Disk Drive 119 is returning the status code.
* Bits 2 and 3: Reserve code, a 2-bit code specifying which Controller 107, if any, has reserved Disk Drive 119.
* Bit 4: Busy, specifying whether Disk Drive 119 is busy, i.e., presently carrying out an operation.
* Bit 5: Ready, specifying that Disk Drive 119 has successfully powered up or been reset and is again ready to perform operations.
* Bit 6: Power fail, specifying that power to Disk Drive 119 has failed.
* Bit 7: Transfer failed: the last tranfer of data between Disk Drive 119 and Controller 107 failed.

The current values of the bits in Immediate Status Codes 647 ar derived from signals in DDCAS 620.

2.2.4 Operation of DDCA 121

The following discussion of the operation of DDCA 121 will first describe how Controller 107 gains access to Disk Drive 119 containing DDCA 121, will then describe the New Block Operation, in which DDCA 121 transfers Data Codes 109 to and from Disk Set 507, and will finally describe diagnostic operations performed by DDCA 121.

2.2.4.1 Using Disk Drive 119

As previously described, in a present embodiment of System 100, Controller 107 may be connected to as many as 4 Disk Drives 119. When Controller 107 wishes to use one of the four, it places C/D MD SEL 723 in the state specifying a command, specifies the desired Disk Drive 119 on DEV SELECT1 707 and DEV SELECT2 709, and places an an Immediate Status Control Instruction 641 on CONTG Bus 705. If the specified Disk Drive 119 is in an operational condition, as indicated by bits 6 and 7 of Immediate Status 647, Controller 107 places a Reserve Control Instruction 641 on CONTG Bus 705. Controller Interface 603 of DDCA 121 for Disk Drive 119(a) responds to the Reserve Control Instruction 641 with an interrupt on the device interrupt line of DEV0 INT REQ 715 through DEV3 INT REQ 721 corresponding to Disk Drive 119(a). In the following discussion, the device interrupt line corresponding to Disk Drive 119(a) will be termed DEV(a) INT REQ. On receipt of the interrupt signal on DEV(a) INT REQ, Controller 107 issues an Immediate Status Control Instruction 641 to determine why the interrupt from Disk Drive 119(a) occurred. If examination of the reserve code in the first two bits of Status Code 647 returned to Controller 107 in response to Immediate Status Control Instruction 641 reveals that Disk Drive 119(a) is now reserved for Controller 107, Controller 107 may initiate an operation involving an Operational Instruction 643.

Some delay may ensue between the time Reserve Control Instruction 641 is issued to Disk Drive 119(a) and the time that an interrupt occurs on DEV(a) INT REQ. This is a consequence of the fact that Disk Drive 119(a) may be shared by two Controllers 107. If Disk Drive 119(a) is serving neither Controller 107 when Reserve Control Instruction 641 is issued, the interrupt signal will occur immediately; if Disk Drive 119(a) is serving the other Controller 107, the effect of the reserve operation is suspended until the other Controller 107 is finished and the interrupt signal will not occur until then.

2.2.4.2 Execution of Operational Instructions 643 by DDCA 121

Afrer receiving the interrupt, Controller 107 specifies Disk Drive 119(a) on DEV SELECT1 707 and DEV SELECT2 709, places C/D MD SEL 723 in command mode, places an Initiate Sequence Out Control Instruction 641 on CONTG Bus 705, depending on the direction of data transfer, and places the first syllable of Operational Instruction 643 specifying the desired operation of DDCA 121 on C/D Bus 701.

In response to the above signals, Controller Interface 603 provides the first syllable of Operational Instruction 643 to Data Transfer Apparatus 605. When Apparatus Control 609 is not executing an Operational Instruction 643, it executes an idle loop and Data Transfer Apparatus 605 is set to transfer the data it receives from Controller 107 to Apparatus Control 609. On each iteration of the idle loop, Apparatus Control 609 checks DDCAS 620 to see whether FIFO 607 has received data. When FIFO 607 receives the first syllable of Operational Instruction 643, FIFO 607 provides a signal indicating that it has data to DDCAS 620 and Apparatus Control 609 by providing signals via ACFCTL 621 which cause FIFO 607 to output the data to Apparatus Control 609. Controller 107 continues transferring syllables of Operational Instruction 643 to DDCA 121 until it has transferred all of the syllables. Apparatus Control 609 receives Operational Instruction 643 and begins to execute it. When DDCA 121 is ready to perform the operation specified in Operational Instruction 643, it provides a signal on DEV(a) INT REQ to Controller 107. If the operation involves the transfer of Data Codes 109 between Disk 123 and Controller 107, Controller 107 changes C/D MD SEL 723 from command to data mode when Controller 107 is ready to transfer or receive data and the data transfer begins. At the end of the transfer, Controller 107 changes C/D MD SEL from data to command mode, signalling thereby to DDCA 121 that the operation is over. If the operation involves transfer of data between Controller 107 and DDCA 121 instead of Disk 123, C/D MD SEL remains in command mode and Controller 107 provides an Initiate Sequence Out Control Instruction 641 during transfers from Controller 107 to DDCA 121 and an Initiate Sequence In Control Instruction 641 during transfers from DDCA 121 to Controller 107. If Controller 107 has further operations to perform, it issues other Operational Instructions 643 as described above; when it has finished all of the operations, it provides a Release Control Instruction 641 to DDCA 121.

The Operational Instruction 643 used to transfer Data Codes 109 to or from Disk Drive 119 is the New Block Instruction; other Operational Instructions 643 are solely diagnostic. In the following, first the New Block Operational Instruction 643 and then the Diagnostic Operational Instructions 643 will be described.

2.2.4.2.1 Operation of DDCA 121 under Control of New Block Operational Instruction 643

Controller 107 issues a New Block Operational Instruction 643 (henceforth termed New Block) when Data Codes 109 are to be transferred to or from Disk 119(a). An Initiate Sequence Out Control Instruction 641 must be issued with New Block, C/D MD SEL 723 must specify a command, and HDER/DATA line 725 must specify a header.

New Block consists of four eight-bit syllables:
(1) The first syllable contains a four-bit opcode and the four most significant bits of the cylinder address specifying Cylinder 509 from which or to which data is to be written. The opcode specifies one of four operations:
* A seek only operation which locates only Cylinder 609;
* A read operation
* A write opeation
* A format operation which writes only Headers 817.
(2) The second syllable contains the 8 least significant bits of the cylinder address.
(3) The third syllable is the number of Track Sector 504 at which the read or write operation is to begin.
(4) In the fourth operand the first four bits control current in Head 125; the second four bits selects Head 125 which is to perform the read or write operation.

In the following, only the read operation will be discussed in detail; the same general principles apply to all operations performed by NEW BLOCK and the other operations will be understood by those of ordinary skill in the art from the discussion of the read operation.

2.2.4.2.1.1 NEW BLOCK Specifying a Read Operation

Apparatus Control 609 responds to NEW BLOCK specifying a read operation as follows: first, it generates signals via HPS 639 which cause Heads 125 to seek Cylinder 509 specified by the cylinder address in New Block; then it activates Head 125 specified by the last 4 bits of the instruction's last syllable. When the seek operation is finished, Apparatus Control 609 provides signals in DDCAS 620 to Controller Interface 603 to which Controller Interface 603 responds by setting Status Code 647 to indicated that the seek is complete and generating an interrupt signal on the line of DEV INT REQ lines 715–721 corresponding to Disk Drive 119 and waits for Controller 107 to indicate that it is ready to send or receive Data Codes 109 by changing the state of C/D MD SEL 723 to indicate data.

In response to the change of state of C/D MD SEL 723, Apparatus Control 609 waits until a sector counter internal to Apparatus Control 609 indicates that indicates that the next Track Sector 504 will be the one specified in New Block. At that point, Apparatus Control 609 outputs a Read-Write Flow Control Instruction 615 specifying that R/W Processor 611 perform a read operation and that Data Transfer Apparatus 605 transfer data from R/W Processor 611 to Controller Interface 603. Thus, when R/W Processor 611 begins performing the read operation, FIFO 607 will receive Data Codes 109 from R/W Processor 611 in response to signals on R/W FCTL 625 and output them to Controller Interface 603 in response to signals on INTFCTL 623.

On the next SPS 631, specifying the beginning of the desired Track Sector 504, R/W Processor 611 begins reading Disk Codes 128. When it detects Disk Code 128 specifying Sync Mark 819, it outputs an instruction to Converter 133 to begin converting Disk Codes 128 to Data Codes 109. These codes are then output to FIFO 607, which receives them from R/W Processor 611 and outputs them to Controller Interface 603 in response to signals on R/W FCTL 625. Controller Interface 603 in turn outputs them to Controller 107 together with signals on DISK STB/ACK-BYT STB 713. The first Disk Codes 128 read by R/W Processor 611 belong to Header 821. When Controller 107 receives these Disk Codes 128, Controller Processor 117 performs a header compare operation to check the validity of the header. In the header compare operation, Controller 107 compares the values specifying Head 105, Cylinder 509, and Sector 503 received from Header 821 with the expected values for Track Sector 504 being read. If the values are the same and the checksum code is correct, Header 821 sets HDER/DATA Line 725 to indicate that Disk Drive 119 may begin reading Sector Data 811. If HDER/DATA Line 725 is not so set, R/W Processor 611 suspends the read operation, i.e, it does not respond to Sync Mark 819 preceding Sector Data 811. If a sequence of more than one Track Sector 504 is being read, R/W Processor 611 does respond to Sync Mark 819 preceding Header 821 in the next Track Sector 504 as described above. If that Header 821 is valid data in that Track Sector 504 is read as described below.

If Controller 107 changes the state of HDER/DATA 725, R/W Processor 611 responds to Sync Mark 819 preceding Sector Data 111 and the data in Sector Data 811 is converted and output to Controller 107 in the manner just described. As Converter 611 outputs Data Codes 109, R/W Processor 611 counts bytes. When all of the bytes in Track Sector 504 have been output, the read operation ceases and R/W Processor 611 waits for Controller 107 to change the state of HDER/DATA 725 to indicate header. After it does so, R/W Processor 611 begins the read operation on the next Track Sector 504 as just described. If Controller 107 wishes to terminate the read operation, it sets C/D MD SEL 723 to indicate a command and provides the next Operational Instruction 643.

2.2.4.2.1.2 NEW BLOCK Specifying a Write Operation

In the write operation, Header 821 of the desired Track Sector 504 is read and checked by Controller 107, and then if it is valid, Controller 107 provides Data Codes 107 to be written to Sector Data 811. NEW BLOCK specifying a write operation is accompanied by an Initiate Sequence Out Control Instruction 641 specifying that Data Codes 109 will be output to Controller 107. After receiving the NEW BLOCK instruction, Apparatus Control 609 at first proceeds as described above, locating the specified Cylinder 509, activating the proper Head 125, outputting a signal in DDCAS 620 specifying an interrupt to Controller Interface 603, and waiting for C/D MD SEL 723 to indicate data.

However, the Read-Write Flow Control Instruction 615 output by Apparatus Control 609 specifies that Data Transfer Apparatus 605 is to transfer Data Codes 109 from R/W Processor 611 to Controller Interface 603 until HDR/DATA 725 indicates that data may be transferred and then transfer Data Codes 109 from Controller Interface 603 to R/W Processor 611 and that R/W Processor is to respond to Sync Mark 819 preceding Header 821 by converting Disk Codes 128 in Header 821 to Data Codes 109 and outputting them to Data Transfer Apparatus 605, and then, if HDR/DATA 725 indicates that data may be transferred, to respond to Sync Mark 819 preceding Sector Data 811 by receiving Data Codes 109 from Data Transfer Apparatus 605, converting them to Disk Codes 128, and writing the Disk Codes 128 in Secto Data 811.

Thus, Header 821 is transferred to Controller 107, and if the Header Compare operation succeeds and Controller 107 provides Data Codes 109, Data Transfer Apparatus 605 transfers Data Codes 109 to R/W Processor 611, and R/W Processor 611 converts them and writes the resulting Disk Codes 128 to Sector Data 811. If Controller 107 finds that Header 821 is invalid, the write operation is suspended as previously described. During the write operation, R/W Processor 611 counts bytes, and ceases writing when it has written all of the data which Sector 811 may contain. If the next sequential Track Sector 504 is to be written, the operation continues as described for the read operation. The operation ends when Controller 107 again places C/D MD SEL 723 in command mode.

2.2.4.2.1.3 Other NEW BLOCK Operations

When the first byte of the NEW BLOCK instruction specifies seek only, Apparatus Control 609 merely locates Track 509 specified in the instruction, and does not emit a Flow Control Instruction 615 to R/W Processor 611 and Data Transfer Apparatus 605.

When NEW BLOCK specifies a format operation, Apparatus Control 609 emits a Read-Write Flow Control Instruction 615 causing Data Transfer Apparatus 605 to transfer Data Codes 109 for Headers 821 from Controller Interface 603 to FIFO 607 and from there to R/W Processor 611 and R/W Processor 611 to cause Converter 133 to convert Data Codes 109 to Headers 821 and output them at the proper time for writing Header 821 in Track Sector 504 to Heads 125.

2.2.4.3 Diagnostic Operations Performed by DDCA 121

DDCA 121 executes diagnostic Operational Instructions 643; in addition, DDCA 121 performs internal diagnostic operations in response to diagnostic Flow Control Instructions 615 provided by Apparatus Control 609. The following discussion provides overviews of these operations.

The first diagnostic Operational Instructions 643 are SET DIAGNOSTIC MODE and RESET DIAGNOSTIC Mode. These Operational Instructions 643 are used to prevent accidental execution of NEW BLOCK specifying a format operation. Apparatus Control 609 responds to NEW BLOCK specifying a format operation only when it has received a SET DIAGNOSTIC MODE instruction and not yet received a RESET DIAGNOSTIC MODE instruction.

The diagnostic Operational Instructions 643 other than SET and RESET DIAGNOSTIC MOD fall into two groups: those which allow Apparatus Control 609 to "exercise" DDCA 121 and those which allow Apparatus Control 609 to set and report back the state of DDCA 121.

The first group includes a pair of Operational Instructions 643 which allow data to be loaded into or retrieved from Apparatus Control 609. The data is transferred via C/D Bus 701 between Controller 107 and Disk Drive 119 and between Controller Interface 603 and Apparatus Control 609 via Data Transfer Apparatus 605. During these transfers, C/D MD SEL 723 specifies a command. If the transfer is from Controller 107 to Apparatus Control 609, an Initiate Sequence Out Control Instruction 641 must be on CONTG Bus 703 during the transfer; if the transfer is in the other direction, an Initiate Sequence In Control Instruction 641 must be on CONTG Bus 703. The first group further includes an Operational Instruction 643 which allows Apparatus Control 609 to execute a specified diagnostic program. Using this first group of instructions, special diagnostic programs may be provided to Apparatus Control 609 from Controller 107 and the results of operation of these programs may be returned to Controller 107.

The second group includes instructions to which Apparatus Control 609 responds by providing a Data Flow Instruction 615 causing Data Transfer Apparatus 605 to transfer data from Apparatus Control 609 via FIFO 607 to Controller Interface 603 and then outputting the contents of status registers in Apparatus Control 609 to Data Transfer Apparatus 605. Another such instruction specifies that Apparatus Control 609 is to read an error report stored in Apparatus Control 609 or on Disk 123 to Controller 107. Finally, Apparatus Control 609 responds to the SOFT RESET Operational Instruction 643 by providing DDCAS 620 to components of DDCA 121 which reset component state in preparation for a new attempt to operate Disk Drive 119 after an error.

Under control of Diagnostic Data Transfer Flow Control Instructions 615, Data Transfer Apparatus 605 transfers data between Apparatus Control 609 and R/W Processor 611 and R/W Processor 611 performs special diagnostic operations including read and write operations involving only Headers 821 and a write-read operation using data paths internal to R/W Processor 611.

As may be seen from the above, diagnostic functions are as much a part of DDCA 121 as the read function and the write function. Diagnostics in DDCA 121 further use the same components as the read and write operations. Data Transfer Apparatus 605 provides paths and storage for diagnostic data and instructions in the same way that it provides paths for ordinary data and instructions, and Converter 133 processes Data Codes 109 and Disk Codes 128 in diagnostic operations in the same fashion as it does in ordinary operations.

2.2.5 Hierarchical Organization of DDCA 121—FIG. 8

As shown by the preceding description of the operation of DDCA 121, control of components of DDCA 121 is hierarchical. FIG. 9 represents the control hierarchy in DDCA 121. In a present embodiment of DDCA 121, there are five levels of control. Control at Level 1 901 is provided by Controller 107 and is exercised by means of Control Signals 645, Control Instructions 641, and Operational Instructions 643 which Controller Interface 603 receives from Controller 107 via Controller-Disk Bus 127. As described above, Controller 107 provides Signals 911 derived from Control Signals 645 and Control Instructions 641 to Data Transfer Apparatus 605 and R/W Processor 611 and passes Operational Instructions 643 to Apparatus Control 609. Control at Level 2 903 is provided by Apparatus Control 609 as it interprets Operational Instructions 631, controls Servo Mechanism 624, and provides Data Flow Instructions 615 to Data Transfer Apparatus 605 and R/W Processor 611. As described above, Apparatus Control 609 outputs Read-Write Flow Control Instructions 615 to R/W Processor 611 and Data Transfer Apparatus 605 in response to SPS 631.

Control at Level 3 905 is provided by Data Transfer Apparatus 605 and R/W Processor 611, operating under control of Data Flow Instructions 615 and Signals 911. Data Transmfer Apparatus 605 responds to Data Flow Instructions 615 and Signals 911 by producing signals directly controlling FIFO 607 and buses in Data Transfer Apparatus 605. R/W Processor 611 responds to Data Flow Instructions 615 and Signals 911 by providing Converter Instructions 913 to Converter 133. Converter 133 thus provides control at Level 4 907. As will be explained in more detail below, upon detecting Sync Mark 819, Converter 133 provides Encode/Decode Instructions 915 to Encoder/Decoder 919 in Converter 133. Converter 133 performs the specified encoding and decoding operations in response to Byte Clock 917. Encoder/Decoder 919 is thus at Level 5 905 of control.

The hierarchical organization just described offers a number of advantages. First, changes within a level of the hierarchy need not affect other levels. For example, Converter Instructions 913 specify only that an encode operation or a decode operation is to be performed, not how it is to be performed. How the operation is to be performed depends on the type of Disk Codes 128 being used in Disk Drive 119, and the implementation of Converter 133 and Enc/Dec 919 is determined by the type of Disk Codes 128 being used. If different Disk Codes 128 are used, Converter 133 and Enc/Dec 919 must be reimplemented, but everything in the control hierarchy above Converter 133 may remain unchanged.

Second, as shown in FIG. 9, the speed with which components of DDCA 121 must respond depends on their level in the hierarchy. Apparatus Control 609 responds only to SPS 631, and therefore need only operate once in the time required for a Track Sector 504 to pass under Head 125. Converter 133 responds to Sync Mark 819, and must therefore employ faster components, and Enc/Dec 919 responds to Byte Clock 917, and must employ the fastest components. In a present embodiment of DDCA 121, all components of DDCA 121 but Converter 133 and Enc/Dec 919 are implemented using relatively slow and inexpensive TTL logic. Converter 133 and Enc/Dec 919 are implemented using fast and expensive ECL logic.

Third, DDCA 121's control hierarchy simplifies diagnostics. As mentioned in the discussion of the operation of DDCA 121, Operational Instructions 643 include diagnostic instructions, Apparatus Control 609 may be programmed to perform further diagnostic operations, and R/W Processor 611 and Data Transfer Apparatus 605 respond to diagnostic Data Flow Instructions 615. If Disk Drive 119 malfunctions, Controller 107 may commence diagnostic operations by providing diagnostic Operational Instructions 643 to Apparatus Control 609 to which Apparatus Control 609 responds by providing state of Disk Drive 119. Depending on what is revealed by that state, Controller 107 may specify execution of diagnostic programs by Apparatus Control 609 which independently exercise Servo Mechanism 624, Data Transfer Apparatus 605, R/W Processor 611, and R/W Processor 611 together with Heads 105 and Disk Set 507. Analysis of the results of these operations allows Controller 107 to determine which components of Disk Drive 119 are malfunctioning.

3 Detailed Implementation of Components of a Preferred Embodiment of DDCA 121

Certain components of a Preferred Embodiment of DDCA 121 which are of particular interest are now discussed in detail. Discussion begins with R/W Processor 611 and then proceeds to Apparatus Control 609, Controller Interface 603, and Data Transfer Apparatus 605.

3.1 Implementation of R/W Processor 611—FIGS. 10-12

FIG. 10 is a detailed block diagram of R/W Processor 611. The major components of R/W Processor 611 are R/W Operational Sequencer 1001 and Converter 133.

3.1.1 R/W Operational Sequencer—FIG. 11

Beginning with R/W Operational Sequencer 1001, this component receives Read-Write Data Flow Instructions 615 from Apparatus Control 609, Signals in INT/RWCTL 627 from Controller Interface 603, Byte Clock Signals 1033 from Converter 133, and SPS 631 from Servo Mechanism 124. R/W Operational Sequencer outputs Converter Instructions 913 to Converter 133, Read Gate Signal 1019 and Write Gate Signal 1021 of RWCTL 630 to Heads 125, and signals via R/W FCTL 625 to Data Transfer Apparatus 605, and thereby controls operations of reading data from Disk 123 and writing data to Disk 123. R/W Operational Sequencer 1001 provides information on status of R/W Processor 611 via RWS 1020 of DDCAS 620 to Apparatus Control 609. Included within R/W Operational Sequencer 1001 is Byte Counter 1002, which is incremented each time a byte is written to or read from Disk 123 and thereby indicates how much of Track Sector 504 being read or written remains to be read or written.

INT/RWCTL 627 include signals derived from C/D MD SEL 723 and HDER/DATA 725 of Controller Disk Bus 127. As previously described, these signals indicate whether DDCA 121 is receiving commands or data, and whether it is transferring Header 821 to Controller 107 or transferring Data Codes 109 to or receiving them from Controller 109. Read-Write Data Flow Instructions 615 responded to by R/W Sequencer 1001 and Data Transfer Apparatus 605 include the following:

(1) a read instruction, to which Data Transfer Apparatus 605 responds by transferring Data Codes 109 from R/W Processor 611 to Controller Interface 603 and R/W Processor 611 responds by first reading Header 821 and then, if HDER/DATA 725 indicates data, Sector Data 811;

(2) a write instruction, to which Data Transfer Apparatus 605 responds by transferring Data Codes 109 from R/W Processor 611 to Controller Interface 603 until HDER/DATA 725 indicates data, and then transferring Data Codes 109 from Controller Interface 603 to R/W Processor 611 and to which R/W Processor 611 responds by first reading Header 821 and then, if HDER/DATA 725 indicates data, writing Sector Data 811;

(3) A format instruction, to which Data Transfer apparatus 605 responds by transferring Data Codes 109 from Controller Interface 603 to R/W Processer 611 and to which R/W Processor 611 responds by writing only Header 821.

(4) a read header operation, to which Data Transfer Apparatus 605 responds by transferring Data Codes 109 from R/W Processor 611 to FIFO 607 and to which R/W Processor 611 responds by reading Header 821 and outputting it to Data Transfer Apparatus 605.

(5) a write header operation, to which Data Transfer Apparatus 605 responds by transferring Data Codes 109 from FIFO 607 to R/W Processor 611 and to which R/W Processor 611 responds by writing Header 821 received from Data Transfer Apparatus 605.

(6) a diagnostic write-read instruction, to which Data Transfer 605 first responds by transferring Data Codes 109 from FIFO 607 to R/W Processor 611 and then from R/W Processor 611 to FIFO 607 and to which R/W Processor 611 responds by converting Data Codes 109 to Disk Codes 128 and then converting these Disk Codes 128 to Data Codes 109 and outputting them to Data Transfer Apparatus 605 without writing them to or reading them from Disk 123.

The first three of these instructions are used in the execution of NEW BLOCK instructions specifying read, write, and format operations; the remaining instructions are used only to perform diagnostic operations.

Turning to outputs of R/W Operational Sequencer 1001, Heads 125 respond to Read Gate Signal 1019 by reading Disk Codes 128; they respond to Write Gate Signal 1021 by writing Disk Codes 128. RWS 1020 signals abnormal conditions in R/W Processor 611 to Apparatus Control 609. Converter Instructions 913 include the following:

(1) Initialize, which initializes ENC/DEC 919 and thereby puts Converter 133 into the proper state to begin operation.
(2) Search for Sync, to which Converter 133 responds by looking for Sync Mark 819 and commencing operation when it is detected.
(3) Encode Data Codes 109 to Disk Codes 128
(4) Decode Data Codes 109 from Disk Codes 128.

Byte Counter 1002 is implemented in a present embodiment by counters which are reset when R/W Processor 611 begins reading or writing Sector Data 811 and are incremented in response to each Byte Clock Signal 1033 provided by Converter 133. The remaining components of R/W Sequencer 1001 are shown in FIG. 11. They consist of Register 1107, Register 1103, and sequencer logic implemented by means of a first Programmable Logic Array (PLA) 1101 and a second Programmable Logic Array 1105. In a present embodiment, Programmable Logic Arrays 1105 may be field-programmable logic arrays of type 82S100D, manufactured by Signetics Corporation.

Register 1107 receives Flow Control Instructions 615 from Apparatus Control 609 and outputs its contents in response to SPS 631. As previously mentioned, Apparatus Control 609 outputs Flow Control Instructions 615 to which R/W Processor 611 responds at a time such that the next signal on SPS 631 marks the beginning of Track Sector 504 to be read or written. Thus, R/W Sequencer 1001 responds to the output of Register 1107 only at the beginning of Track Sector 504.

PLA 1101 receives bits of the output of Register 1107 which specify whether a read or a write operation is going on and further receives the current byte count from Byte Counter 1002 and its own previous output from Register 1103. In response to these inputs, it provides an output to Register 1103, which provides the output to both PLA 1101 and PLA 1105 in response to Byte Clock Signal 1103. In addition to the inputs from Register 1103, PLA 1105 further receives the entire output of Register 1107 and signals from INT/RWCTL 627. PLA 1105 outputs Converter Instructions 913, Read Gate 1019, Write Gate 1023, R/WFCTL Signals 625 to Data Transfer Apparatus 605, and RWS 1020 in DDCAS 620 to Apparatus Control 609. As may be understood from the arrangement shown in FIG. 10, the values of the outputs depend on which Flow Control Instruction 615 is being executed, whether SPS 631 indicating the beginning of the desired Track Sector 504 has been received, whether C/D MD SEL 723 specifies an Operational Instruction 643 or data, whether HDER/DATA 725 specifies a Header 821 or data, and how many bytes of Data Codes 109 have been read or written. If the combination of inputs to PLA 1105 indicates abnormal operation of R/W Processor 611, PLA 1105 outputs a status signal on RWS 1020.

3.1.2 Converter 133

Turning again to FIG. 10, Converter 133 has two main components: Timing Generator 1003 and Encoder/Decoder 919. Timing Generator 1003 provides Enc/Dec Instructions 915 to Enc/Dec 919, which encodes or decodes Data Codes 109 and Disk Codes 128 as required by the operation being performed by R/W Processor 611. Timing Generator 1003 receives Converter Instructions 913 from R/W Operational Sequencer 1001, a Sync Detected Signal 1035 when Sync Mark 819 is detected, and R/W Clock Signals from Heads 105, and outputs Byte Clock 1033 to R/W Sequencer 1001 and Enc/Dec Instructions 915 at the proper times to cause Enc/Dec 919 to perform the proper actions.

In a preferred embodiment, Enc/Dec Instructions 915 are combinations of the following signals:
(1) Byte Clk 1033, output at the start of an encoding operation on a byte of Data Codes 109;
(2) Group Clk 1209, output at the start of a decoding operation on a group of Disk Codes 128;
(3) Load Reg 1211, controlling loading of registers in Enc/Dec 919.
(4) Reset 1207, which resets Counter 201 and Enc/Dec 919.

3.1.2.1 Implementation of Timing Generator 1003—FIG. 12

An implementation of Timing Generator 1003 used in a preferred embodiment of R/W Processor 611 is shown in FIG. 12. The components include:
(1) Converter Instruction Decoder 1207, which receives Converter Instructions 913 from R/W Processor 611 and outputs signals decoded from Converter Instructions 913 in response to Sync Det 1035;
(2) Counter 1201, which increments in response to R/WCLK Signal 1023;
(3) PROM 1203, which receives inputs from Converter Instruction Decoder 1207 and Counter 1201;
(4) Register 1205, which receives inputs from PROM 1203 and outputs them in response to R/W CLK 1023.

The outputs from Register 1205 include Byte Clock Signal 1033, Enc/Dec Instructions 915, and Reset Signal 1207, which is returned to Counter 1201. Timing Generator 1003 is made up of ECL components in order to achieve rapid operation. Converter Instruction Decoder 913 consequently not only decodes Converter Instructions 913, but also produces output signals having the proper electrical properties for ECL logic.

DPU Timing Generator 1003 operates as follows: When R/W Processor 611 begins to execute a Read-Write Flow Control Instruction 615, R/W Sequencer 1001 provides an Initialize Converter Instruction to Converter Instruction Decoder 1207. Decoder 1207 responds thereto by activating INIT input 1209 to PROM 1203. In response to INIT, PROM 1203 outputs Reset 1207 which resets internal state of Enc/Dec 919 and Counter 1201. When R/W Sequencer 1001 receives SPS 631 from Heads 125, indicating that the desired Track Sector 504 has been reached, it outputs a Search for Sync Converter Instruction 915. Converter Instruction Decoder 1207 responds to that instruction by outputting a read signal on Read 1211 to PROM 1203. In response to the read signal, PROM 1203 outputs Group Clk 1209 Signals, enabling Enc/Dec 919 to receive Disk Codes 128. When Enc/Dec 919 receives Sync Mark 819, it outputs Sync Detected Signal 1035.

In response to Sync Detected Signal 1035, Decoder 1207 activates Sync Det 1213, to which PROM 1203 responds by outputting a code which activates Reset 1207, again resetting Counter 1201 and Enc/Dec 919. PROM 1203 then outputs Byte Clk Signals 1033, Group Clk Signals 1209 and Load Reg Signals 1211 in response to Counter 1201 in the proper order to cause Enc/Dec 919 to read Header 821. If Header 821 is valid, R/W Processor 611 outputs either an Encode or Decode Converter Instruction 915 to Converter Instruction Decoder 1207. In response to Decode, Converter Instruction Decoder 1207 activates Read 1211, and when the next Sync Detected Signal 1035 is received, PROM 1203 begins outputting Group Clk Signals 1209, Byte Clk Signals 1033, and Load Reg Signals 1211 as described above. In response to Encode, Converter Instruction Decoder 1207 proceeds in the same fashion, except that Read 1211 is not activated and PROM 1203 outputs Byte Clk Signals 1033, Group Clk Signals 1209, and Load Reg Signals 1211 as required for the encoding operation.

1.2.2 Enc/Dec 919

Turning again to FIG. 10, Encoder/Decoder 919 both encodes and decodes data. When encoding, Enc/Dec 919 receives Data Codes 109 in parallel from Data Transfer Apparatus 605 and outputs Disk Codes 128 serially to Head 105 via Serial Write Data Out 1027; when decoding, Enc/Dec 919 receives Disk Codes 128 serially from Serial Read Data In 1025 and outputs Data Codes 109 in parallel to Data Transfer Apparatus 605; operation of Enc/Dec 919 is controlled by Enc/Dec Instructions 915 received from Timing Generator 1003.

Components of Enc/Dec 919 include Data Input Register 1005, Sync Detect 1007, Data/State Latch 1008, Encoder/Decoder PROM 1011, Data Output Register 1013, Read Data Latch 1015, and Data Trap 1017, which is used only in diagnostic operation of R/W Processor 611.

Data Input Register 1005 is a shift register which receives Data Codes 109 in parallel from Data Transfer Apparatus 605 when Enc/Dec 919 is encoding and Disk Codes 128 serially from Serial Read Data In 1005 when Enc/Dec 919 is decoding. In either case, output of Data Input Register 1005 to other components of Enc/Dec 919 is in parallel. Sync Detect 1007 is logic which produces Sync Det Signal 1035 when R/W Processor 611 reads Sync Mark 819 from Track Sector 504. Sync Detect 1007 is connected to the output of Data Input Register 1005 and produces Sync Det Signal 1035 when Data Input Register 1005 is receiving Disk Codes 128 and contains Sync Mark 819.

Data/State Latch 1008 and Encoder/Decoder PROM 1011 cooperate to perform encoding and decoding of Data Codes 109 and Disk Codes 128. Data/State Latch 1008 is a register which receives the contents of Data Input Register 1005 and State Codes 1010 from Encoder/Decoder Prom 1011. It retains the last State Code 1010 produced by Encoder/Decoder Prom 1011 and outputs retained Stat Code 1010 and the data it received from Data Input Register 1005 to Encoder/Decoder Prom 1011. Encoder/Decoder Prom 1011 encodes or decodes the data it receives from Data State Latch 1008. Which operation it performs is determined by a signal derived from Read Gate 1019. If Read Gate 1019 is active, indicating a read operation, Encoder/Decoder Prom 1011 converts Disk Codes 128 to Data Codes 109; otherwise, it performs the reverse conversion. In the encoding operation, it converts two-bit sequences of Data Codes 109 to three-bit sequences of Disk Codes 128, and in the decoding operation, it does the reverse. As will be explained in more detail later, the Data Code 109 or the Disk Code 128 produced depends on the data and retained Stat Code 1010 received from Data/State Latch 1007.

Data Output Register 1013 is a shift register which receives the parallel output of Encoder/Decoder PROM 1011 and outputs it serially to Write Data Out 1017 if Write Gate 1021 is active and otherwise to Read Data Latch 1015. Generally, data output to Read Data Latch 1015 is Data Codes 109; however, in the case of one diagnostic operation performed by R/W Processor 611, Disk Codes 128 are output to Read Data Latch 1015. Read Data Latch 1015 is another shift register. In all cases but that of the diagnostic operation just mentioned, Read Data Latch 1015 outputs Data Codes 109 in parallel to Data Transfer Apparatus 605; in the diagnostic operation, it outputs Disk Codes 128 serially via Diag Data In 1029 to Data Trap 1017. Data Trap 1017, finally, is used during the above-mentioned diagnostic operation only. It is a shift register which receives Disk Codes 128 serially from Read Data Latch 1015 and outputs them via Diag Data Out 1031 to Data Input Register 1005. Diag. Data In, Data Trap 1017, and Diag. Data Out 1013 thus together provide a path by which Disk Codes 128 converted from Data Codes 109 may be reconverted to Data Codes 109 without being written to Disk 123.

Operation of Enc/Dec 919 proceeds as follows: at the beginning of a read or write operation, Read Gate 1019 is active and Data Input Register 1005 is receiving Disk Codes 128 into Data Input Register 1005. Disk Codes 128 are shifted through Data Input Register 1005 in response to Group Clk 1209. When Data Input Register 1005 receives a Sync Mark 819, it is detected by Sync Detect 1007, which provides Sync Detected Signal 1035 to Timing Generator 1003. In response to Sync Detected 1003, Timing Generator 1003 begins producing Load Reg Signals 1209, and the contents of Data Input Register 1005 are loaded into Data/State Latch 1008. They are then output to Encoder/Decoder Prom 111, along with an inital State Code 1010.

If Read Gate 1019 is active, Encoder/Decoder Prom 1011 produces Data Codes 109 from the contents of Data/State Latch 1008. The Data Codes 109 are output to Data Output Register 1013. Since Write Gate 1021 is not active, Data Output Register 1013 outputs Data Codes 109 serially to Read Data Latch 1015, which outputs them in parallel to Data Transfer Apparatus 1015.

If Read Gate 1019 is not active, Data Input Register 1005 receives Data Codes 109 in parallel from Data Transfer Apparatus 605. As described above, the Data Codes 109 are output to Data/State Latch 1008 and then, together with State Codes 1010 to Encoder/Decoder Prom 1011, which in this case, converts the Data Codes 109 into Disk Codes 128. Since Write Gate 1021 is active, Data Output Register 1013 outputs the resulting Disk Codes 128 to Disk 123.

When R/W Processor 611 is executing Read, Write, Read Header, and Write Header Read-Write Data Flow Instructions 615, Enc/Dec 919 operates as described above; however, when R/W Processor 611 is executing a diagnostic write-read Data Flow Instruction 615, R/W Operational Sequencer 1001 first enables Data Input Register to receive Data Codes 109 from Data Transfer Apparatus 605, Encoder/Decoder PROM 1011 to encode Data Codes 109, and Read Data Latch 1015 to output the resulting Disk Codes 128 to Data Trap Shift Register 1017 instead of to Write Data Out 1027. After enough Data Codes 109 have been encoded to fill Data Output Register 1013 and Data Trap 1017, R/W Operational Sequencer 1001 enables Data Input Register 1005 to receive Disk Codes 128 from Data Trap 1017, Encoder/Decoder Prom 1011 to decode those Disk Codes 128, and Read Data Latch 1015 to output them to Data Transfer Apparatus 605. If Enc/Dec 919 is operating properly, Data Codes 109 produced by this operation will be exactly the same as the Data Codes 109 which Enc/Dec 919 received as input.

3.2. Encoding and Decoding in R/W Processor 611

In a preferred embodiment of Enc/Dec 919, Encoder/Decoder Prom 1011 converts Data Codes 109 to Run-length-limited (RLL) Disk Codes 128. RLL Disk Codes 128 are well-known in the art. See, for example, P.A. Franaszek, *Sequence-state Methods for Run-length-limited Coding,* IBM Journal of Research and Development, July, 1970. As explained briefly in the Introduction to the specification, RLL Disk Codes 128 allow greater density of information storage on Disk 123.

The type of RLL Disk Code 128 used in a preferred embodiment is a RLL(2,8) Disk Code 128; however, the apparatus and methods described may be used with other types of RLL Disk Codes 128. In an RLL(2,8) Disk Code 128, three bits of RLL(2,8) Disk Code 128 correspond to two bits of Data Code 109. The precise encoding of two bits of Data Code 10 depends on the values of previously-encoded Data Codes 109, the value of the two bits of Data Code 109 being encoded, and the value of the next two bits of Data Code 109. These relationships are shown in FIG. 13. Using that Figure, both the encoding and decoding operations will be explained.

3.2.1 Encoding Data Codes 109—FIG. 13

FIG. 13 contains Encoding Table 1303 for encoding Data Codes 109, Decoding Table 1305, for decoding RLL(2,8) Disk Codes 128, and other information required to understand the encoding and decoding operations. Beginning with Encoding Table 1303, the table has 8 rows, one for each of the possible three-bit groups in RLL (2,8) Disk Codes 128. The possible RLL (2,8) Disk Codes 128 appear in the column labelled CODE The leftmost three columns correspond to three states, A, B, and C. Each entry in the leftmost three columns thus specifies a state and one of the RLL (2,8) Disk Codes 128. If a combination of the specified state and a value of two bits of Data Codes 109 may correspond to the specified RLL (2,8) Disk Code 128, the value of the two bits appears in that entry. Thus, the RLL Code 100 in the first row may correspond to the bits 11 of Data Code 109 when the state is A.

As already mentioned, the value of the three bits of RLL (2,8) Disk Code 128 is further influenced by the value of the next two bits of Data Code 109. These values are shown in the column labelled N+1. Thus, the two bits 11 will be encoded to 100 only if N+1 is either 00 or 01; otherwise, it will be encoded to 010, as specified by the next column. If a dash appears in the column labelled N+1, the next two bits of Data Code 109 make no difference. Thus, as specified by the third row of Encoding Table 1303, when the state is A and the two bits have the value 10, the three bits are always 100, regardless of the value of N+1.

As previously mentioned, each encoding operation produces one of states A, B, and C as well as a three bits of RLL (2,8) Disk Code 128. The state produced by each encoding operation specified in Encoding Table 1303 is specified in the column ST of the table. Thus, if 11 is encoded when the previous state is A and the next two bits are 01, the state becomes B. Since there are three states, two bits are needed to represent them. Consequently, separate representations of three bits of RLL (2,8) Disk Code 128 and the states would require five bits. In order to reduce the number of bits required to four, a preferred embodiment of Enc/Dec 919 combines three bits of RLL (2,8) Disk Code 128 with two bits of State Code 1010 to produce a four-bit Code-status word (CSWORD). The leftmost three bits of CSWORD contain the RLL (2,8) Disk Code 128 produced by the encoding operation and the rightmost 2 bits contain State Code 1010. The third bit functions simultaneously as a bit of RLL Disk Code 128 and a bit of State Code 1010. Only the leftmost three bits of CSWORD are written to Disk 123. Table 1307 shows the CSWORDs produced from various combinations of state and three bits of RLL (2,8) Disk Code 128, and the CSWORD column in Encoding Table 1303 shows the CSWORDs corresponding to the combination of three-bit code and state produced by each encoding operation.

3.2.2 Decoding RLL (2,8) Disk Codes 128

Decoding Table 1305 is similar to Encoding Table 1303, except that the decoding operation involves four states, A,B,C, and D, instead of three. Together, the previous state, the current three bits of RLL (2,8) Disk Code 128, and the next three bits yield the two bits of Data Code 109 corresponding to the current three bits of RLL(2,8) Disk Code 128 and a new state. The previous state appears in the first column, the current three bits of RLL (2,8) Disk Code 128 in the column labelled N, the next three bits in the column labelled N+1, the new state in the column with that label, the integer from Table 1301 representing the two bits of Data Code 109 in the column labelled GR DATA, and the two bits themselves in the last column. Bits specified by X in the columns labelled N and N+1 are "don't care" bits and do not affect the decoding operation; bits represented as 00 may have any value other than 00. Thus, reading the first row of Decoding Table 1305, if the previous state is A, the three bits of N are either 100 or 000, and N+1 is 000, then N is decoded to 11 and the new state is B.

3.2.3 Implementation of Encoding and Decoding in a Preferred Embodiment of DDCA 121—FIG. 14

The implementation of encoding and decoding in a preferred embodiment of DDCA 121 is shown in FIG. 14. The components of FIG. 14 are Shift Registers 1401 and 1403, which together make up Data/State Latch 1008, and Encoder/Decoder PROM 1011. In a present embodiment, Encoder/Decoder PROM 1011 may be a 256×4 ECL PROM of type MCM10149L, manufactured by Motorola, Incorporated. Inputs 1407 and 1411 to PROM 1011 specify the address of one of 256 4-bit registers in PROM 1011; Outputs 1413 carry the contents of the addressed register.

Shift Registers 1401 and 1403 receive parallel inputs 1405 and 1409. Inputs 1405 are from Data Input Register 1005. When Enc/Dec 919 is encoding Data Codes 109, Inputs 1405 carry five bits of Data Codes 109. The first two bits are the two bits being currently encoded and the next two bits are the next two bits to be encoded. In the encoding operation, the fifth bit is disregarded. When Enc/Dec 919 is decoding Disk Codes 128, Inputs 1405 carry the two most-significant bits of the three bits of Disk Code 128 currently being decoded and all three bits of the next Disk Code 128 to be decoded. As may be seen from the second column of Decoding Table 1305, the least-significant bit of the three bits being currently decoded is a "don't care" bit and may therefore be disregarded in the decoding operation. Inputs 1409 carry a two-bit State Code 1010 specifying one of States A, B, C, or D produced in the encoding or decoding operation. At the beginning of an encoding or decoding operation, Shift Registers 1403 and 1401 consequently contain the data to be encoded or decoded and a State Code 1010 representing State A, B, C or D produced by the last encoding or decoding operation.

The contents of Registers 1401 and 1403, together with Read Gate ECL 1411, provide address inputs to PROM 1011. The signal carried by Read Gate ECL 1411 is derived from Read Gate 1019. The address inputs to PROM 1011 thus specify either the current and next two bits of Data Codes 109, the previous state, and an encoding operation or the current and next three bits of Disk Codes 128, the previous state, and a decoding operation. The register in PROM 1011 thus addressed contains the result for the operation, input, and state.

In the encoding operation, the result is a four-bit CSWORD, as described in the discussion of Encoding Table 1303. The use of a four-bit CSWORD combining three bits of RLL (2,8) Disk Code 128 and two bits of State Code 1010 allows implementation of Encoder/Decoder Prom 1011 with a single 256×4 PROM instead of a larger PROM or two 256×4 PROMS, and thus accomplishes significant hardware savings.

In the decoding operation, the result is two bits of Data Code 109 and two bits of State Code 1010. As may be seen from FIG. 14, the two bits of State Code 1010 are returned to Shift Register 1403 via conductors 1409, while the three least significant bits of CSWORD, i.e., the three bits of RLL (2,8) Disk Code 128, or the two bits of Data Code 109 and one bit of State Code 1010 are output to Data Output Register 1013. During an encoding operation, Data Output Register 1013 shifts all three bits received from Output 1413 out to Read Data Latch 1015; during a decoding operation, Data Output Register 1013 shifts only the two bits of Data Code 109 out to Read Data Latch 1015.

3.2.4 Reducing the Number of Erroneous Data Codes 109 during Decoding

As stated in the general discussion of Disk Codes 128, RLL (2,8) Disk Codes 128 always have at least 1 0 between 1's and have a maximum number of 0's without a 1. All RLL (2,8) Disk Codes 128 written to Disk 123 conform to these rules; however, RLL (2,8) Disk Codes 128 read from Disk 123 may not conform, either because of electrical noise during the read or write operation or because Disk 123 has been damaged. A RLL (2,8) Disk Code 128 received from Disk 123 which does not conform to the rules is clearly in error.

In the preferred embodiment of DDCA 121, Encoder/Decoder PROM 1011 detects certain such non-conforming RLL (2,8) Disk Codes 128 and decodes them to Data Codes 109 corresponding to conforming RLL (2,8) Disk Codes 128. There is no guarantee that Data Code 109 produced from nonconforming RLL (2,8) Disk Code 128 will be the same as Data Code 109 which was encoded to produce non-conforming RLL (2,8) Disk Code 128, but the substitution of Data Code 109 corresponding to a conforming RLL (2,8) Disk Code 128 cannot make matters worse. Indeed, if conforming RLL (2,8) Disk Code 128 to which Data Code 109 corresponds is properly chosen, there is a high probability that Data Code 109 will in fact correspond to Data Code 109 from which non-conforming RLL (2,8) Disk Code 128 was encoded.

In a preferred embodiment, conforming RLL(2,8) Disk Codes 128 may be chosen on the basis of the Hamming Distance: since most errors involve only a single bit of RLL (2,8) Disk Code 128, the correct conforming RLL (2,8) Disk Code 128 is most probably one produced by changing a single bit of non-conforming RLL (2,8) Disk Code 128. For example, the six-bit sequence of RLL (2,8) Disk Code 128 101100 is non conforming; single-bit changes produce two conforming six-bit sequences: 100100 and 101000. A choice between these two may be made by determining which of the two patterns occurs most frequently and choosing that pattern. In the decoding operation, the non-conforming six-bit sequence 101100 is decoded to Data Code 109 corresponding to the chosen conforming six-bit sequence. Conforming RLL (2,8) Disk Codes 128 may be chosen using criteria other than the Hamming Distance. For instance, if a certain implementation of a Disk Drive 119 had a tendency to make certain errors when writing or reading RLL (2,8) Disk Codes 128 to or from Disk 123, that tendency could be taken into account when choosing the most probable conforming RLL (2,8) Disk Code 128.

Error correction as described above is easily implemented in Encoder/Decoder PROM 1011. PROM 1011 has registers corresponding to all possible combinations of values on Input 1407; there are consequently registers corresponding to all combinations of non-conforming sequences of RLL (2,8) Disk Codes 128 and State Codes 1010. If the two bits of Data Code 109 and two bits of State Code 1010 corresponding to the previous state and the most probable correction of the non-conforming sequence are contained in the register corresponding to the non-conforming sequence and the preceding state, correction is automatically performed during the decoding operation. For example, if 101100 is detected and 100100 has been chosen as the most probable correction, then Decoding Table 1305 yields the following results:

(1) If the preceding state is A, the two bits of Data Code 109 are 10 and the new state is A.

(2) If the preceding state is D, the two bits are 00 and the new state is A.

The register in PROM 1011 corresponding to state A, 101100, and the decoding operation would thus contain 10 and State Code 1010 for State A, while the register corresponding to state D, 101100, and the decoding operation would contain 00 and State A.

The preferred embodiment of Enc/Dec 919 does not detect sequences of 0's longer than the maximum allowed. In the RLL (2,8) Disk Codes 128 used in the preferred embodiment, the maximum number of 0's in a sequence is 7; however, the preferred embodiment of Encoder/Decoder Prom 1011 receives a sequence of only five bits of Disk Code 128 and can specify only 4 states. Thus, the preferred embodiment of Encoder/Decoder Prom 1011 cannot detect a sequence of 8 0's. In another embodiment, more than one Encoder/Decoder Prom 1011 might be used, or an Encoder/Decoder Prom 1011 having more registers, and thus more address lines, might be used, and in such an embodiment, illegal sequences of 0's can be detected and Data Codes 109 corresponding to conforming RLL (2,8) Disk Codes 128 can be decoded from them in the same manner as for illegal sequences of 1's.

3.3 Detailed Description of Apparatus Control 609

The following detailed description of Apparatus Control 609 will first describe the components of Apparatus Control 609 and then the operation of Apparatus Control 609 while executing both ordinary and diagnostic Operational Instructions 643.

3.3.1 Structure of Apparatus Control 609—FIG. 15

FIG. 15 presents a block diagram of a preferred embodiment of Apparatus Control 609. The components of Apparatus Control 609 include Microprocessor 1501, MP Bus 1503, which connects the Microprocessor 1501 with the other components and allows transfer of data to and from Microprocessor 1501, AC Memory 1519, which contains data and programs for execution by Microprocessor 1501, AC Bus Control 1509, which controls access of components of Apparatus Control 609 to MP Bus 1503 in response to addresses from Microprocessor 1507 and signals HS 1505 from other components of Disk Drive 119, and a set of buffers for receiving status information from other components of Disk Drive 119 and providing data and instructions to components of DDCA 121. The buffers may be summarily described as follows:

(1) ALATCH 1513 holds addresses for AC Mem 1519 and instructions for AC Bus Control 1509.

(2) R/W Status 1515 holds status information received from Heads 105.

(3) HD SEL 1525 provides signals activating Heads 105. HDSEL DIAG 1523 retains the current state of those signals.

(4) I/0 Bufs 1527 allow transfer of data between Data Transfer Apparatus 605 and MP Bus 1503.

(5) SRV INT 1529 provides signals specifying the current Cylinder 509.

(6) SCT 1533 counts sectors. It begins counting when it receives an index signal from Servo Mechanism 124 indicating Secto 503(0) and increments the count each time it receives an SPS 631 signal indicating the beginning of a new Sector 503.

(7) FCIR 1535 retains Flow Control Instructions 615 and outputs them to FCI Bus 616. FC DIAG 1531 retains the current Flow Control Instruction 615 for diagnostic purposes.

(8) Disk Diagnosis Interface 1537 receives DSS 637 Signals from other components of Disk Drive 119 and provides them to those components.

(9) DDCA Status 1539 receives and stores DDCAS 620 from DDCA 121 and provides DDCAS 620 to DDCA 121.

Microprocessor 1501 in a present embodiment may be a microECLIPSE(TM) 16-bit microprocessor manufactured by Data General Corporation. Other components of Apparatus Control 609 are constructed of standard logic components. In particular, in a present embodiment of Apparatus Control 609, AC Mem 1519 includes ROM and RAM. The ROM contains programs executed by Microprocessor 1501; the RAM contains data used in execution of those programs and may also contain programs provided via Controller-Data Bus 127 and Data Transfer Apparatus 605 from Controller 107. In other embodiments, only RAM may be used.

3.3.2 General Operation of Apparatus Control 609

In response to instructions stored in AC Mem 1519, Microprocessor 1501 alternatively outputs addresses of data and instructions in AC Mem 519 onto MP Bus 1503 and receives data or instructions from or provides data to MP Bus 1503. Addresses are retained in ALATCH 1513 and are then provided to AC MEM 1519 and AC Bus Control 1509. AC Bus Control 1509 produces Control Signals (CTLS) 1511 controlling devices in Apparatus Control 609 and ACFCTL 621 controlling Data Transfer Apparatus 605 in response to certain bits of the addresses and to signals HS 1505 from components of Disk Drive 119. In response to CTLS 1511, AC Mem 1519 and the other components of Apparatus Control 609 may receive data from MP Bus 1503 or provide data to MP Bus 1503. Thus, Microprocessor 1501 may specify transfer of data between MP Bus 1503 and Data Transfer Apparatus 605 via I/0 BUFs 1521, may provide Flow Control Instructions to Data Transfer Apparatus 605 and R/W Processor 611 via FCIR 1535, may control operation of Servo Mechanism 124 and Heads 105 by providing data to SRV INT 1529 and HDSEL 1525, may time operation of R/W Processor 611 in response to SCT 1533, may reset state of components of Disk Drive 119, and may read and output diagnostic information contained in FCDIAG 1531, DDCA Status 1539, R/W Status 1515, and Disk Diagnostic Interface 1537.

3.3.2.1 Operation of Apparatus Control 609 during Execution of a New Block Operational Instruction 643

As previously explained, when an Operational Instruction 643 is provided to DDCA 121, the instruction's syllables are transferred via Data Transfer Apparatus 605 from Controller-Disk Bus 127 to FIFO 607. The presence of data in FIFO 607 generates a signal on DDCAS 620 which is stored in DDCA Status 1539. DDCA Status 1539 similarly stores the state of C/D MD SEL 723. Between executions of Operational Instructions 643, Microprocessor 1501 executes an idle loop which constantly monitors DDCA Status 1539. When DDCA Status 1539 indicates that data is present in FIFO 607 and that C/D MD SEL 23 specifies a command, Microprocessor 1501 begins executing instructions which cause Microprocessor 1501 to output data to Alatch 1513 to which AC Bus Control 1509 responds by producing signals on AFCTL 621 to Data Transfer Apparatus 605 and CTLS 1511. Data Transfer Apparatus 605 responds to AFCTL 621 by outputting the first syllable of Operational Instruction 643 from FIFO 607. As previously mentioned, at the beginning of execution of an Operational Instruction 643, output of FIFO 607 goes to Apparatus Control 609. There, it is received by I/0 BUFS 1527, which passes it to MP Bus 1503 in response to the signal from CTLS 1511. Microprocessor 1501 receives the syllable from MP Bus 1503. As already explained, the first syllable of New Block Operational Instruction 643 contains an operation code. Microprocessor 1501 employs the operation code to locate the program in AC Mem 1519 for the New Block operation and then begins executing that program. Under control of that program, Microprocessor 1501 reads the remaining syllables of New Block Operational Instruction 1503 from FIFO 607 to AC Memory 1519. Thereupon, the program for the New Block operation uses the information contained in the other syllables of the NEW BLOCK Operational Instruction 643 to provide data to HD SEL 1525 and SRV INT 1529 as required to generate the proper HPS Signals 632, to generate a signal in DDCAS 620 to which Controller Interface 603 responds by producing an interrupt signal on one of DEV INT REQ lines 715 through 717 to Controller 107, to load the number of the desired Track Sector 504 into a register in Microprocessor 1501, and to enable SCT 1533 to begin counting sectors and output the current sector count to MP Bus 1503. Microprocessor 1501 then monitors the sector count. At the proper point before the desired Track Sector 504 is reached, Microprocessor 1501 outputs Read-Write Flow Control Instruction 615 required for the operation to Data Transfer Apparatus 605 and R/W Processor 611, which perform the operation as already described.

3.3.2.2 Operation of Apparatus Control 609 in Response to Diagnostic Operational Instructions 643

As already explained in overview, Diagnostic Operational Instructions 643 specify operations including the following:
(1) Outputting diagnostic status information to Controller 107.
(2) Receiving data from Controller 107 for storage in AC Mem 1519.
(3) Providing data stored in AC Mem 1519 to Controller 107.
(4) Executing a diagnostic program stored in AC Mem 1519.

Other embodiments might include operations for reading diagnostic data from Disk 123 or reading diagnostic programs for Microprocessor 1501 from Disk 123 and executing them.

It is clear from the discussion of the general operation of Apparatus Control 609 how status information may be transferred under control of Microprocessor 1501 from from R/W Status 1515, HD SEL DIAG 1523, FC DIAG 1531, SCT 1533, DDCA Status 1539, and Disk Diagnosis Interface 1537 to I/0 BUFS 1527 and from there to Controller 107. Status information and other data may similarly be transferred from AC Mem 1519 to Controller 107 and data from Controller 107 to AC Mem 1519. In other embodiments, finally, diagnostic data and programs may be transferred from Disk 123 via R/W Processor 611 to Apparatus Control 609.

Diagnostic programs stored in AC Mem 1519 execute two diagnostic operations of special interest. The first of these, R/W Channel Test, tests whether R/W Processor 611 and Heads 105 are able to successfully write data to Disk 123 and read the data from Disk 123; the second, Converter Test, checks whether Converter 133 is correctly converting Data Codes 109 to Disk Codes 128 and vice-versa. When the two tests are used in conjunction, malfunctions in Converter 133 may be distinguished from malfunctions in Heads 105.

In the R/W Channel Test operation, Microprocessor 1501 first emits a Flow Control Instruction 615 which allows data to pass from Apparatus Control 609 to FIFO 617. It then provides a sequence of Data Codes 109 to be used in the operation to FIFO 607 via MP Bus 1503 and I/0 BUFS 1527. The Data Codes 109 may be obtained from AC Mem 1519 or may be produced by Microprocessor 1501. Next, just before the Track Sector 504 being written to is reached, Microprocessor 1501 emits a Write Header Flow Control Instruction 615. Under control of this diagnostic Flow Control Instruction, R/W Processor 611 writes Data Codes 109 from FIFO 607 to a diagnostic track in Disk Set 507. When Write Header instruction is complete, Microprocessor 1501 emits a Read Header Flow Control Instruction 615 which reads Disk Codes 128 written by the Write Header Instruction from the diagnostic track to FIFO 607. Finally, Microprocessor 1501 emits another Flow Control Instruction 615 which allows data to pass from FIFO 607 to Apparatus Control 609. Having thus retrieved Data Codes 109 produced by Read Header Flow Control Instruction 215, Microprocessor 1501 compares them with the original Data Codes 109 to determine whether R/W Processor 611 and Heads 105 are functioning properly. By repeating the above operation with different test patterns, Microprocessor 1501 can provide a complete test of R/W Processor 611 and Heads 105.

In the Converter Test operation, Microprocessor 1501 provides a test pattern of Data Codes 109 to FIFO 607 as just described, but then emits a Data Trap Flow control Instruction 615 to R/W Processor 611. This instruction enables Diagnostic Data In 1029, Data Trap 1017, and Diagnostic Data Out 1031 in Enc/Dec 919 at a predetermined time during encoding of Data Codes 109 and again at a predetermined time during decoding of Disk Codes 128. As described in the discussion of Enc/Dec 919, when the above path is enabled, Enc/Dec 919 encodes Data Codes 109, then decodes the resulting Disk Codes 128, and outputs the resulting Data Codes 109 to Data Transfer Apparatus 605, which places them in FIFO 607. Consequently, at the end of the operation, FIFO 607 contains part of test pattern Data Codes 109 which have been encoded and then decoded. Microprocessor 1501 then compares these Data Codes 109 with the corresponding Data Codes 109 in the original test pattern. If they are identical, Enc/Dec 919 performed the encoding and decoding operations properly. As with the R/W Channel Test Operation, the operation is repeated with different test pattern Data Codes 109 until Enc/Dec 919 has been completely tested. If the R/W Channel Test Operation fails and the Converter Test Operation succeeds, then the source of the malfunction is Heads 125 or Disk 123, and not Enc/Dec 919.

The Converter Test Operation may be varied to gain more information about the cause of a malfunction. As mentioned above, the Data Trap Flow Control Instruction 615 always enables the path involving Data Trap 1017 at predetermined points in the encoding and decoding operations. Microprocessor 1501 can control the moment at which FIFO 607 receives the test pattern Data Codes 109 and can thereby cause different parts of test pattern Dat Codes 109 to be encoded and then decoded. One use of such a technique is to discover errors in the operation of Byte Counter 1002. For example, if Byte Counter 1002 is not counting up to the full number of bytes stored in Sector Data 811, Microprocessor 1501 can detect the fault by varying the times at which test pattern Data Codes 109 are provided to FIFO 607. If the Converter Test Operation succeeds when the test patterns are provided early, but fails when they are provided late, Byte Counter 1002 may have failed and prevented Enc/Dec 919 from receiving pattern Data Codes 109.

3.4 Suspended Reserve Logic Circuitry—FIG. 16

Mention was made in the discussion of operation of DDCA 121 that the effect of a Reserve Control Instruction 641 issued by a first Controller 107 while a second Controller 107 was using Disk Drive 119 containing DDCA 121 was suspended until the second Controller 107 was finished using DDCA 121. FIG. 16 shows the logic circuitry used, n a present embodiment of Controller Interface 603 to suspend the effect of the Reserve Control Operation 641. As will be explained in more detail below, the logic circuit of FIG. 16 also produces interrupt signals from DDCA 121 to Controller 107.

Turning to FIG. 16, the suspended reserve logic is implemented by means of Programmable Logic Arrays (PLAs) 1601 and 1603, Registers 1605 and 1607, and Interrupt Logic 1623. PLAs 1601 and 1603 may be field-programmable logic arrays of type 82S100D, manufactured by Signetics Corporation.

PLA 1601 receives CBI(1) Signals 1609 from Controller-Disk Bus 127(1), System Interrupt (SI) 1611 and Internal Device Code (IDC) Signals from DDCA Status 1539, an External Reserve 1 (ERES1) 1615 signal, an Internal Reserve 1 (IRES1) 1635 signal, and a Interrupt 1 (INT1) 1617 signal from Reg 1605, and an ERES2 1619 signal from REG 1607. Signals produced by PLA 1601 from this input are output to REG 1605 and other parts of DDCA 121. Outputs of REG 1605 go to PLA 1601, PLA 1603, and other parts of DDCA 121. Inputs of PLA 1603 are analogous to those of PLA 1601. It receives CBI(2) Signals 1613 from Controller-Disk Bus 127(2), SI 1611, an ERES2 1619 signal, an IRES2 1641 signal, and an INT2 1621 signal from Reg 1607, and an ERES1 1619 signal from Reg 1605. Signals produced by PLA 1601 from this input are output to REG 1607 and other parts of DDCA 121. Outputs of REG 1607 go to PLA 1601, PLA 1603, and other parts of DDCA 121. In particular, INT1 1617 and INT2 1621 are provided to Interrupt Logic 1629, which produces Interrupt Pending (IP) Signal 1623 in response to those signals. IP 1623 is part of DDCAS 620. The signals have the following meanings:

(1) CBI Signals 1609 include Control Instructions 641 from CONTG Bus 705, CON STB/ACK 711, C/D MD SEL 723, DEV SELECT1 707, and DEV SELECT2 709. The meanings of these signals were explained in the discussion of Controller-Disk Bus 127.

(2) SI 1611 is a system interrupt signal which is produced either by Apparatus Control 609 or a power failure. SI 1611 indicates that Disk Drive 119 requires the intervention of Controller 107.

(3) IDC 1612 is a component of DDCAS 620. It specifies which device code must be on DEV SELECT1 707 and DEV SELECT2 709 in order for PLA 1601 or PLA 1603 to respond to inputs on CBI(1) 1609. As will be explained later, IDC 1612 also determines which of INT REQ lines 715 through 1721 carries an interrupt signal when Disk Unit 119 generates an interrupt.

(4) ERES1 1615 and ERES2 1619 indicate respectively that Controller 107(1) or Controller 107(2) has reserved and is currently using Disk Unit 119. These signals are part of Immediate Status 647.

(5) IRES1 1635 and IRES2 1641 indicate respectively that Controller 107(1) or Controller 107(2) has reserved but is not yet using Disk Unit 119.

(6) INT1 1617 and INT2 1621 cause interrupt signals on whichever DEV INT REQ 715–721 of Controller-Disk Bus 127(1) and (2) is specified by IDC 1612.

(7) IP 1623 indicates to Apparatus Control 609 whether Controller 107 has responded to either INT1 1617 or INT2 1621. If IP 1623 indicates that it has not, Apparatus Control 609 is inhibited from providing system interrupt signals to SI 1611.

(8) IMST1 1631 and IMST2 1637 indicate that PLA 1601 or PLA 1603 respectively has received an Immediate Status Control Instruction 641 on CBI(1) 1609 or CBI(2) 1613. These signals are part of INT/RWFCTL 625.

(9) INITSEQ1 1633 and INITSEQ2 1639 indicate that PLA 1601 or PLA 1603 respectively has received an Initiate Sequence In or Initiate Sequence Out Control Instruction 641 on CBI(1) 1609 or CBI(2) 1613. The effect of these signals will be explained later.

(10) ISS1 1643 and ISS2 1645 are set when INITSEQ1 1633 and INITSEQ2 1639 are active and are reset when PLA 1601 or PLA 1603, as the case may be, receives an Immediate Status Control Instruction 641. These signals are part of R/W FCTL 625 and specify that data is being transferred between Apparatus Control 609 and Controller 107, instead of between Disk 123 and Controller 107.

(11) Reset1 1653 and Reset2 1655 indicate that PLA 1601 or PLA 1603 respectively received a Reset Control Instruction 641 while ERES1 1615 or ERES2 1619 respectively was set. Reset Logic 1657 responds to either Reset1 1653 or Reset2 1655 by producing signals which place DDCA 121 into a condition in which it can receive and execute an Operational Instruction 643.

Since PLA 1601 and PLA 1603 function in analogous fashions, only the function of PLA 1601 will be explained in detail. The discussion first deals with the suspended reserve operation itself, and then with the generation of interrupt signals.

3.4.1 The Suspended Reserve Operation

Controller 107(1) reserves Disk Drive 119 by means of Reserve Control Instruction 641. When that Control Instruction 641 appears on CBI(1) 1609, PLA 1601 responds by setting ERES1 1615 to 1. If Disk Drive 119 has been idling, ERES2 1615 has the value 0. When ERES1 1615 has the value 1 and ERES2 1615 the value 0, PLA 1602 responds by setting INT1 1617 to 1, thereby producing an interrupt to Controller 107(1) and giving Controller 107(1) immediate use of Disk Drive 119. If Controller 107(2) does not reserve Disk Drive 119, while Controller 107(1) is using it, Release Control Instruction 641 provided by Controller 107(1) when it is finished using Disk Drive 119 merely resets ERES1 1615 to 0.

If Disk Drive 119 is being used by Controller 107(2), ERES2 1619 has the value 1. In this situation, PLA 1601 responds to Reserve Control Instruction 641 by setting IRES1 1635 to 1. Since ERES1 1615 has not been set to 1, INT1 1617 is not set and no interrupt is produced to Controller 107(1). When Controller 107(2) is finished using Disk Drive 119, it provides a Release Control Instruction on CBI(2) 1613; in response to this instruction, PLA 1603 resets IRES2 1641 to 0, as described above for Controller 107(1). In response to the change of value on ERES2 1619 and to the value 1 on IRES1 1635, PLA 1601 sets ERES1 1615 to 1 and then responds to the value 0 on ERES2 1619 and the value 1 on ERES1 1615 by setting INT1 1617 to 1, thereby producing an interrupt to Controller 107(1) and giving Controller 107(1) use of Disk Drive 119 as described above. If Controller 107(2) does not reserve Disk Drive 119 while Controller 107(1) is using it, a Release Control Instruction 641 from Controller 107 (1) has the effect previously described; if Controller 107(2) does reserve Disk Drive 119 while Controller 107(1) is using it, PLA 1603 responds in the fashion just described for PLA 1601. Once INT1 1617 or INT2 1621 has been set, it remains set until PLA 1601 in the case of INT1 1617 or PLA 1603 in the case of INT2 1621 receives an Immediate Status Control Instruction 641; in response to that Control Instruction 641, PLA 1601 or PLA 1603, as the case may be, resets the register in REG 1605 providing INT1 1617 or the register in REG 1607 providing INT2 1621.

3.4.2 Interrupts from SI 1611—FIG. 16A

As just explained, Controller 107(1) receives an interrupt signal from Disk Drive 119 as long as INT1 1617 in Register 1605 is set. Besides being set as a consequence of the execution of a Reserve Control Instruction 641, INT1 1617 is set when ERES1 1615 is set and SI 1611 is active and cannot be reset as long as SI 1611 is active.

Turning to FIG. 16A, SI 1611 is the output of OR gate 1648, and consequently, SI 1611 is active whenever either ACSI 1647 or PWR FLT 638 is active. ACSI 1647 is set by Apparatus Control 609, and is thus the means by which Apparatus Control 609 requests intervention from whichever Controller 107 has reserved Disk Drive 119. When either INT1 1617 from REG 1605 or INT2 1621 from REG 1607 is set, Interrupt Logic 1621 produces IP 1623, which is part of DDCAS 620. As long as IP 1623 indicates that an interrupt has been set, Apparatus Control 609 will not generate further signals on ACSI 1647.

PWR FLT 638 is produced by the power supply of Disk Drive 119 and becomes active whenever there is a failure of power to Disk Drive 119. A power failure thus produces an interrupt to whichever Controller 107 has reserved Disk Drive 119. PWR FLT 638 is further connected to the D input of Flip-flop 1650. Thus, when PWR FLT 638 is active, the Q output of Flip-flop 1650 becomes active, producing PWR FAIL 1649, which is one of the signals of Immediate Status Code 647. PWR FAIL 1649 remains active until $\overline{LRES}$ 1651 becomes inactive, resetting Flip-flop 1650. $\overline{LRES}$ is produced by Reset Logic 1657 in response to the activation of either Reset1 1653 or Reset2 1655 by a Reset Control Instruction 641.

The apparatus just described responds to a power failure in the following fashion: The power failure activates PWR FLT 638, which in turn activates SI 1611 and sets Flip-flop 1650. The activation of SI 1611 produces an interrupt to whichever Controller 107 has reserved Disk Drive 119. In response to the interrupt, Controller 107 provides an Immediate Status Control Instruction 641 to which Disk Drive 119 responds by providing an Immediate Status Code 647 with its power fail bit set. Generally speaking, Controller 107 can respond rapidly enough to the interrupt to obtain Immediate Status Code 647 before power fails completely in Disk Drive 119. Controller 107 responds to Immediate Status Code 647 indicating a power failure with a Reset Control Instruction 641 which resets Flip-flop 1650 and may reset INT1 1617.

If PWRFLT 638 is still active, Reset Control Instruction 641 cannot reset INT1 1617. Similarly, if PRWFLT 638 remains active, Flip-flop 1650 is set again immediately after Reset Control Instruction 641 has cleared Flip-flop 1650. Thus, a condition cannot arise in which Disk Drive 119 is experiencing intermittent or partial power failures but Controller 107 does not receive an interrupt because an Immediate Status Control Instruction 641 has reset INT1 1617 or does not receive an Immediate Status Code 647 because a Reset Control Instruction 641 has reset Flip-flop 1650. Since Power Fail 1649 is a signal of DDCAS 620, Apparatus Control 609 can respond to a power failure; however, service of a momentary power failure by Controller 107 is speeded by allowing PWRFLT 638 to directly activate SI 1611 without intervention of Apparatus Control 609.

3.4.3 Generation of Device Interrupt Request Signals—FIG. 16B

FIG. 16B illustrates the logic circuitry by which Controller 107 which has currently reserved Disk Drive 119 receives a signal on DEV INT REQ line 715 through 721 corresponding to Disk Drive 119. The logic circuitry consists of Decoder 1661 and Drivers 1667 through 1673. Each of Drivers 1667 through 1673 drives one of DEV INT REQ lines 715 through 721 for each of Controllers 107(1) and (2) connected to Disk Drive 119. For example, Driver 1667 drives DEV0 INT REQ Line 715(1)to Controller 107(1) and DEV0 INT REQ Line 715(2) to Controller 107(2). Each of Drivers 1667 through 1673 receives INT1 1617 and INT2 1621 as inputs. If a given Driver 1667 is enabled, it outputs the values of INT1 1617 and INT2 1621 on its output lines. For instance, if Driver 1667 is enabled and INT1 1617 indicates an interrupt, Driver 1667 outputs a signal on DEV INT REQ Line 715(1). Which of Drivers 1667 is enabled is determined by Decoder 1661, which responds to the value of IDC 1612 by enabling one of Drivers 1667 through 1673. Since INT1 1617 and INT2 1621 are set only if Controller 107(1) or Controller 107(2) respectively has reserved a given Disk Drive 119, that Disk Drive 119 activates only that line of DEV INT REQ Lines 715(1) and (2) through 721(1) and (2) corresponding to that Disk Drive 119 and to Controller 107(1) or (2) which has currently reserved that Disk Drive 119.

3.5 Implementation of Data Transfer Apparatus 605—FIG. 17

As described in the overview of the structure and operation of DDCA 121, data is transferred between components of DDCA 121 by Data Transfer Apparatus 605. FIG. 17 presents a block diagram of the implementation of Data Transfer Apparatus 605 in a preferred embodiment of DDCA 121. The components of Data Transfer Apparatus 605 are FIFO 607, which contains a queue of data being transferred, FIFO IN Bus 1701, which receives data to be placed in the tail of the queue in FIFO 607, FIFO OUT Bus 1703, which receives data output from the head of the queue in FIFO 607, and DTACTL 1709, which controls operation of FIFO 607, FIFO IN 1701, and FIFO OUT 1703 in response to Flow Control Instructions 616 and INTFCTL signals 623 from Controller Interface 603, ACFCTL signals 621 from Apparatus Control 609, and R/WFCTL signals 625 from R/W Processor 611. In a present embodiment, FIFO 607 receives and outputs bytes of data and FIFO IN Bus 1701 and FIFO Out Bus 1703 each carry a byte of data.

FIFO IN Bus 1701 may receive bytes of data alternatively from the following sources:
(1) Input Driver 1707(1) in Controller Interface 603, which receives data from C/D 701 of Controller-Disk Bus 127(1);
(2) Input Driver 1707(2), which receives data from C/D 701 of Controller-Disk Bus 127(2);
(3) I/0 BUFS 1527 in Apparatus Control 609, which receive data from MP Bus 1503.
(4) Read Data Latch 1015 in R/W Processor 611, which contains Data Codes 109 converted from Disk Codes 128.

FIFO Out Bus 1703 may provide data alternatively to the following devices:
(1) Output Driver 1705(1) in Controller Interface 603, which provides data to C/D 701 of Controller Disk Bus 127(1);
(2) Output Driver 1705(2) in Controller Interface 603, which provides data to C/D 701 of Controller-Disk Bus 127(2);
(3) I/0 BUFS 1527 in Apparatus Control 609, which provide data to MP Bus 1503;
(4) Data Input Register 1005 in R/W Processor 611, which receives Data Codes 109 to be converted to Disk Codes 128.

As may be seen from the above description of FIFO In 1701 and FIFO OUT 1703, Data Transfer Apparatus 605 may transfer data between any two components of DDCA 121. DTACTL controls direction of transfer in response to Data Transfer Flow Control Instructions 615; it controls loading and unloading of of FIFO 607 in response to INTFCTL 623, ACFCTL 621, and R/W RCTL 625. DTACTL 1709 controls loading and unloading by means of Unload FIFO (UFIFO) 1711 and Load FIFO (LFIFO) 1713 signals provided to FIFO 607. DTACTL 1709 controls direction of transfer by means of signals provided to INTFCTL 623. FIFO 607, finally, provides signals of DDCAS 620 to Apparatus Control 609 indicating whether FIFO 607 is empty, contains data, or is full.

Which components of DDCA receive data from Data Transfer Apparatus 605 or provide it to Data Transfer Apparatus 605 is determined by Apparatus Control 609. DTACTL 1709 responds to Data Transfer Flow Control Instructions 615 from Apparatus Control 609 by providing signals to INTFCTL 623 specifying that Controller Interface 603 is to provide data to FIFO IN Bus 1701, receive it from FIFO Out Bus 1703, or do neither. R/W Processor 611 responds to Read-Write Flow Control Instructions 615 by providing Data Codes 109 to FIFO IN Bus 1701 or receiving them from FIFO Out Bus 1703, and Apparatus Control 609 itself may enable I/O BUFS 1527 to receive data from FIFO Out Bus 1703 or provide it to FIFO In Bus 1701. Overall control by Apparatus Control 609 ensures that only one component of DDCA 121 will provide data to Data Transfer Apparatus 605 and only one other component of DDCA 121 will receive data from Data Transfer Apparatus 605 at any given time.

FIFO 607 is implemented by means of two 16 word by 5 bit asynchronous first-in/first-out memories of type SN74S225J. These memories have separate input and output ports and are able to asynchronously receive data at the input port and output data at the output port. Data input to FIFO 607 is written to the tail of the queue; data output from FIFO 607 is output from the head of the queue; signals from FIFO 607 indicate whether it is full, empty, or contains data. In a present embodiment, FIFO 607 may contain up to 16 bytes of data. Control logic in DTACTL 1709 in a present embodiment may be implemented by means of a field-programmable logic array of type 82S100D, manufactured by Signetics Corporation.

3.6 Logic Controlling Outputs on C/D Bus 701

As mentioned previously, C/D Bus 701 alternatively transfers Data Codes 109, Immediate Status Codes 647, and Bus Diagnostic Codes 650 between DDCA 121 and Controller 107. FIG. 18 shows the logic circuitry in a present embodiment of DDCA 121 which provides these outputs to C/D Bus 701 (1) under control of signals on other lines of Controller-Disk Bus 127. Identical apparatus is used to provide these outputs to C/D Bus 701 (2). As mentioned in the discussion of Data Transfer Apparatus 605, when Disk Drive 119 is providing data to C/D Bus 701(1), the bus is driven by Driver 1705(1). Data input to Driver 1705(1) is received from one of three sources:
(1) Data Out Buffer 1806, which receives data from Data Transfer Apparatus 605 via FIFO Out Bus 1803 and outputs it to CDO 1804 when enabled by inactive IMST1 1635
(2) Immediate Status Out (IMS Out) Buffer 1809, which receives Immediate Status Codes 647, consisting of certain signals of DDCAS 620, as its input and outputs the input to CDO 1804 when enabled by inactive ENAB IMS 1813;
(3) Bus Diagnostics Out (BUSD Out) Buffer 1811, which receives Bus Diagnostic Code 650, consisting of the the current values of certain lines of Controller-Disk Bus 127(1) as its input and outputs the input to CDO 1804 when enabled by inactive ENAB BUSD 1815.

Immediate Status Code 647 contains signals from DDCAS 620 specifying the following:
(1) Which Controller 107, if any, is currently using DDCA 121;
(2) Which Controller 107, if any, has reserved DDCA 121;
(3) Whether DDCA 121 is busy;
(4) Whether DDCA 121 is ready;
(5) Whether there is an error condition in DDCA 121;
(6) Whether the last data transfer failed.

Bus Diagnostic Code 650 contains the current values of the following lines of Controller-Disk Bus 127(1):
(1) CONTG Bus 705;
(2) CON STB/ACK 713;
(3) C/D MD SEL 723;
(4) DEV SELECT1 707 and DEV SELECT2 709;
(5) HDER/DATA 725.

Which of INITSEQ1 1633, ENAB IMS 1813, and ENAB BUSD 1815 is inactive is determined by inputs to PLA 1601 on CBI(1) 1609 and ERES1 1615. The inputs on CBI(1) 1609 are Control Instructions 641 and C/D MD SEL 723. In response to these inputs, PLA 1601 activates either INITSEQ1 1633 or IMST1 1635 or both INITSEQ1 16333 and IMST1 1635. IMST1 1635 directly enables Data Out Buffer 1806; IMST1 1635 and INITSEQ1 1633 together serve as inputs to Output Select (OSEL) Logic 1805, which activates either ENAB IMS 1813 or ENAB BUSD 1815. OSEL Logic 1805 inactivates ENAB IMS 1813 when INITSEQ1 1633 is inactive and IMST1 1635 is active; it inactivates ENAB BUSD 1815 when both INITSEQ1 1633 and IMST1 1635 are active.

IMST1 1635 is active when there is an Immediate Status Control Instruction 641 on CONTG Bus 703 and C/D MD SEL 723 indicates a command; INITSEQ1 1633 is active when there is an Initiate Sequence In or Initiate Sequence Out Control Instruction 641 on CONTG Bus 703 of CBI(1) 1609, C/D MD SEL 723 indicates a command, and ERES 1615 is active. Both are active simultaneously when ERES1 1615 is inactive and C/D MD SEL 723 indicates data. Thus, as long as Controller 107(1) has reserved Disk Drive 119, Data Out 1806 provides Data Codes 109 received from FIFO Out 1803 to CDO 1804 unless Controller 107(1) is providing command mode on C/D MD SEL 723 and an Immediate Status Control Instruction 641 on CONTG Bus 703, in which case IMS Out 1807 provides Immediate Status Codes 647. BUSD Out 1811 provides Bus Diagnosis Codes 650 only when Controller 107(1) has not reserved Disk Drive 119 and C/D MD SEL 723 indicates data. Driver 1705(1) outputs data on CDO 1804 to C/D Bus 701 when either IMST1 1635 is active or DDCA 121 is transferring data to Controller 107.

4 Detailed Description of controller-Disk Bus 127—FIGS. 7, 19, 19A, 19B, and 20

Controller-Disk Bus 127 has already been discussed to the extent required to understand the mode of operation of DDCA 121; in the following, the role of Controller-Disk Bus 127 in the interactions between Controller 107 and DDCA 121 is explained more fully and a detailed description of a portion of the implementation of Controller-Disk Bus 127 in a present embodiment is provided. The discussion begins with a description of as much of the the structure and operation of Controller 107 as required to understand Controller-Disk Bus 127 and continues with a detailed discussion of Controller-Disk Bus 127 itself.

4.1 Overall Structure of Controller 107—FIG. 19

FIG. 19 is a block diagram of Controller 107. As may be seen from that Figure, Controller 107 has four main components:
(1) I/O Registers 1903, which receive Controller Instructions 113 and and individual data items from Host Processor 101 via Channel (CH) 1931 and provides individual data items to Host Processor 101 via CH 1931.
(2) Data Processor 1909, which controls transfer of Data Codes 109 between Host Processor 101 and Disk Drive 119. Data Processor 1909 receives Data Codes 109 from Host Processor 101 and provides them to Host Processor 101 via High Speed Channel 1935. Processing necessary for transfer of Data Codes 109 is provided by Microprocessors 1911 and Data Codes 109 are stored in CTL Mem 115 while being transferred.
(3) Disk Interface 1929 receives inputs from and provides outputs to Controller-Disk Bus 127. Dotted lines in Disk Interface 1929 show sources of outputs to Controller-Disk Bus 127 and destinations of inputs from Controller-Disk Bus 127. Operation of Disk Interface 1920 is controlled by DP/INT Signals 1950 from Data Processor 1909 and CCTL/INT Signals 1908 from CCTL 1901.
(4) Controller Control (CCTL) 1901 controls overall operation of the other components of Controller 107 in response to Controller Instructions 113 received from Host Processor 101 via I/O Registers 1903.
(5) All components of Controller 107 are connected by means of CCTL Bus 1905. CCTL 1901 provides instructions controlling Data Processor 1909 and data including Operational Instructions 643 via CCTL Bus 1905 to Data Processor 1909. CCTL 1901 further provides Control Instructions 641 and values for DEV SELECT1 707 and DEV SELECT2 709 to Disk Interface 1929, as well as values of C/D MD SEL 723, CON STB/ACK 711, and HDER/DATA 725 for diagnostic purposes. CCTL 1901 receives Immediate Status Codes 647 and Bus Diagnostic Codes 650 from C/D Bus 701 and diagnostic outputs from Disk Interface 1901 via CCTL Bus 1905.
(6) Data Bus 1913 connects C/D Bus 701 and Data Processor 1913 and transfers Data Codes 109 between C/D Bus 701 and Data Processor 1909.

As was the case with Apparatus Control 609 in DDCA 121, CCTL is too slow to coordinate transfer of data between Data Processor 1909 and DDCA 121; these transfers are coordinated by Ctl DDCA Signals 1915 from Data Processor 1909 to DDCA 121 and and DDCA-Ctl Signals 1917 from DDCA 121 to Data Processor 1909. Signals DINTS 1907, finally, are derived from interrupt signals on DEV INT REQ 715-721.

4.1.1 Detailed Structure of Data Processor 1909—FIG. 19A

Turning now to details of Data Processor 1909, FIG. 19A presents a block diagram of Data Processor 1909. The main components of Data Processor 1909 are Bit-Slice Microprocessors 1911, Ctl Mem 115, FIFOs 1949, 1951, and 1953, Instruction register (IREG) 1943, and Sequenceer (SEQ) 1945. Addresses in CTL Mem 115 are generated by counters in Addr Ctrs 1942. SEQ 1945 controls components of Data Processor 1909 in response to instructions in IREG 1943 and signals CSIGS 1961 from Microprocessors 1911. Control is by means of DEVCTL signals 1947 controlling devices other than Microprocessors 1911, UINSTS 1946 and ADDRS 1948, controlling Microprocessors 1911, DP/INT Signals 1950, and Ctl/DDCA Signals 1945. CTL/DDCA Signals 1945 include signals setting CON STB/ACK 711, C/D MD SEL 723, and HDER/-DATA 725 of Controller-Disk Bus 107.

IREG 1943 and Addr Ctrs 1942 receive inputs from CCTL 1901 via CCTL Bus 1905. By means of these inputs, CCTL 1901 controls overall operation of Data Processor 1909. Data Codes 109 received from HSC 1935 pass through IFIFO 1949 to CTL Mem 115 and pass from there through OFIFO 1951, OLATCH 1977, and DFIFO 1953 to Data Bus 1913. Data Codes 109 received from Data Bus 1913 pass through DFIFO 1953, DIN/OUT Bus 1959, and IFIFO 1949 to Ctl Mem 115 and pass from there throug ILATCH 1939 and OFIFO 1951 to HSC 1935. Input of Data Codes 1909 to DFIFO 1953 is controlled by a signal in DDCA-Ctl 1915 derived from signals on DISK STB/ACK 713. Bit-Slice Processors 1919 receive data from and output data to DIN/OUT 1959. Inputs and outputs of CTL Mem 115, output of IFIFO 1949, and input of ILATCH 1939 are connected to CCTL Bus 1905, allowing passage of data between Data Processor 1909 and CCTL 1901. Direction of passage of data through Data Processor 1909 is controlled by Drivers (DR) 1973, 1975, 1979, 1983, and 1981.

In a present embodiment, Bit-slice Microprocessors 1911 may consist of four 4-bit microprocessors of type AM2901A, manufactured by Advanced Micro Devices. Microprocessors 1911 are connected together to function as a single 16-bit processor having Registers 1963 and ALU 1967 for processing data contained in Registers 1963 and received on DIN/OUT Bus 1959. Data may output be output from ALU 1971 to DIN/OUT Bus 1959 or to Regs 1963. Microprocessors 1911 are controlled by means of UINSTS 1948 specifying operations of ALU 1971 and ADDRS 1946 specifying registers in REGS 1963 which are to provide data to or receive data from ALU 1971.

4.1.2 Detailed Description of Disk Interface 1929—FIG. 19B

The main components of Disk Interface 1929 are Drivers 1921, 1918, and 1923, which provide outputs to Controller/Disk Bus 127, and Receivers 1919, 1924, 1926, and 1915, which receive inputs from Controller/Disk Bus 127. Receiver 1919 and Driver 1921 receive data from and provide it to C/D Bus 701 and are connected to Data Bus 1913. Receiver 1919 and Driver 1921 are enabled by signals of DP/INT 1950 from SEQ 1945. Data Bus 1913 is connected to CCTL Bus 1905 by Latch 1984, from which data may be output to Data Bus 1984, and Driver 1985, which, when enabled, allows CCTL Bus 1905 to receive data from Data Bus 1905. Both Latch 1984 and Driver 1985 are controlled by signals of CCTL/INT 1908.

Driver 1918 provides signals on C/D Parity 703 when Controller 107 is transferring data to Disk Drive 119. The parity bit is generated in response to the data currently being transferred on Data Bus 1913 and provided to Driver 1918 by PARG 1916. Receiver 1926 receives signals on C/D Parity 703 when Disk Drive 119 is transferring data to Controller 107. Receiver 1926 is connected to PARCH 1986, which also receives the data currently being received on Data Bus 1913. If the parity signal received does not agree with the parity of the data currently being received, PARCH generates a parity error signal which is part of DDCA-Ctl 1917.

Driver 1923 provides outputs to CONTG Bus 705, DEV SELECT1 707, DEV SELECT2 709, CON STB/ACK 711, C/D MD SEL 723, and HDER/DATA 725. Driver 1923 receives inputs for CONTG Bus 705, DEV SELECT1 707, and DEV SELECT2 709 from Latch 1987, which is connected to CCTL Bus 1905 and under control of CCTL/INT signals 1908. CCTL 1901 may thus determine outputs on CONTG Bus 705, DEV SELECT1 707, and DEV SELECT2 709 by providing an input to Latch 1987 via CCTL Bus 1905. During normal operation, CON STB/ACK 711, C/D MD SEL 723, and HDER/DATA 725 are set in response to signals in Ctl/DDCA 1915; however, as will be explained in more detail below, in diagnostic operation, CTL/DDCA Logic 1988 allows CON STB/ACK 711, C/D MD SEL 723, and HDER/DATA 725 to be set from contents of Latch 1987.

Receiver 1924 is used only for diagnostic operations. It is connected to the outputs of Driver 1923 and provides outputs to CCTL Bus 1905. Receiver 1924 is enabled by signals in CCTL/INT 1908, and provides a path whereby outputs from Driver 1923 may be returned to CCTL 1901 without passing over Controller-Disk Bus 1907.

As previously mentioned, Receiver 1926 receives C/D Parity 703; it also receives DISK STB/ACK 713, which it outputs to Data Processor 1909 as part of DDA-CTL Signals 1917. Receiver 1925, finally, receives DEV0 INT REQ 715, DEV1 INT REQ 716 DEV2 INT REQ 719 and DEV3 INT REQ 721 and provides DINTS 1907 to CCTL 1901.

4.1.3 Operation of Controller 107

Operation of Controller 107 commences with receipt of a Controller Instruction 103 from Host Processor 101 in I/O REGS 1903. In response to Controller Instruction 113, CCTL 1901 outputs values for a Control Instruction 641 and and DEV SELECT1 707 and DEV SELECT2 709 to Latch 1987, which provides the values to Driver 1923 and thereby to Controller-Disk Bus 107. The first Control Instruction 641 sent is typically an Immediate Status Control Instruction 641; in response to that Control Instruction 641, DDCA 121 of Disk Drive 119 specified by DEV SELECT1 707 and DEV SELECT2 709 provides an Immediate Status Code 647 on C/D Bus 701. CCTL 1901 receives Immediate Status Code 647 from Receiver 1919 via Driver 1985 and CCT Bus 605 and reads it; if DDCA 121 is ready, CCTL 1901 next provides a Reserve Control Instruction 641; when the selected Disk Drive 119 responds with an interrupt to Receiver 1925, CCTL 1901 responds to the resulting signal on DINTS 1907 by providing another Immediate Status Control Instruction 641 to Disk Drive 119. If Status Code 647 indicates that Disk Drive 119 is ready, CCTL 1901 provides Control Instruction 641 for the operation to be performed to Latch 1987 and a microinstruction to IREG 1943. In response to the microinstruction, Data Processor 1909 transfers Operational Instruction 643 for the operation to C/D Bus 701 via via ILATCH 1939, OFIFO 1951, OLATCH 1977, and DFIFO 1953. As each syllable of Operational Instruction 643 is sent, SEQ 1945 produces a signal on Ctl/DDCA 1915 which in turn produces a signal on CON STB/ACK 711.

CCTL 1901 further provides data required for execution of the operation via ILATCH 1939, OFIFO 1952, OLATCH 1977, and DIN/OUT 1959 to Microprocessors 1911. In the case of a New Block Operational Instruction 643, CCTL 1901 provides data specifying the number of sequential Track Sectors 504 to be read or written, the number of Data Codes 109 in a Track Sector 504, and the expected contents of Header 821 of the first Track Sector 504 to be read to Bit-Slice Microprocessors 1911 via ILATCH 1939, OFIFO 1951, and OLATCH 1977. Under control of an instruction provided to IREG 1943 by CCTL 1901, Bit-Slice Microprocessors 1901 store the data in registers of REGS 1964. In FIG. 19A, the registers are specified as DCOUNT 1965, which specifies the number of Data Codes 109 in a Track Sector 504, SCOUNT 1967, which is set to the number of Track Sectors 504 to be read, and EHDR 1967, which contains the expected contents of Header 821.

On receipt of an interrupt from DDCA 121, CCTL 1905 first provides an Immediate Status Operational Instruction 641 to check Disk Drive 119's status, and then, if Disk Drive 119 is ready, provides the instruction for the actual operation to IREG 1943. In response to the instruction, SEQ 1945 provides a signal in Ctl/DDCA 1915 which sets C/D MD SEL 723 to indicate data and a signal in DP/INT 1950 enabling Receiver 1919. In response to the change in C/D MD SEL 723, DDCA 121 then reads Header 821, which reaches Bit Slice Processors 1911 via Receiver 1919, Data Bus 1913, DFIFO 1953, and DIN/OUT 1959. Bit Slice Processors 1911 compare the value in EHDR 1961 with the value received from DFIFO 1953, and if they are equal, CSIGS 1961 indicates that fact and SEQ 1945 responds to DSIGS 1961 by providing a signal in Ctl/DDCA 1915 which sets HDER/DATA 725 to indicate data and a signal in DP/INT 1950 which enables Receiver 1919 or Driver 1921 as required for the transfer. As the transfer specified in Operational Instruction 643 takes place, DCOUNT 1965 is decremented as Data Codes 109 are transferred. In a write operation, each time 8 bits are transferred on C/D Bus 701, SEQ 1945 produces a signal in Ctl/DDCA 1915 from which CON STB/ACK 711 is derived. In a read operation, DFIFO 1953 is controlled by a signal in DDCA/Ctl derived from DISK STB/ACK 713.

When all Data Codes 109 in Track Sector 504 have been transferred, DCOUNT 1965 has the value 0 and a signal on CSIGS 1961 indicates that fact to SEQ 1045. SEQ 1945 responds by providing a signal in CTL/DDCA 1915 which sets HDER/DATA 725 to indicate header and provides microinstructions to Bit-slice Microprocessors 1911 which cause it to decrement the sector count in SCOUNT 1967 by 1, reset DCOUNT 1965 to specify the number of Data Codes 109 in Track Sector 504, calculate the values expected in the next Header 821, and set EHDR 1967 to those values. The next Track Sector 504 is read or written as just described; when SCOUNT 1967 reaches 0, SEQ 1945 responds to the resulting signal on CSIGS 1961 by setting C/D MD SEL 723 to indicate a command. If another operation is to be performed, CCTL 109 provides an Immediate Status Control Instruction 641 to check the status of Disk 119 and then, if Disk 119 is ready, provides another Operational Instruction 643 and proceeds as just described; otherwise, it provides a Release Control Instruction 641.

4.2 Operation of Controller-Disk Bus 107—FIG. 7

For ease of reference in the following discussions, the functions of the lines of Controller-Disk Bus 107 shown in FIG. 7 are once again summarized here.

Beginning with C/D Bus 701, C/D Bus 701 is 8 bits wide. It carries syllables of Operational Instructions 643 to DDCA 121, Data Codes 109 to and from DDCA 121, and Immediate Status Codes 647 and Bus Diagnostic Codes 650 from DDCA 121. Whether DDCA 121 is to treat data received on C/D Bus 701 as a syllable of an Operational Instruction 643 is determined by a signal on C/D MD SEL 723 from Control 107. C/D Parity 703 carries Parity Code 205 for items transferred via C/D Bus 701.

CONTG Bus 705 is three bits wide. It carries Control Instructions 641 from Controller 107 to DDCA 121. DEV SELECT1 707 and DEV SELECT2 709 together carry a two-bit code which selects one of the four Disk Drives 119 which may be connected to Controller 107 in a present embodiment of System 100. A given Disk Drive 119 does not respond to Controller-Disk Bus 127 unless the two-bit code specifes that Disk Drive 119.

CON STB/ACK 711 carries a signal from Controller 107 to DDCA 121 indicating that data from Controller 107 is present on C/D Bus 701. DISK STB/ACK carries a signal from DDCA 121 to Controller 107 indicating that data from Disk Drive 119 is present on C/D Bus 701.

DEV0 INT REQ through DEV3 INT REQ are interrupt lines for each of the four Disk Drives 119 attached to Controller-Disk Bus 127. DDCA 121 in a given Disk Drive 119 provides interrupts to Controller 107 only on DEV INT REQ corresponding to DDCA 121's Disk Drive 119. C/D MD SEL 723 was explained in connection with C/D Bus 701 above; HDER/DATA 725 is a signal from Controller 107 to DDCA 121 indicating whether Data Codes 109 may be transferred between Controller 107 and DDCA 121.

In normal operation, Controller 107 undertakes a sequence of operations which result in Data Codes 109 being written to or read from Disk 123. As previously explained, DDCA 121 reads or writes Data Codes 109 in response to a New Block Operational Instruction 643. During the execution of a New Block Operational Instruction 643, the lines of Controller-Disk Bus 127 carry values as follows: C/D MD SEL 723 specifies a command, CONTG BUS 705 carries a Reserve Control Instruction 641, and DEV SELECT1 707 and DEV SELECT2 709 specify the desired Disk Drive 119. DEV SELECT1 707 and DEV SELECT2 709 remain set for the entire operation. When Controller 107 may have access to Disk Drive 119, DDCA 121 provides an interrupt signal on DEV INT REQ 715 through 721 belonging to Disk Drive 119. CCTL 1901 responds to the interrupt signal with an Immediate Status Control Instruction 641. DDCA 121 responds by cancelling the interrupt signal and providing Immediate Status 647 on C/D Bus 701. CCTL 1901 receives Immediate Status 647 via CCTL Bus 1905 from Disk Interface 1929.

If Immediate Status 647 indicates that Disk Drive 119 is ready to perform the desired operation, CCTL 1901 provides the proper Initiate Sequence Control Instruction 641 on CONTG Bus 705 and then provides the syllables of New Block Operational Instruction 643 to DDCA 121 on C/D 701. When DDCA 119 has located Cylinder 509 and enabled the proper Head 125, it provides an interrupt signal on DEV INT REQ 715 through 721 belonging to Disk Drive 119. CCTL 1901 responds to the interrupt signal with an Immediate Status Control Instruction 641, and if Immediate Status 647 indicates that DDCA 119 is ready to go, CCTL 1901 provides the instruction for the operation to Data Processor 1909. At the beginning of the operation, Data Processor 1909 sets C/D MD SEL 723 to indicate data and HDR/DATA to indicate a Header 821. R/W Processor 611 responds to the change of state of C/D MD SEL 723 by reading Header 821 from Track Sector 504. The Data Codes 109 contained in Header 821 are transferred to Controller 107 by C/D Bus 701 and pass via Data Bus 1913 to Data Processor 1909. Data Processor 1909 compares the values from Header 821 with the values it should contain. If they match, Data Processor 1909 sets HDR/DATA 725 to indicate data and Data Codes 109 are transferred between Disk 119 and Controller 107 in the direction required by the New Block operation. When Data Processor 1909 has received or provided all of Sector Data 811, it again sets HDER/DATA 725 to indicate Header 821 and then reads or writes the next Track Sector 504 as just described. When Data Processor 1909 has read or written all Track Sectors 504 specified in the command provided it by CCTL 1901, it again sets C/D MD Sel 723 to indicate a command. If another operation is to be performed, CCTL 1901 provides an Immediate Status Control Instruction 641 to CONTG Bus 705, and if Immediate Status 647 on C/D Bus 701 indicates that Disk 119 is ready, CCTL 1901 performs the next operation in the manner just described. If Controller 107 is finished, it outputs a Release control Instruction 641 to CONTG Bus 705.

In addition to the mode of operation just described, Controller-Disk Bus 127 has a diagnostic mode. Controller-Disk Bus 127 operates in diagnostic mode only when Controller 107 has reserved none of Disk Drives 119 connected to Controller-Disk Bus 127. Under these circumstances, when CCTL 1901 provides values in Latch 1987 of Disk Interface 1909 which set C/D MD SEL 723 to indicate data and specify a Disk Drive 119, the current state of CONTG Bus 705, CON STB/ACK 713, C/D MD SEL 723, DEV SELECT1 707, DEV SELECT2 709, and HDER/DATA 725 of the selected Disk Drive 119 are returned from DDCA 121 as Bus Diagnostic Codes 650 on C/D Bus 701. CCTL 1901 receives Bus Diagnostic Codes 650 from C/D Bus 701 via Data Bus 1913, Driver 1985, and CCTL Bus 1905. By this means, CCTL 1901 may compare the values it gave these lines with the values in Bus Diagnostic Codes 650 and thereby determine whether DDCA 121 is correctly receiving the values output to it. The means by which DDCA 121 Bus Diagnostic Codes 650 on C/D Bus 701 when Controller-Disk Bus 127 is in diagnostic mode may be seen in FIG. 18 and are explained in the discussion of that Figure.

5 Conclusion

The foregoing Description of the Preferred Embodiments has disclosed how one with ordinary skill in the art may construct and use a DDCA 121 of the present invention in a Disk Drive 119. Components of DDCA 121 include Controller Interface 603 for receiving data and Disk Drive Instructions 129 from a Controller 107 and providing data to Controller 107, Read/write Processor 611 for converting Data Codes 109 to Disk Codes 128 and vice-versa, Data Transfer Apparatus 605 for transferring data between components of DDCA 121, and Apparatus Control 609 for controlling operation of components of DDCA 121 in response to Operational Instructions 643 received in Disk Drive Instructions 129. DDCA 121 of the present invention has the following characteristics:

(1) Overall control of operation of DDCA 121 is provided by Microprocessor 1501 in Apparatus Control 609.

(2) DDCA 121 has a hierarchical control structure. Microprocessor 1501 provides overall control of Data Transfer Apparatus 605 and R/W Processor 611 by means of Flow Control Instructions 615; further control logic circuitry in these components provides specific control in response to Flow Control Instructions 615 and signals from other components. R/W Processor 611, finally, provides instructions to Converter 133 directing conversion of Data Codes 109 into Disk Codes 128 or vice-versa.

(3) Diagnostic operations are an integral part of DDCA 121 and use the same components and control hierarchy as ordinary operations. Apparatus Control 609 executes diagnostic programs in response to Disk Drive Instructions 129 and may receive and execute diagnostic programs from Controller 107. In diagnostic operation, Apparatus Control 609 may cause Data Transfer Apparatus 605 to transfer data between any two components of DDCA 121.

(4) R/W Processor 611 performs a special diagnostic operation wherein Data Codes 109 are encoded and decoded without being written to or read from Disk 123.

(5) R/W Processor 611 employs a PROM for encoding and decoding. The encoding operation produces a CSWORD combining Disk Code 128 and a Status Code 1010 and thereby permits use of four bits of output to represent three bits of Disk Code 128 and two bits of Status Code 1010.

(6) Use of the PROM for encoding and decoding allows correction of non-conforming Disk Codes 128 during decoding.

(7) Controller Interface 603 includes logic circuitry which suspends the effect of a Reserve operation by a Controller 107 until that Controller 107 may have access to Disk Drive 119.

(8) Controller Interface 603 further contains logic circuitry which produces an interrupt in response to a Reserve operation, in response to Apparatus Control 609, and in response to a power fail signal. The Immediate Status Control Instruction 641 will not terminate an interrupt as long as the power fail signal is active.

The invention may be embodied in yet other specific forms without departing from the spirit or essential characteristics thereof. Thus, the present embodiments are to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. Interrupt signal providing apparatus in electrical apparatus for providing an interrupt signal to a controller connected to said electrical apparatus in response to a power fail interrupt signal from said electrical apparatus indicating the electrical apparatus has detected a power failure in a component of the electrical apparatus, said interrupt signal providing apparatus comprising:

(1) interrupt logic means, including means for receiving said power fail interrupt signal, means for receiving controller signals including a reset instruction from said controller, and apparatus interrupt state signal means, connected to said means for receiving said power fail interrupt signal and said means for receiving controller signals, said apparatus interrupt state signals means including means for setting an apparatus interrupt state signal in response to said power fail interrupt signal from said power fail interrupt signal receiving means and means, responsive to said reset instruction and said power fail interrupt signal from said power fail interrupt signal receiving means, for resetting said apparatus interrupt state signal only if said power fail interrupt signal is not activated when said reset instruction is received; and (2) apparatus interrupt state signal providing means, operatively connected to said interrupt logic means, for providing said apparatus interrupt state signal to said controller.

2. The interrupt signal providing apparatus of claim 1 wherein said interrupt logic means further includes:

means, connected to said power fail interrupt signal receiving means, for retaining a power failure indication when activation of said power fail interrupt signal occurs;

means, connected to said means for receiving controller signals and responsive to said reset instruction, for generating a reset signal to said power failure indication retaining means; and means, connected to said reset signal generating means, for providing said retained indication to said controller.

3. In a data storage system including a controller connected by a bus to a plurality of disk drives, said bus including (a) control instruction bus means for providing control instructions specifying one of said plurality of disk drives from said controller to said plurality of disk drives, (b) status code bus means for providing a status code from said one of said disk drives to said controller, and (c) a plurality of interrupt buses, each one of said plurality of interrupt buses corresponding to one of said plurality of disk drives, for providing an interrupt signal from said one disk drive corresponding to said interrupt bus to said controller, and said controller including means connected to said bus and responsive to said interrupt signal and said status code for providing said control instructions, interrupt signalling apparatus in each one of said disk drives for providing said interrupt signal to said controller on said interrupt bus corresponding to said one disk drive in response to a power failure in said one disk drive, said interrupt signalling apparatus comprising:

(1) Control instruction receiving means connected to said control instruction bus for responding to said control instructions including
   (a) an immediate status control instruction and
   (b) a reset control instruction when said control instructions specify said one disk drive, said control instruction receiving means responding to said immediate status control instruction by providing an immediate status signal and a reset interrupt state signal and responding to said reset control instruction by providing a reset state signal;

(2) interrupt logic for providing said interrupt signal on said interrupt bus corresponding to said one disk drive, said interrupt logic including
   (a) interrupt state retention means settable to an interrupt state in response to interrupt signals from components of said disk drive, said interrupt signals including a power fail interrupt signal produced in response to each said power failure and resettable in response to said reset interrupt state signal when said interrupt state retention means is not responding to said interrupt signals and
   (b) interrupt state generation means responsive to said interrupt state retention means for providing said interrupt signal on said interrupt bus corresponding to said one disk drive as long as said interrupt state retention means is retaining said interrupt state; and (3) status code logic for providing said status code on said status code bus, said status code logic including
   (a) power fail state retention means settable to a power fail state in response to said power fail interrupt signal and resettable in response to said reset state signal and
   (b) means responsive to said immediate status signal for providing said status code including said power fail state to said status code bus.

4. In a data storage system including a plurality of disk drives, two controllers and two buses, and wherein each one of said plurality of disk drives is connected to a first controller of said two controllers by a first bus of said two buses, each one of said two buses includes
(a) control instruction bus means for providing control instructions specifying one of said plurality of disk drives from said controller to said plurality of disk drives, said control instructions including
   (i) a reserve control instruction for reserving said disk drive for use by said controller connected to said bus and
   (ii) a release control instruction for releasing said disk drive from use by said controller connected to said bus,
(b) status code bus means for providing a status code from one of said disk drives to said controller, and
(c) a plurality of interrupt buses, each one of said plurality of interrupt buses corresponding to one of said plurality of disk drives, for providing an interrupt signal from said one disk drive corresponding to said interrupt bus to said controller, and each one of said two controllers includes means connected to said bus and responsive to said interrupt signals and said status codes for providing said control instructions, apparatus in each one of said disk drives for providing a first interrupt signal to said first controller on said interrupt bus corresponding to said one disk drive in said second bus when said second controller has reserved said one disk drive and a power failure has occurred in said one disk drive, said apparatus comprising:

(1) first control instruction receiving means connected to said control instruction bus in said first bus for responding to
   (a) said control instructions including
      (i) said reserve control instruction,
      (ii) said release control instruction,
      (iii) an immediate status control instruction, and
      (iv) a reset control instruction,
   (b) a first reserved state, and
   (c) internal interrupt signals including a power fail signal which becomes active each time a power failure occurs,
   by producing
   (a) a set first reserved state signal in response to said reserve control instruction, (b) a reset first reserved state signal in response to said release control instruction and said first reserved state, (c) a first immediate status signal in response to said immediate status control instruction and said first reserved state, (d) a set first interrupt state signal in response to said internal interrupt signal and said first reserved state, (e) a reset first interrupt state signal in response to said immediate status control instruction and said first reserved state when said first control instruction receiving means is not receiving said power fail signal, and (f) a first reset disk drive state signal in response to said reset control instruction and said first reserved state;

(2) second control instruction receiving means connected to said control instruction bus in said second bus for responding to
 (a) said control instructions including
  (i) said reserve control instruction,
  (ii) said release control instruction,
  (iii) said immediate status control instruction, and
  (iv) said reset control instruction,
 (b) a second reserved state, and
 (c) said internal interrupt signals by producing
  (a) a set second reserved state signal in response to said reserve control instruction,
  (b) a reset second reserved state signal in response to said release control instruction and said second reserved state,
  (c) a second immediate status signal in response to said immediate status control instruction and said second reserved state,
  (d) a set second interrupt state signal in response to said internal interrupt signal and said second reserved state;
  (e) a reset second interrupt state signal in response to said immediate status control instruction and said second reserved state when said second control instruction receiving means is not receiving said power fail signal, and
  (f) a second reset disk drive state signal in response to said reset control instruction and said second reserved state;

(3) reserved state retention means including
 (a) first reserved state retention means for providing said first reserved state retention means being settable to said first reserved state in response to said set first reserved state signal and resettable in response to said reset first reserved state signal and (b) second reserved state retention means for providing said second reserved state, said second reserved state retention means being settable to said second reserved state in response to said set second reserved state signal and resettable in response to said reset second reserved state signal, (4) interrupt logic for providing said interrupt signal on said interrupt bus corresponding to said one disk drive in said bus corresponding to said controller which has reserved and not yet released said one disk drive, said interrupt logic including
 (a) first interrupt state retention means settable to a first interrupt state in response to said first set interrupt state signal and resettable in response to said reset first interrupt state signal,
 (b) second interrupt state retention means settable to a second interrupt state in response to said second set interrupt state signal and resettable in response to said reset second interrupt state signal, and
 (c) interrupt signal generation means responsive to said first interrupt state and said second interrupt state for providing said interrupt signal to said interrupt bus corresponding to said one disk drive in said first bus in response to said first interrupt state and providing said interrupt signal to said interrupt bus corresponding to said one disk drive in said second bus in response to said second interrupt state; and (5) status code logic for providing said status code on said status code bus of said first bus and on said status code bus of said second bus, said status code logic including
 (a) power fail state retention means settable to a power fail state in response to said power fail interrupt signal and resettable in response to either said reset first interrupt state signal or said reset second interrupt state signal,
 (b) first immediate status code output means responsive to said first immediate status signal for outputting said status code including said power fail state to said status code bus of said first bus in response to said first immediate status signal, and
 (c) second immediate status code output means responsive to said second immediate status signal for outputting said status code including said power fail state to said status code bus of said second bus in response to said second immediate status signal.

* * * * *